INVENTOR.
MURRAY ROSENBLATT
BY
ATTORNEY

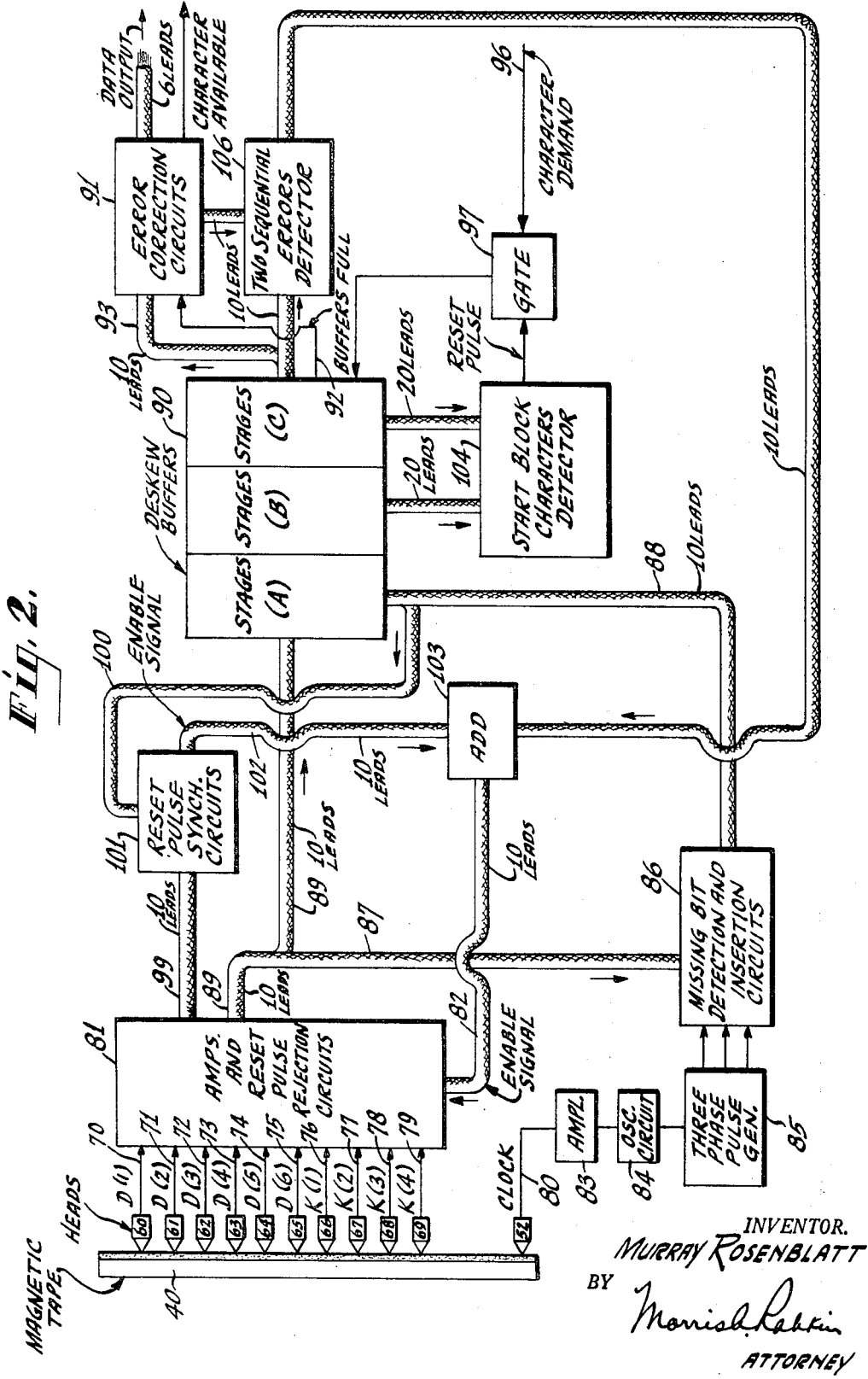

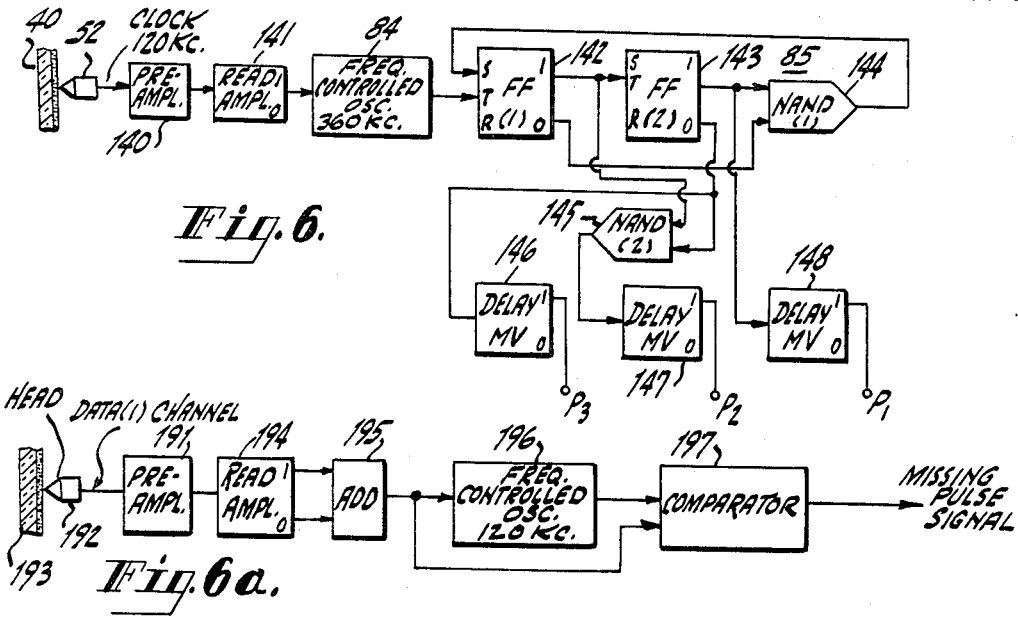
Fig. 6.
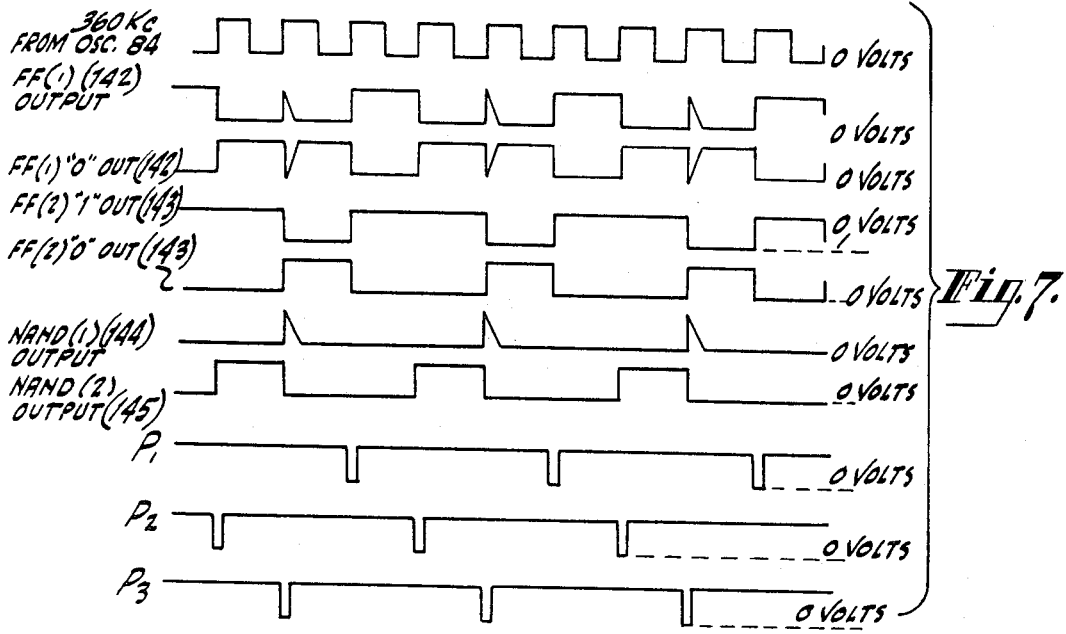
Fig. 6a.
Fig. 7.
INVENTOR.
MURRAY ROSENBLATT
BY
ATTORNEY

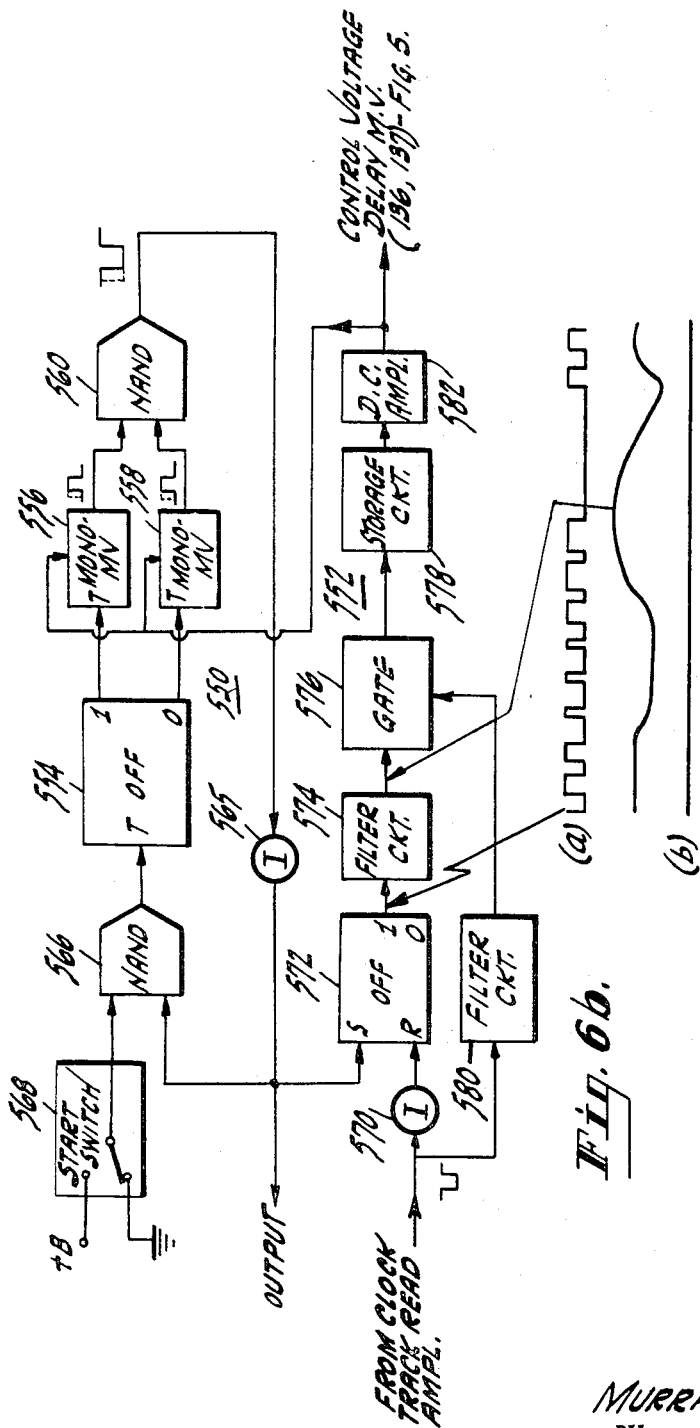

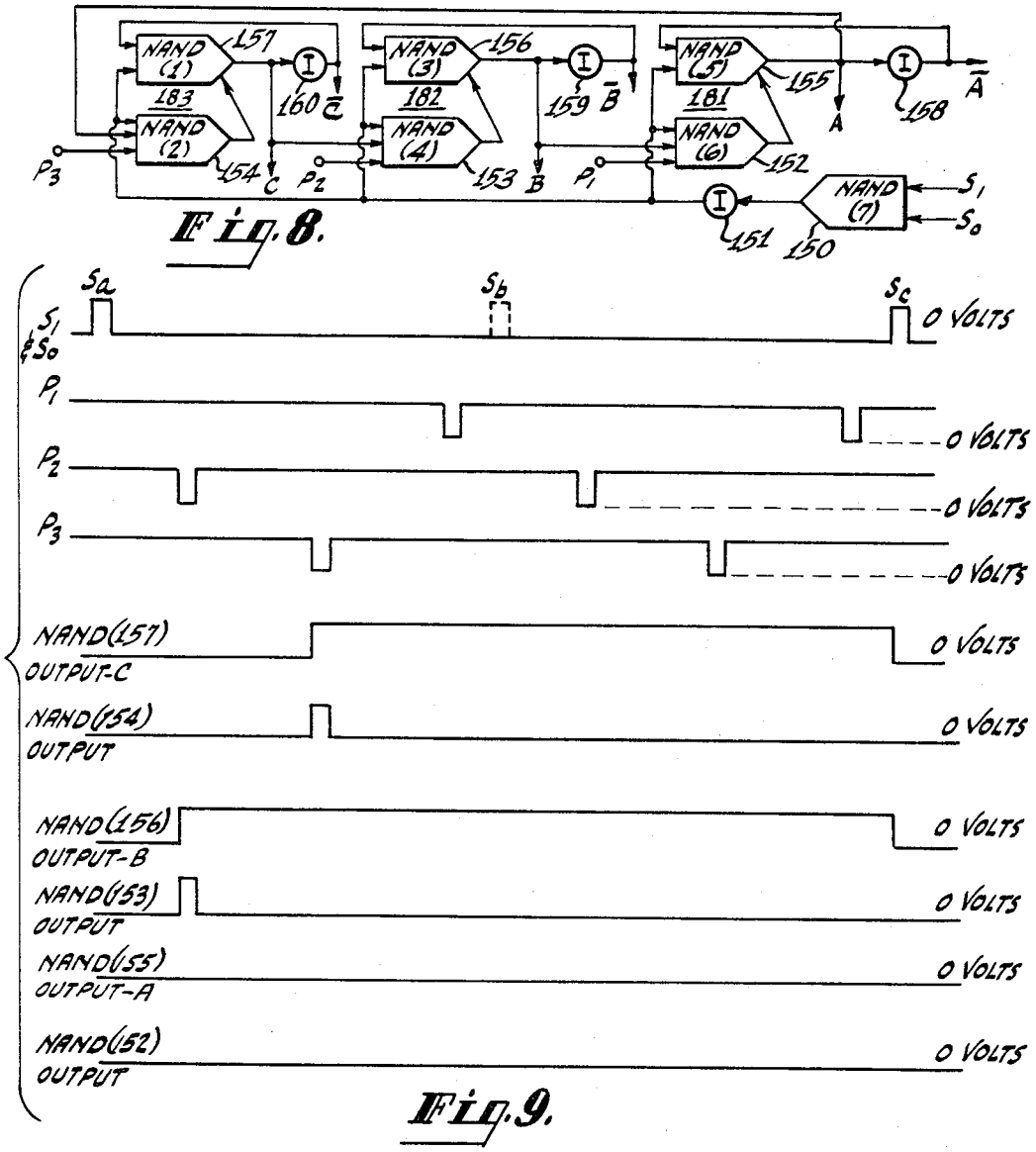
Fig. 8.
Fig. 9.
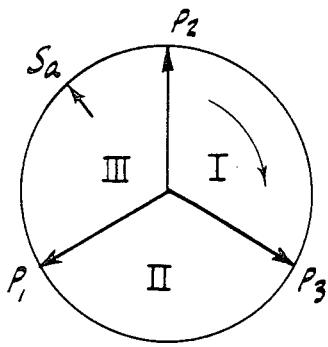
Fig. 10.

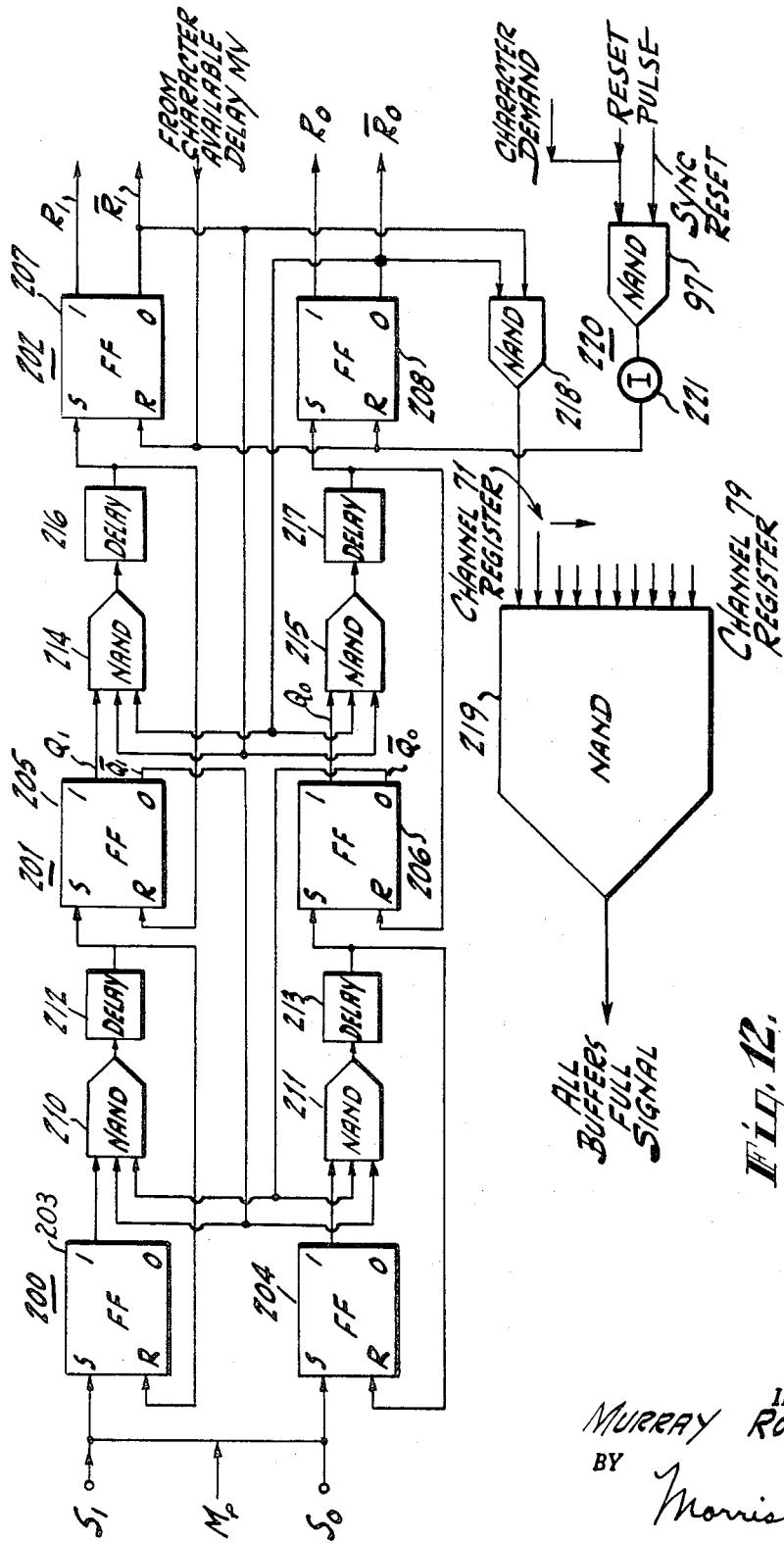

Nov. 26, 1968   M. ROSENBLATT   3,413,448
INFORMATION HANDLING APPARATUS
Filed May 25, 1961                                  20 Sheets-Sheet 9

INVENTOR.
MURRAY ROSENBLATT
BY Morris␣Rabkin
ATTORNEY

Nov. 26, 1968  M. ROSENBLATT  3,413,448
INFORMATION HANDLING APPARATUS
Filed May 25, 1961  20 Sheets-Sheet 10

| GR, | GY, | GZ, | R,Y,Z, 000 | R,Y,Z, 001 | R,Y,Z, 011 | R,Y,Z, 010 | R,Y,Z, 100 | R,Y,Z, 101 | R,Y,Z, 111 | R,Y,Z, 110 |
|---|---|---|---|---|---|---|---|---|---|---|
| 0 | 0 | 0 | 0 | 0 | 0 | 0 | 0 | 0 | 0 | 0 |
| 0 | 0 | 1 | 0 | 1 | 1 | 0 | 0 | 1 | 1 | 0 |
| 0 | 1 | 1 | 0 | 0* | 1 | 0* | 0 | 1* | 1 | 0* |
| 0 | 1 | 0 | 0 | 0 | 1 | 1 | 0 | 0 | 1 | 1 |
| 1 | 0 | 0 | 0 | 0 | 0 | 0 | 1 | 1 | 1 | 1 |
| 1 | 0 | 1 | 0 | 1* | 1* | 0 | 1* | 1 | 1 | 1* |
| 1 | 1 | 1 | 0 | 0 | 1 | 0 | 0 | 1 | 1 | 1 |
| 1 | 1 | 0 | 0 | 0 | 1* | 1* | 0* | 0* | 1 | 1 |

INVENTOR.
MURRAY ROSENBLATT
BY
ATTORNEY

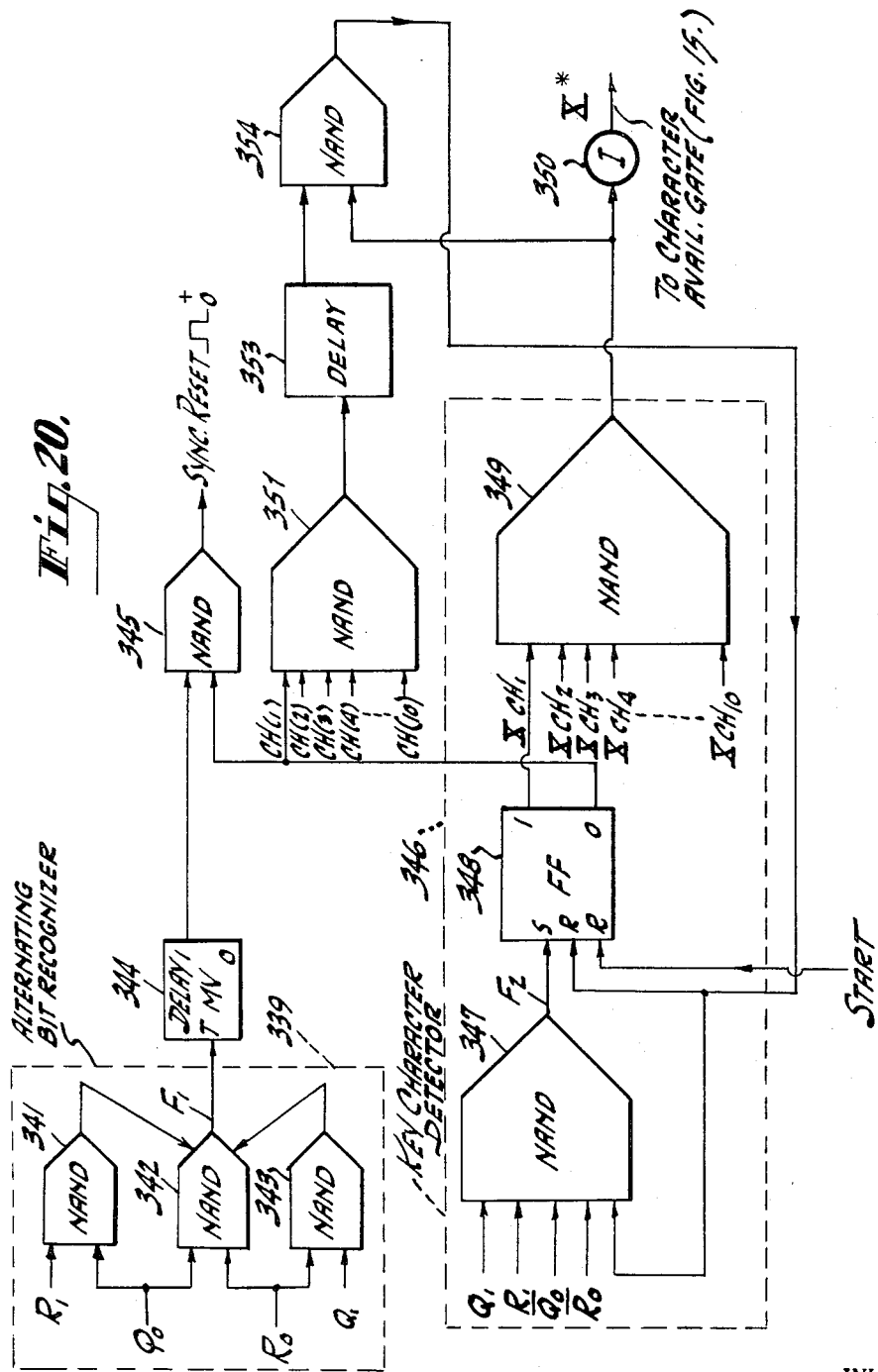

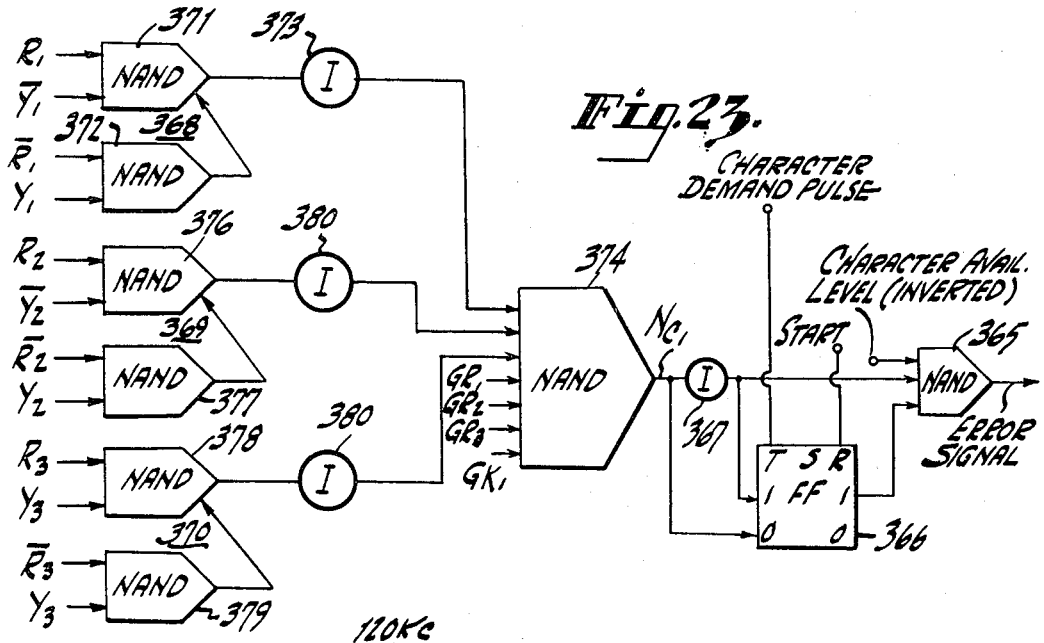

Fig. 29.

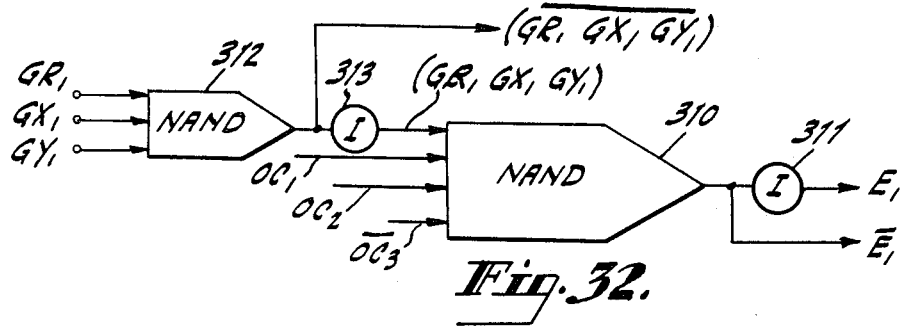
Fig. 32.
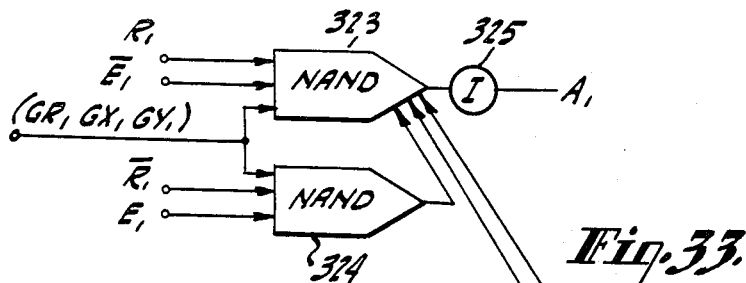
Fig. 33.
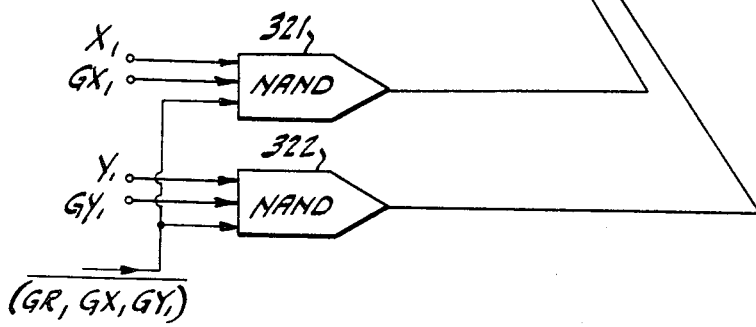

3,413,448
INFORMATION HANDLING APPARATUS
Murray Rosenblatt, Haddonfield, N.J., assignor to Radio Corporation of America, a corporation of Delaware
Filed May 25, 1961, Ser. No. 124,748
32 Claims. (Cl. 235—61.11)

This invention relates to information handling apparatus, and more particularly to a system for recording and reproducing digital information on a magnetic record.

The present invention is especially useful in magnetic tape stations which form a part of an electronic digital computer system. The invention also provides improved components and circuits which are generally useful in digital computing apparatus for correcting errors in information processed by such apparatus, for analyzing digital information and for registering and storing digital information.

A magnetic tape station may provide storage for information which is processed in a digital computer. Modern digital computers are capable of processing data very rapidly. Accordingly, the computer can accept new data at high speed. The speed at which data can be supplied from the tape station to the computer can be increased by increasing the density of information storage on the magnetic tape records handled in the tape station. Tape stations are now in commercial use in which recording densities are in excess of 300 bits per inch. It is desirable to increase recording densities to greater than 1000 bits per inch.

Data is recorded on the magnetic tape records as multi-bit characters which extend laterally across the tape. Each bit is recorded on a separate track. Increased density of recording makes it more difficult to select and segregate the bits belonging to the same characters. Much of this difficulty is caused by mechanical twisting and stretching of the tape as it is reeled at high speed and by displacement of the gaps of reading and writing heads with respect to a true straight line across the tape. The position of the tape at the magnetic head which reads the bits becomes skewed with respect to the position of the tape at the head which recorded the bits from the tape. The bits belonging to the same character are not read in the same time relation in which they are recorded. This bit-to-bit displacement of the bits of a read character is referred to as interchannel time displacement, or simply skew.

Another problem which is especially significant in high density recording of multi-bit characters is known as drop-out. A drop-out is the apparent reduction of recorded signal amplitude or even the complete absence of a bit or bits which were supposedly recorded on the tape. Drop-outs are due to such factors as flaws inherent in the magnetizable material constituting the tape, improper contact between the tape and the magnetic head and noise in amplifiers or other parts of the system. It has been discovered that a single tape flaw or a single case of improper contact can cause the loss of a large number (twenty or more) of bits which are recorded consecutively on a track of a magnetic record.

The presence of drop-outs compounds the problem of correcting skew among the bits of characters which are in closely packed relation on the magnetic record. For example, a skew correction technique has been in use in accordance with which bits read from each of the tracks of a magnetic read are counted. The bits from each track corresponding to the same count are assumed to belong to the same character. In the event of a drop-out in a track providing any of the bits of a character, a bit belonging to a succeeding character is counted as though it was a bit of a preceding character. Accordingly, drop-out would prevent proper operation of a skew compensating s) which functions by counting the bits, since the bits be ing to successive characters would not be properly regated.

Systems for compensating for skew by using an tional clock bit for each character have not been f suitable for eleminating skew among the bits of the acters recorded at high density on a magnetic recor such systems, the bits are stored in the sequence in v they are reproduced from the record. Sufficient tir provided for storage to allow for the maximum time placement among the bits of the same character. A end of such time as is allowed, a clock pulse effect reading of a stored character. If the time which mu allowed before a character is read out of storage is le than half of the time between the reading of succe characters, it becomes impossible to insure separati( characters by this method. Accordingly, it is not al possible with this method in high density recordir assume with reliability that all bits clocked out at a time belong to the same character.

The reliability of a system for recording and r ducing on magnetic records is also degraded unles correct value for the bits of each character whicl missing due to drop-outs can be provided. It is ther necessary to recognize a drop-out in any bit of a char as such, so that error correcting means can pro provide a corrected value of any bit lost due to a drop Accordingly, it is an object of the present inventi provide an improved system for high storage density netic recording of digital information and for the r duction of such information.

It is a further object of the present invention to vide an improved system for recording multi-bit acters in parallel on a multi-track magnetic record.

It is a still further object of the present inventi( provide an improved system for recording and r ducing on a magnetic record wherein the adverse of drop-outs is obviated.

It is a still further object of the present inventi( provide a system for recording multi-bit characte digital information on magnetic records and reprod all of the bits of said characters reliably although a out causes some of said bits to be missing.

It is a still further object of the present inventi( provide an improved system for recording and r ducing multi-bit characters in parallel on a magneti( ord wherein interchannel time displacement amon bits of each character is corrected although the char; are successively recorded at high density.

It is a still further object of the present inventi( provide a system for correcting skew among the b a character of digital information which is repro( from a magnetic record although some of said bits be missing due to drop-out.

It is a still further object of the present inventi( provide a system generally useful for correcting the \ of bits in a multi-bit character of digital inform and which is particularly useful for supplying the of bits in a character reproduced from a magnetic r which are missing due to drop-outs.

Briefly described, a system provided in accordance the invention operates to record the bits of charact( digital information on different tracks of a multi magnetic record as trains of self-clocking pulses in track. Self-clocking pulses are those which can t covered without reference to external timing mea reading channel is supplied for each track for repr ing the recorded pulses. The output of each reading nel is analyzed and the absence of a pulse correspo to a bit of any character is detected. The absence pulse may be due to a drop-out. Pulses which w referred to hereinafter as "renewed" pulses or bits are supplied to replace any pulse or bit in any channel which is absent due to a drop-out. The timing of the pulses reproduced from each channel is therefore maintained despite a drop-out. A register is provided for each channel. These registers operate in a manner to store the bits reproduced by each channel in the sequence in which they are reproduced. The register also operates to store a renewed bit corresponding to a renewed pulse in a manner such that a renewed bit is discernible from a reproduced bit. A criterion for the storage of a complete character in each of the registers is the presence of a stored bit at the output of the registers. The bits corresponding to the same character are read out of the registers simultaneously when the foregoing criterion is satisfied. Any time displacement of skew among the bits of each character is thus corrected, since renewed bits are provided for any drop-outs.

Further in accordance with the invention, an error correcting system is provided for correcting the values of the renewed bits in each character read out of the register. The bits of each character include a plurality of check bits which check the parity of certain combinations of the bits in each character which combinations were recorded with known parity. The error correcting means operates to correct the values of each renewed bit by deriving alternative representations of each renewed bit in terms of the values of the bits in the parity combinations. The corrected value of a renewed bit is obtained by utilizing the representations derived from parity combinations which do not contain other renewed bits. The values of any bit of a character may be corrected in a similar manner.

The present invention also provides an improved method and system for recording bits as trains of pulses. Known systems for recording digital information to be read as trains of self-clocking pulses are subject to improvement, because for the most part, they provide a recording which is not directly related to the values of the bits which are recorded. Accordingly, somewhat complex recording and reproducing techniques are needed in these known systems to encode the bits to provide the trains of pulses for recording or to thereafter decode, the reproduced pulses to obtain the recorded bits, or both.

It is an object of the present invention to provide a simplified system for recording digital information as a self-clocking train of pulses.

It is a still further object of the present invention to provide a system for digital recording wherein a pulse is recorded for each bit and wherein each recorded pulse corresponds directly to the value of the bit which it represents.

In accordance with the invention, the values of successive pairs of bits to be recorded on a track of a magnetic record are first determined and an even number or an odd number of pulses is generated during successive time intervals depending upon whether the bit values are paired in one sense or in an opposite sense. A pair of bits is paired in one sense, if their values are the same, i.e., both bits are binary "1" or are binary "0." That pair of bits is paired in the opposite sense if their values are different, i.e., a binary "1" followed by a binary "0" or vice-versa. The magnitude of the pulse signals which are recorded during each interval is also directly related to the value of one of each of the successive pairs of bits. Each increment or bit cell of the record will then contain at least one pulse signal and the magnitude of this signal will be directly related to the value of the bit which it represents. Since a pulse signal is recorded in each cell along the record the recorded pulse train has the property of being self-clocking.

The timing of signals and the restoration of a prescribed time relationship among received signals is a problem not only in tape file systems for computers and in high density magnetic recording but also, generally, in signalling and control systems. Digital information to the timing of received signals is useful in many c( trol systems, and particularly those control systems wh operate in accordance with digital information. The cording and reproducing system of the present invent solves the problem of restoring the timing of the l of information read from a magnetic record by provid renewed bits in the event of drop-outs.

Accordingly, it is an object of the present invention provide digital information as to the timing of a sigr It is a still further object of the present invention provide digital information as to the relationship betw a pair of repetitive pulse signals.

In accordance with this aspect of the invention first train of pulses is provided which may represen time reference. A plurality of devices are provided, e for registering a separate binary digit in response to ferent pulses in a sequence of successive pulses. S sequences of successive pulses are derived from the 1 pulse train and applied to the registering devices. pulses from a second train of pulses are also applied the registering devices and change the value of one the digits which are registered in these devices. T device in which the value of a registered digit is chan depends upon the relative timing of each pulse in second train of pulses and the pulses in each seque of pulses in the first train of pulses. The values of digits registered by the devices will change with char in the relative timing of the reference pulse train the second pulse train.

In many digital systems, it is necessary to store sig which occur asynchronously. Shift registers are kn which provide for such storage. However, such : registers require special advance pulse generating cir to cause a signal applied to the input stage of the reg to circulate to the final or output stage thereof.

It is an object of the present invention to provic simplified self-circulating shift register which can l large storage capacity for signals which occur async nously.

It is another object of the present invention to vide a plural stage shift register which has the cap; for storing more than two types of pulse signals.

Briefly described, an asynchronous shift register vided by the invention includes a plurality of casc: stages. Succeeding pairs of the stages are interconne by circuits which respond to the storing of signals ir succeeding ones of the pairs and which pass signals 1 the preceding stage to the suceeding stage except wh signal is already stored in the succeeding stage. Thi signal applied to the input of the register will circ: from one stage to the next until it is stored in the ot stage.

Further, in accordance with the invention, each of the register may include a pair of bistable cir( The input stage of the register has a pair of sep inputs to each of its pair of bistable circuits. The stage also has an input common to both of its bis circuits. Signals of three different types can be ap] respectively, to the various inputs and will be regis correspondingly either in one or in both of the pa bistable circuits, depending upon the type of signa In any system for reproducing bits of a messag corded as self-clocking pulses, the pulse representin first bit must not be missing in order that the start c message is properly timed. Thus, if a drop-out occι the start of the message, synchronism in the repr( tion of the characters of that message is lost. This is ticularly a problem in systems for deskewing the b a multi-bit character which are recorded as self-clo pulses. It is necessary that all of the initial bits o message be present after reproduction since timing rections among subsequent bits are measured fror time of occurrence of previously non-missing bits r duced from each track.

It is an object of the present invention to provide an improved sychronizing system for reading self-clocking pulses representing bits of characters constituting a message.

It is an object of the present invention to provide a system which prevents read out of information from a magnetic record unless all of the bits corresponding to some initial synchronizing character have been observed to be present.

Briefly described, a system for synchronizing the reproduction of the characters of a message in accordance with the invention includes a register for storing the bits of a key or synchronizing character having a certain combination of bits. A different bit of this key character is recorded in each track at the beginning of each message. A circuit is provided for recognizing the presence of the bits of the key character stored in the register. This circuit, in the absence of all of the bits of the key character at the beginning of the message, resets the register without reading out the bits stored therein. Accordingly, the message is not reproduced unless the key character is first present. In operation, the magnetic tape may have a number of key characters at the beginning of each message since the possibility of a drop-out occurring in more than one key character is remote. The circuit attempts to synchronize on each key character in turn until successful.

Another system is provided by the invention for recording and reproducing multi-bit characters on a magnetic record. In a known system for recording multi-bit characters each bit is recorded twice. Duplicate sets of bits are recorded in parallel on the record. If, during reproduction, any bit is absent due to a drop-out, its duplicate is used. This system is however not effective where the duplicate reproduced bits do not agree because of an error which might occur either in recording or in reproduction. In accordance with this aspect of the invention, a duplicate bit recording system is improved so that both drop-outs and errors can be handled effectively.

It is therefore an object of the present invention to provide an improved system utilizing the features of duplicate bit recording.

It is a further object of the present invention to provide a simplified system for recording digital information on a magnetic record with high density.

Briefly described, the invention provides two recording and reproducing channels for each bit of a character of digital information. Other recording and reproducing channels are provided for check bits which independently check the parity of the bits applied to each of a first of these recording channels and each of the second of these channels. A matrix of shift registers may be provided for eliminating the effects of skew among all of the bits corresponding to the same character, as was the case in the system described above. Parity checkers are provided at the output of the registers for independently checking the parity of the bits reproduced in the first reproducing channel and in the second reproducing channel. The bits from all of the first or the second reading channels which have correct parity are read out of the register. These bits will not be missing because of drop-outs and also the possibility of the erroneous bits is remote because the bits have correct parity. Thus, the system is capable of writing and reading digital information with a high degree of reliability despite drop-outs or errors.

The invention itself, both as to its organization and method of operation as well as the foregoing and other objects and advantages thereof, will become more readily apparent from a reading of the following description in connection with the accompanying drawings in which:

FIGURE 2 is a block diagram of a system in accordance with the invention for reproducing digital information recorded on a magnetic record with the recording system illustrated in FIG. 1;

FIGURE 3a is a diagram of a gate circuit which is used in the systems of the present invention;

FIGURE 3b is a table illustrating the operation of the gate circuit shown in FIGURE 3a;

FIGURE 6 is a block diagram of the clock track reading circuit and three-phase pulse generator which forms part of the reproducing system shown in FIG. 2;

FIGURE 6a is a block diagram of a reading channel in accordance with the invention for a system for reproducing digital information recorded on a magnetic tape without the benefit of a clock track recorded thereon;

FIGURE 6b is a detailed block diagram of part of FIG. 6;

FIGURE 8 is a block diagram of a signal-timing analizing circuit which forms part of the missing bit detection and renewed bit insertion circuit of the magnetic record reproducing system illustrated in FIG. 2;

FIGURE 9 is a timing chart illustrating the operation of the circuit shown in FIG. 8;

FIGURE 10 is a timing diagram which also illustrates the operation of the system shown in FIG. 8 and which will aid in an understanding of the operation of the system shown in FIG. 11;

FIGURE 12 is a block diagram of an asynchronous shift register which forms part of the deskew buffers of the system shown in FIG. 2;

FIGURE 20 is a block diagram of parts of the start block character detector shown in FIG. 2;

FIGURE 23 is a detailed diagram of another circuit of the two sequential errors detector;

FIGURE 24 is a block diagram showing in detail one recording channel of the system for recording digital information on a magnetic record which is illustrated in FIG. 1;

FIGURE 24a is a block diagram of input circuitry for the recording system illustrated in FIG. 2;

FIGURE 29 is an overall block diagram of an error correction system provided in accordance with another embodiment of the invention;

FIGURE 32 is a block diagram of an error detection circuit included in the system illustrated in FIG. 29; and FIGURE 33 is a block diagram of an error correction circuit included in the system illustrated in FIG. 29.

WRITING SYSTEM

Figure 1:
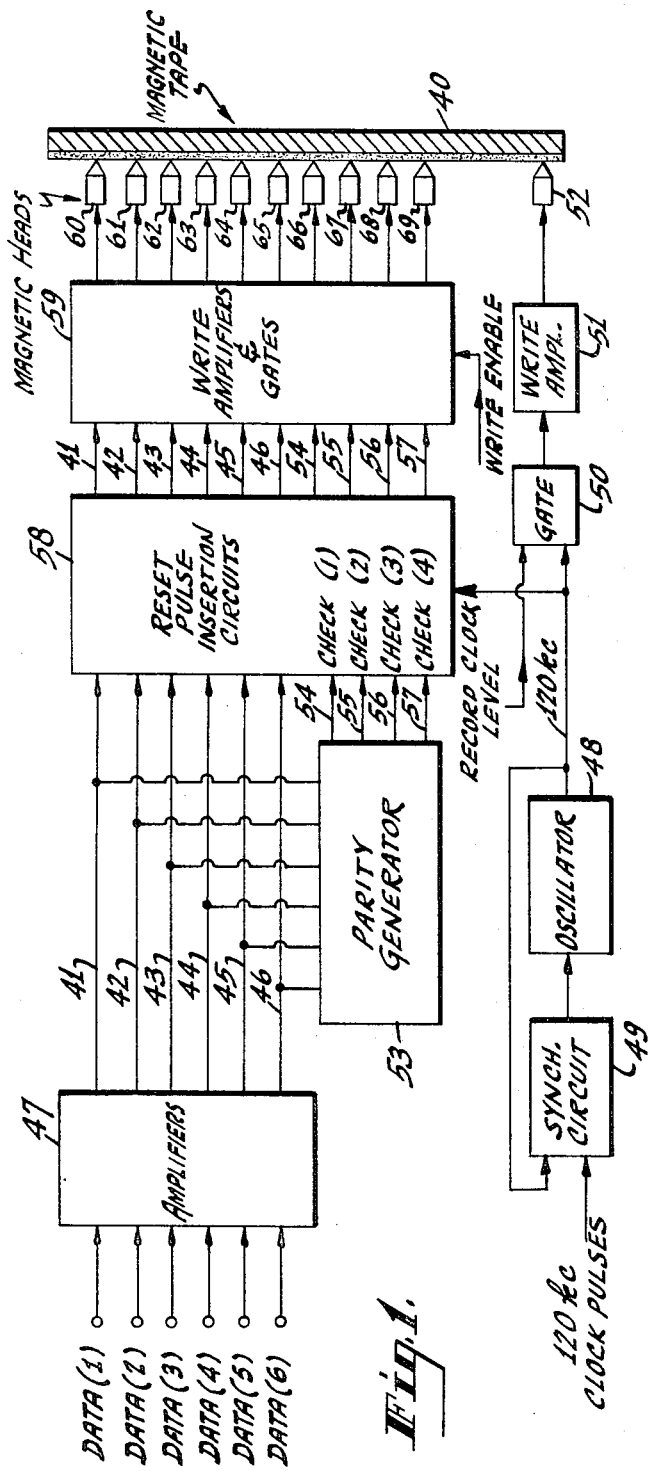
FIGURE 1 is a block diagram of a system in accordance with the invention for recording multi-bit characters of digital information on a magnetic record.

Referring more particularly to FIG. 1 of the drawings, inputs for six data bits are shown. Six data bits constitute a character of digital information to be recorded on and reproduced from a magnetic record, such as a magnetic tape 40, by the recording and reproducing system which will be described to illustrate the invention. Multi-bit characters of any number of binary digits may be recorded or reproduced in accordance with the invention. The recording system includes six recording channels 41–46 for the data bits. These recording channels include amplifiers 47 which separately amplify the data bits and improve their waveform.

A clock pulse channel is also provided. This channel includes an oscillator 48 which provides a train of timing pulses at, for example, 120 kc. (kilocycles per second). This oscillator may be a free running multivibrator, the frequency of which is controllable by a signal level applied to an input thereof in any known manner. This level is supplied by a frequency control circuit including a synchronizing circuit 49. The synchronizing circuit 49 may be any known circuit for comparing the frequency of two trains of pulses. The output of the oscillator 48 is connected to an input of the synchronizing circuit to provide one of these trains of pulses. The other of these two trains of pulses may be provided by the computer which is associated with the illustrated apparatus, or from a track which was prerecorded on the tape 40. Thus, the frequency of the oscillator 48 is adjusted about its nominal frequency of 120 kc. to be exactly the frequency of the clock pulses applied to the synchronizing circuit 49.

The clock pulse recording channel includes a gate 50 which has its inputs connected to the oscillator 48 and to a source providing a signal level for enabling the recording of the clock pulses. This level may be obtained from a voltage source operated by a control on the control panel of the tape station or from an associated computer. The output of the gate 50 is applied to a write amplifier 51. This amplifier is a known pulse recording amplifier which amplifies the gate 50 output and provides a train of clock pulses for recording on the tape 40. The amplifier 51 drives a magnetic head 52 which records the clock pulses on the clock track on the tape 40.

The data bits are transmitted by the recording channels 41–46 and are applied to a parity generator 53. The parity generator 53 will be described in greater detail hereinafter in connection with FIG. 24 of the drawings. It produces four check bits and supplies these check bits to check bit recording channels 54–57. Each check bit is provided for a unique combination or group of the data bits. Each data bit is common to at least two of these combinations. Thus, for example, a first check bit (1) is provided for data bits (1), (2), and (3), and a second check bit (2) is provided for data bits (1), (4), and (5). The combinations and groups are used for error correction purposes in accordance with the invention. The check bits which are fed into the recording channels have values such that the parity of each combination of bits including the check bit pertaining to it is the same as each other combination.

The data and check bits are recorded on each track of the magnetic tape 40 as trains of self-clocking pulses. Reset pulse insertion circuits 58 are provided to transform the signal levels representing the bits transmitted along each of the recording channels 41–46 and 54–57 into trains of self-clocking pulses. Each recording channel includes a reset pulse insertion circuit. The circuits 58 will be described in detail hereinafter in connection with FIG. 24 of the drawings. The clock pulses from the clock pulse recording channel are also applied to the reset pulse insertion circuits. The reset pulse insertion circuits include bistable stages for storing successive pairs of the bits transmitted by each of the recording channels for a period equal to the interval between successive clock pulses. Depending upon the values of the bits in storage, a single pulse or a pair of pulses is provided during each clock pulse interval. The second pulse of a pair of pulses provided during the same clock pulse interval is the reset pulse. When, for example, the binary values of a successive pair of bits are paired in one sense for example, both bits are not alike (complements of each other), a single pulse of a magnitude which is either relatively high or relatively low is generated during a clock pulse interval. If the bits are paired in the opposite sense, for example, both bits are alike (not complements), a pair of pulses of different magnitudes is provided during the clock pulse interval. The sequence in which these paired pulses appear depends upon the binary value represented by the first bit in each of the successive pairs of like bits. Since at least one pulse is provided during each clock pulse interval to represent individual, successive bits in each of the recording channels 41–46 and 54–57, the trains of pulses transmitted for recording on the tape will be self-clocking.

Each recording channel includes a write (recording) amplifier and a gate. These write amplifiers and gates 59 are connected to the outputs of the reset pulse insertion circuits 58 which supply trains of pulses into the recording channels 41–46 and 54–57. The gates included with the write amplifiers are enabled by a write enable level obtainable internally or from an associated computer or device which provides the data to be recorded. The write amplifiers individually drive a multiplicity of magnetic heads 60–69 and record a multiplicity of parallel tracks on the magnetic tape 40.

Since pulses corresponding to the bits belonging to the same character are generated during the same clock interval, they are recorded simultaneously in parallel on the different record tracks. The magnetic heads 60–69 and 52 are desirably incorporated in a unitary magnetic head assembly of the type which is known as a multi-track magnetic head. The heads 60–69 and 52 constitute separate cores of the multi-track head. These cores include signal gaps. The signal gaps may all be in line. Accordingly, the bits belonging to the same character are recorded along the same line which is desirably perpendicular to the edges of the magnetic tape, when the magnetic tape travels along a path transverse to the line coincident with the gaps of the head.

The heads 60–69 and the head 52 which records the clock track may be used also for reproducing the pulses recorded on the parallel tracks on the tape record 40. Due to mechanical twisting of the tape as it is guided in the tape transport mechanism and also due to possible incremental stretching of the tape, the line of recorded signals may not be exactly aligned with the signal gaps of the multi-track head during reproduction. This is a form of skew. Such skewing of the tape will result in the reproduction of bits belonging to the same character at different times. This effect is also referred to as inter-channel time displacement.

It is not practical because of mechanical tolerances which exist in any known tape transport system to completely eliminate skew of the tape by mechanical means. Accordingly, electrical means as described hereinafter are provided in the system which correct for skew of the signals reproduced from the tracks.

Due to flaws in the tape, noise, improper head-to-tape pressure and the like, drop-outs can occur which cause some of the pulses recorded on the tape to be missing after reproduction. Drop-outs disrupt the timing of the self-clocking pulses which are read from the tracks. The system includes means for maintaining timing of the pulses reproduced from each track despite drop-outs.

READING SYSTEM

A reading system in accordance with the invention is shown in FIG. 2 of the drawings. The magnetic heads 52 and 60–69 scan the multiplicity of record tracks on the magnetic tape 40. These heads supply pulses to reproducing channels 70–80 for the data and clock tracks. The head 52 reads the clock track and supplies clock pulses to the clock pulse reproducing channel 80. The data reproducing channels include reading amplifiers and reset pulse rejection circuits 81. A separate amplifier and rejection circuit is provided for each data and check bit reproducing channels 70–79. These circuits amplify the pulses from each of the tracks and reject the reset pulses. The reset pulses are the second of the pairs of pulses which at times are recorded in individual bit cells on the tape when successive pairs of bits have like binary values. Enable signal levels are supplied to the amplifiers and pulse rejection circuit 81 by way of a cable 82. The circuits 81 are inhibited and do not pass pulses until enabled by a lever of proper voltage. Enable levels are normally applied to maintain the reproducing or reading channels open. However, as will be explained in detail hereinafter, when an error is detected which cannot be corrected with the apparatus of the system, signals are applied over the cable 82 to inhibit the passage of pulses through any of the reading channels.

The clock pulses from the clock track channel 80 are amplified and shaped in an amplifier 83 and are applied to synchronize an oscillator circuit 84. These clock pulses are used as timing signals in the system illustrated herein, rather than to clock-out the data read from the tape as is usually the case in known digital tape systems. The oscillator 84 may be included in the oscillator 48 or comprise a portion thereof. The circuit of the oscillator normally maintains a nominal output frequency. The frequency of the oscillator 84 may be caused to vary from its nominal frequency by a control or synchronizing signal which may be the train of clock pulses applied thereto. However, if the clock pulses are absent due to drop-out in the clock pulse track, the oscillator circuit will slowly drift back to its nominal frequency of oscillation. The nominal frequency is related to the frequency (repetition rate) of the clock pulses read from the tape. Accordingly, dropouts in the clock pulse track will not adversely affect the timing of the system. The oscillator circuit 84, therefore, is useful as a reference timing source. In this application the oscillator operates at a nominal frequency of three times the frequency of the recorded clock pulses or 360 kc.

The oscillator circuit drives a three phase pulse generator 85. This generator produces three separate pulses in sequence from each of three successive cycles of the signals generated by the oscillator circuit 84. For example, the oscillator circuit 84 may provide signals at 360 kc., each of the three separate pulses from the three phase pulse generator will be at a repetition rate of 120 kc. During recording one of these separate pulses may be used to provide 120 kc. pulses for recording the clock track. The separate pulses provided by the three pulse generators constitute reference signals having discrete time intervals therebetween.

These reference pulses from oscillator 85 are applied to missing bit detection and renewed bit insertion circuits 86. Ten separate bit detection and insertion circuits 86 are provided, one for each of the ten reading channels 70–79. A cable 87 connects the outputs of each of the ten reset pulse rejection circuits 81 to the missing bit detection circuits 86. When a recorded bit is not reproduced, one of the reference pulses from the three phase pulse generator 85 is transmitted by the circuit 86 to a cable 88.

The cable 88 and another cable 89 are connected to the input stages of a matrix of asynchronous shift registers which provide the deskew buffers 90. The cable 89 carries pulses from each of the reading channels 70–79. After rejection of the reset pulses, the reproduced pulses from the tape are fed into the input stages of the deskew buffers. In the event that any of the pulses read from the different tracks on the tape is absent, a renewed pulse is fed into the input stage of the appropriate buffer in proper time sequence to replace the pulse which was absent. The input stages of the deskew buffers are designated in the drawing as stages A. The deskew buffers may have a plurality of stages. Only three stages A, B, and C are shown in the drawings. Other stages may be inserted between the stages A and B, if necessary to provide additional storage. It should be pointed out that the bits which are appplied to the input of the stages A of the buffers are in the form of pulses, although they are stored therein as voltage levels.

Each stage of the deskew buffers stores bits representing a binary "one," a binary "zero" and a renewed bit as different stable states or conditions thereof. The buffers operate asynchronously and advance the bits applied to the input stages A thereof to the output stages C thereof. The bits supplied by each of the reading channels are stored sequentially and asynchronously in the buffers in the order in which they are read from the tape. The bits belonging to the same character will be assembled when the output stages C are all full, representing either binary "one" bits, binary "zero" bits or renewed bits. Thus, the criterion for the correction and elimination of interchannel time displacement, is the filling of the output stages of the buffers.

Error correction circuits 91 are provided for supplying the correct value of any renewed bits and also for correcting the value of any erroneous data bits supplied by the output stages C of the buffer. These error correction circuits operate by first recognizing those combinations of recorded check and data bits recorded with the same parity and then using these combinations for supplying the correct value of a renewed bit, or of any bit which is incorrectly read from the tape by the circuitry in any of the reading channels. When the output stages C of the buffers 90 are full, a level is supplied on a line 92 indicating that the buffers are full. The error correction circuits 91 then correct the values of the bits which are supplied thereto from the output stages C over a cable 93. The output of the error correction circuits is a cable 94 including six lines, each of which supplies a different data bit. After the error correction circuits provide a corrected character, a character available level is supplied on a character available line 95. The computer or other apparatus which receives the data from the tape file responds to the character available level and generates a character demand pulse which is supplied to a line 96. This pulse is applied to a gate 97 which performs the logical OR function. The output of the gate 97 is connected to the last stages C of the deskew buffers 90 and resets these last stages. Accordingly, the bits which are stored in the preceding stages B advance to the last stages. When these bits are assembled in the last stages, they are supplied to the error correction circuits, and the next successive character can be read out of the system. Alternatively, the character demand pulse may be generated internally of the tape file, for example, by a delay circuit operated by the character available pulse.

The amplifiers and reset rejection circuits 81 are also connected by way of another cable 99 to reset pulse synchronizing circuits 101. The pulse next read from the tape after a drop-out may be a data pulse or a reset pulse. The circuits 101 inhibit the amplifiers and reset pulse rejection circuits until such time after a drop-out that only data pulses are definitely known to appear at the output of the reset pulse rejection circuit 81. When a drop-out occurs in any track, a renewed pulse is generated by the missing bit detection and insertion circuits 86. This renewed pulse is fed by way of the cable 88 and a branch 100 of that cable 88 to the reset pulse synchronizing circuits 101. The reset pulse synchronizing circuits 101 apply levels on leads in a cable 102 for inhibiting the channels in which absent pulses occur. The cable 102 connects to an adding circuit 103. This adding circuit 103 may include gates which in essence perform the logical OR function and have their outputs connected to the enable-signal cable 82. The inhibiting signal is, therefore, passed along one of the leads in the cable 82 and applied to the corresponding one of the amplifiers and reset pulse rejection circuits 81 for the reading channel which reads the track having the drop-out. The signal is effective to inhibit the further transmission of reproduced pulses from the channel until a certain sequence of reproduced pulses is applied to the reset pulse synchronizing circuits.

After a drop-out, the reset pulse rejection circuits 81 may not be properly synchronized. Accordingly, they may recognize a reset pulse as representing a bit of recorded information. It has been found, in accordance with the invention, that the reset pulse rejection circuits will again be synchronized when a sequence of pulses representing bits of alternating value are read from the track. The reset pulse synchronizing circuits 101 include circuits which respond to the values of sequences of bits read from each track on the tape. When a proper sequence of bits of alternating value occur after the occurrence of a renewed pulse, the proper signal level is applied to again enable that recording channel in which a pulse was lost due to drop-out.

Since it is possible that some messages recorded on the tape may include a long sequence of bits of the same value on the same track, it will be desirable to provide circuits in the recording system for changing the value of certain bits in accordance with a code. This technique is referred to as scrambling. Thus, for example, the value of every fourth bit recorded on each track may be inverted. In the reproducing system a circuit may be provided for recognizing every fourth bit and for reinverting the value thereof. In this way, resynchronizing of the reset pulse rejection circuits after a drop-out can be accomplished within a short time although a long sequence of bits of the same value are to be recorded in the same track.

Since timing of the characters of any message is measured from the first character of that message, certain key characters are recorded in a start block at the beginning of each message. A start block character detector 104 is provided for detecting these key characters. The start block first includes successive characters constituted of bits all of one value followed by bits all of opposite value. The start block then has a pair of characters having bits of the same value. For example, the bits of the first, third and fifth characters in the start block may be all "zeroes," while the bits of the second and fourth characters may be all "ones." The sixth and seventh characters may each be constituted of all "ones." The latter are referred to hereinafter as "key" characters. Another sequence of successive characters having bits which are alternately of opposite value and a successive pair of key characters which include bits all of which are of the same value (e.g., "ones") may follow the first-mentioned sequence of characters. In the event of drop-out in any of the tracks, the reset pulse synchronizing circuits 101 will be supplied with bits which alternate in value from the first few characters in the start block so that the reset pulse rejection circuits may be synchronized by the reset pulse synchronizing circuits 101.

The characters in the start block are successively stored in the stages B and C of the deskew suffers 90. The start block character detector recognizes whether or not the stages C and B of the deskew buffers each have a bit representing a binary "one" stored therein. Unless such a bit is present, a reset pulse is generated and supplied to a line 105 which is connected to an input of the gate 97. This reset pulse is transmitted by the gate 97 and serves to reset the last stages C of the deskew buffers 90. Thus, the deskew buffers will be continuously reset until the key characters are stored therein. When the key characters are stored therein, the system is synchronized, the amplifiers and reset pulse rejection circuits are enabled and readout of the characters representing the recorded data may be initiated.

An error detector 106 is connected to the output stages C of the deskew buffers and to the error correction circuits 91. Six circuits of the error detector are provided for detecting instances where the value of the data bits at the output stages C of the deskew buffers 90 do not correspond to the values of the corrected data bits at the output of the error correction circuits. Four circuits in the error detector are provided for detecting errors in the check bits stored in the output stages C in the deskew buffers 90. It is assumed that a failure has occurred in the system when a reading channel provides two erroneous output bits in sequence. If the bits at the output stages of the deskew buffers do not agree with their corrected values twice in succession, error signals are provided which are applied to the adding circuit 103 by way of a cable 107. When an error signal occurs for any channel, a signal is applied over the lead in the cable 82, which is connected to the amplifiers and reset pulse rejection circuits 81 for that channel, and the transfer of the pulses through that channel is inhibited. A visual indication may also be provided by means of an indicator when two channels are inhibited so that the machine operator may shut down the tape station and determine the cause of the repetition of an error.

Other apparatus may be provided to supply enable signals to inhibit any or all of the reading channels 70–79. These circuits may be provided for detecting other special characters recorded on the tape which indicate for example a flaw in the tape. Others of the special characters may be recorded to instruct the tape station to skip certain portions of the information recorded on the tape. Special character detectors similar to the start block character detector may be provided which generate levels and which are connected to the adding circuit 103. The levels will then be applied via the cable 82 to inhibit the channels as previously described.

LOGICAL ELEMENTS AND FLIP-FLOPS

Figure 26:
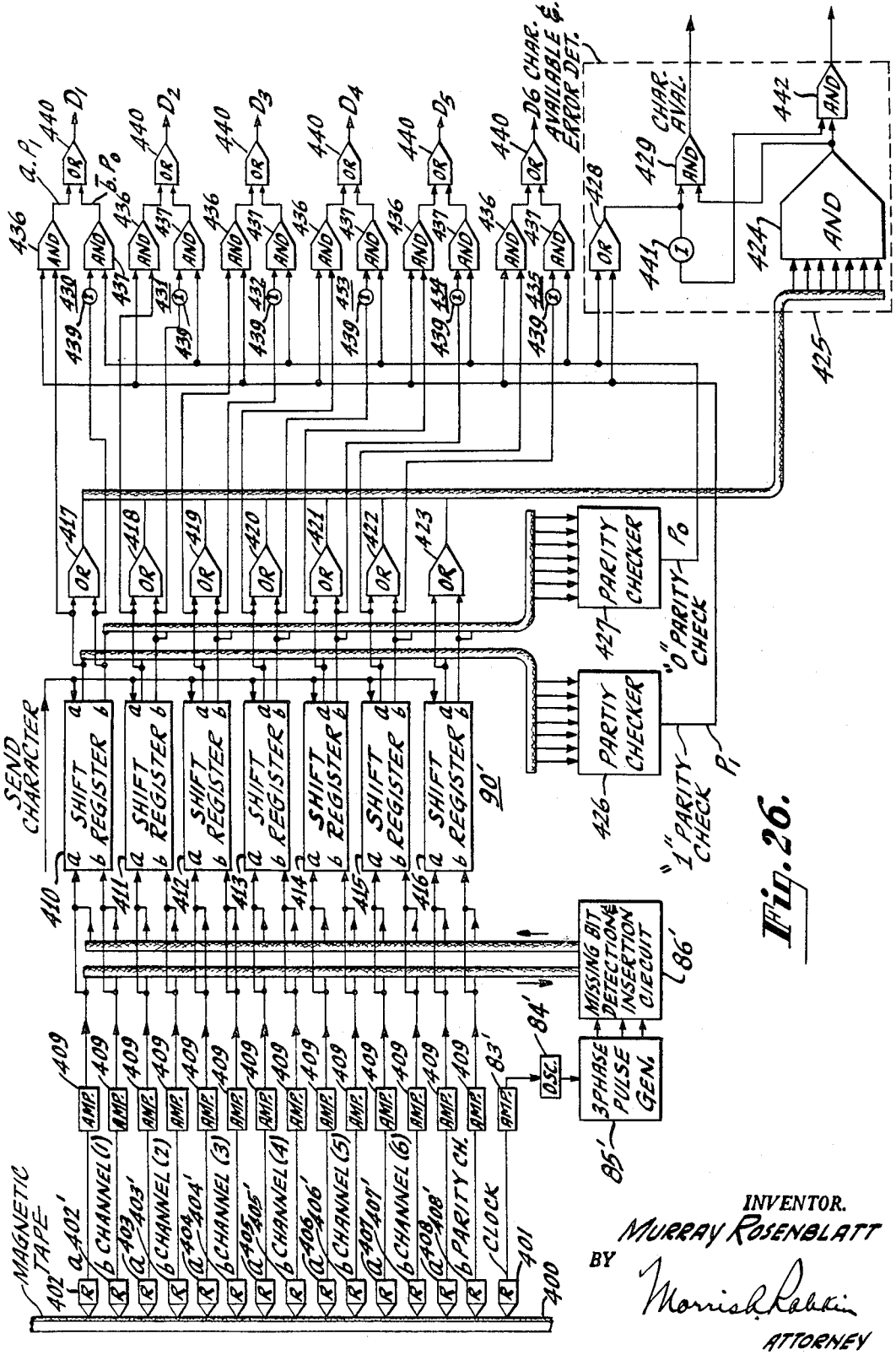
FIGURE 26 is a block diagram of a system provided in accordance with another embodiment of the invention for reproducing the bits of a multibit character recorded on a magnetic record.
Figure 27:
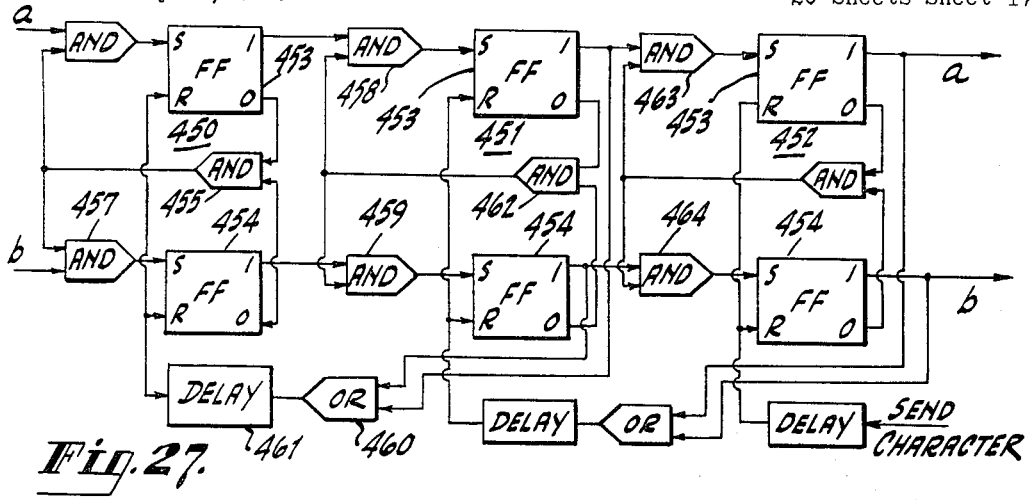
FIGURE 27 is a block diagram of an additional embodiment of an asynchronous shift register in accordance with the invention.

The foregoing system for reading from and writing on magnetic tape may be implemented by logic circuits which include gates and flip-flops. The basic logical element is a "NAND" gate. "NAND" is an abbreviation for "not-and" and stands for the logical operation of negation of an AND operation. This gate is the building block from which the flip-flop can be formed. Some of the logic circuits shown herein, notably those of FIGS. 26 and 27, are shown for simplicity sake as OR and AND gates, rather than NAND gates.

The symbol for a NAND gate is illustrated in FIG. 3a. The truth table for this gate is illustrated in FIG. 3b. The NAND gate of FIG. 3a has two inputs A and B and an output C and performs the logical operation expressed by the Boolean equation, $C = \overline{A} \cdot \overline{B}$. Voltage levels which represent the input and output bit signals A, B and C of the gate are shown next to these respective inputs and outputs in FIG. 3a. The negative signal rule is followed in the logic circuits using NAND gates. In accordance with this rule, a relatively low voltage level represents a binary "one" bit signal and a relatively high voltage level represents a binary "zero" bit signal. These voltage levels are designated as n and p, since the high level is positive with respect to the low level and the low level is negative with respect to the high level. By way of example, the p level may be above +6 (six) volts and the n level may be 0 (zero) volts.

Figure 21A:
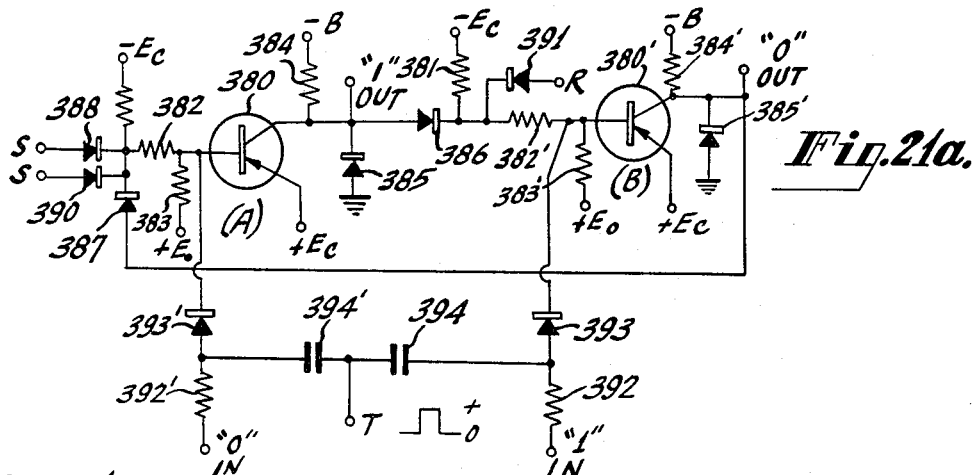
FIGURE 21a is a schematic diagram of the triggerable flip-flop which forms part of the circuit illustrated in FIG. 21.

A pair of NAND gates combined with each other and with a steering circuit to form a triggerable flip-flop are shown in FIG. 21a. The NAND gate which forms one side, side A, of the flip-flop includes a plurality of diodes 387, 388 and 390, a P-N-P transistor 380, a biasing circuit including three resistors 381, 382 and 383, a collector resistor 384, and a clamping diode 385. Operating voltage from a source thereof, indicated as —B, and biasing voltages —$E_c$, +$E_o$ and +$E_c$ are applied to the biasing circuit and the emitter of the transistor. These biasing voltages may be derived from a source having a common return such as ground.

When binary "one" bit signals are applied to the anodes of all the diodes 387, 388, 390 the base of the transistor becomes negative with respect to its emitter and the transistor conducts. The collector then goes positive. The output of the gate is taken at the collector. This output will represent a binary "zero" bit. If binary "zero" bit signals are applied to any of the diodes 387, 388, 390 anodes, the base of the transistor will be positive with respect to its emitter so that the transistor is non-conductive. The collector voltage will then be zero volts since the collector is clamped to ground. A binary "one" bit is then represented by the output voltage of the gate.

The flip-flop shown in FIG. 21a includes two identical NAND gates. The above described gate constitutes side (A) of the flip-flop and another gate constitutes side (B) thereof. The parts of the side (B) gate are designated with reference numerals like those of side (A), but with primes appended to these numerals.

The sides (A) and (B) are cross-coupled by means of diodes 386 and 387. These diodes 386 and 387, respectively, connect the collectors of the transistors of one side (A) or (B) to the base biasing circuits of opposite sides (B) or (A) of the flip-flop.

The set input terminals, two of which are shown, are connected by means of the diodes 388 and 390 to the base of the transistor 380 through the resistor 382. As many set input terminals as are required may be provided. Each additional set input terminal requires an additional diode.

The reset input terminal is also connected through a diode 391 to the base of the transistor 380' by way of the resistor 382'. The "1" output terminal is connected to the collector of the transistor 380. The "0" output terminal is connected to the collector of the transistor 380'.

A triggering circuit is connected to the bases of the transistors 380 and 380'. This triggering circuit serves to advance bits signals applied to the "1" and "0" input terminals into the flip-flop circuit for storage therein. A resistor 392 and diode 393 are connected between the "1" input terminal and the base of the transistor 380'. A resistor 392' and a diode 393' which are identical to the resistor 392 and diode 393 are connected between the "0" input terminal and the emitter of the transistor 380. The trigger input terminal T is connected through capacitors 394 and 394' to the bases of the transistors 380' and 380, respectively, by way of the diodes 393 and 393'.

When a set input positive pulse is applied to the set input terminal S, the voltage at the base of the transistor 380 becomes positive. This causes the transistor 380 to be non-conductive. A current path is then established from ground through the clamping diode 385 and collector load resistor 384 to the source of operating voltage —B. The voltage at the collector of the transistor 380 is clamped by the diode 385 to about zero volts. The "1" output of the flip-flop therefore is a relatively low voltage of about zero volts, when the flip-flop is set.

The cross-coupling diode 386 is non-conducting when the transistor 380 is non-conductive, since the potential at the diode 386 anode is lower than its cathode potential established by the base biasing circuit for the transistor 380'. The transistor 380' is in its normally conductive state when the flip-flop is set. A positive voltage is developed across the collector load resistor 384' measured from the collector to the source of operating voltage —B. This positive voltage causes the cross-coupling diode 387 to conduct such that a sufficiently positive voltage is maintained on the base of the transistor 380' on the first side (A) of the flip-flop to render that transistor non-conducting. The "0" output terminal of the flip-flop is at positive voltage level when the circuit is in its set condition. When a positive reset pulse is applied to the reset terminal R the states of conduction of the circuit reverse. The "0" output terminal returns to about zero voltage level and the "1" output terminal rises to a positive level. From the foregoing, it is apparent that when the flip-flop is set the voltage level at its "1" output represents a binary "one" bit and the voltage level at its "0" output represents a binary "zero" bit. When the flip-flop is reset, a binary "zero" bit is represented at the "1" output and a binary "one" bit at the "0" output.

The triggering circuit senses the voltage at the bases of the transistors 380 and 380'. If the flip-flop is set a relatively high voltage will be applied to the cathode of the diode 393' and relatively low voltage will be applied to the cathode of the other diode 393. When a binary "one" bit signal (n voltage) and binary "zero" bit signal (p voltage) appear at the "1" and "0" input terminals, respectively, the diodes 393 and 393' will not conduct. The positive edge of a trigger pulse applied to the T input, therefore, does not reach the transistors 380 and 380' and the flip-flop remains in its set condition of operation. This effectively transfers or advances "one" and "zero" bits appearing, respectively, at the inputs to the "1" and "0" outputs of flip-flop circuit, since "one" and "zero" bits signals appear at these "1" and "0" outputs after the trigger pulse is applied to the T input. If a "zero" bit signal (n voltage) is appleid to the "1" input and a "one" bit signal (p voltage) is applied to the "0" input, the diode 393 will be biased in the forward direction. Thus, the positive edge of the trigger pulse will be transmitted by the capacitor 394 and the diode 393 and causes the transistor 380' to cut off. This resets the flip-flop. A "zero" bit signal will then appear at the "1" output of the flip-flop and a "one" bit will then appear at the "0" output. Thus, the bits appearing at the inputs "1" and "0" are advanced respectively to the "1" and "0" outputs of the flip-flop circuit. The flip-flop operates in a similar manner in cases where it is initially reset, rather than set.

WRITING CIRCUITS

Figure 25:
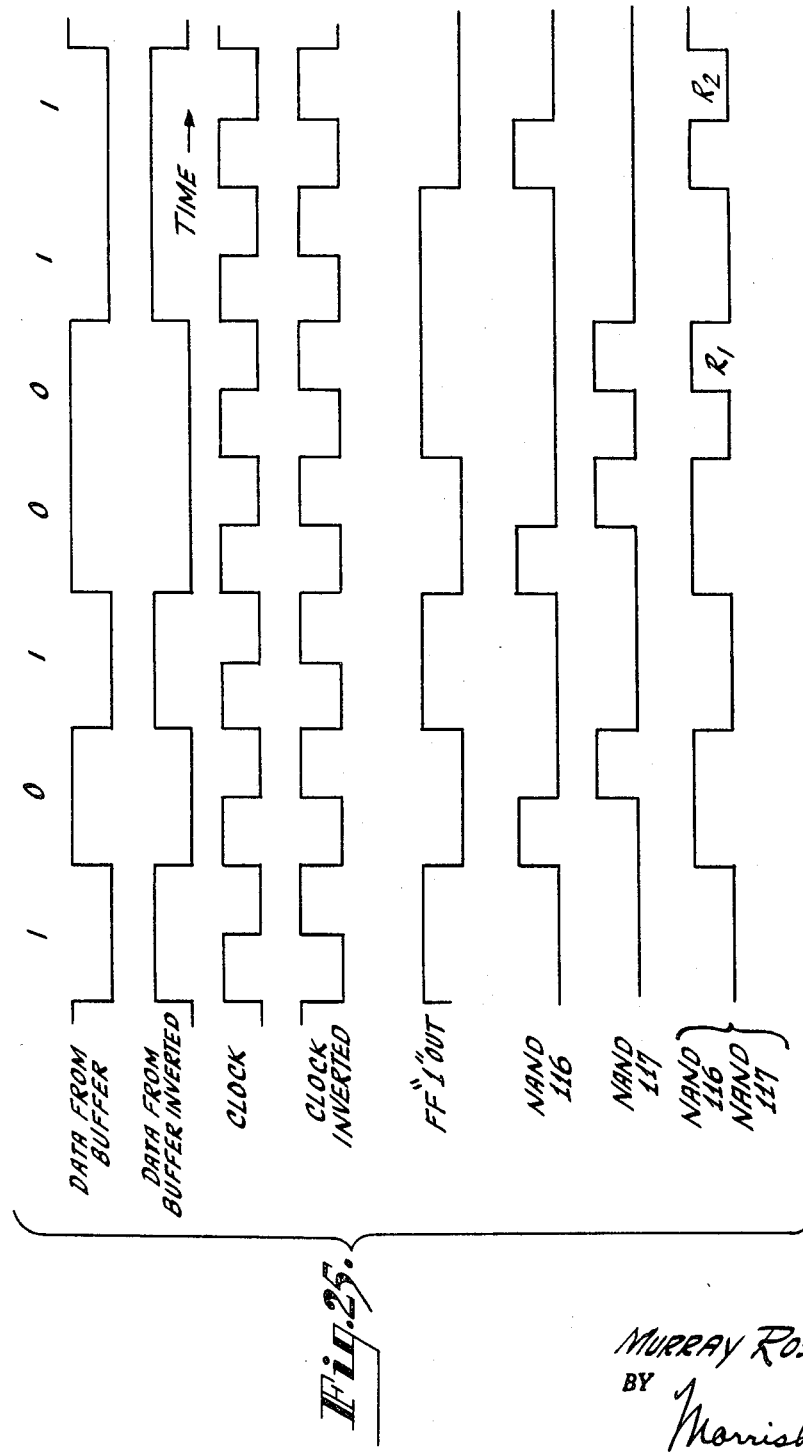
FIGURE 25 is a timing chart illustrating the operation of the system shown in FIG. 24.

The system for recording or writing the bits of a binary character onto the tracks of the magnetic tape record 40 will be better understood by reference to FIGS. 24, 24a and 25. These figures illustrate in detail one of the data bit recording channels and part of one of the check bit recording channels of the overall writing system shown in FIG. 1.

The characters to be recorded on the magnetic tape record may be temporarily stored in data buffer storage devices of known design for example, magnetic core or transistor flip-flop registers. The bits of a character are read out of the data buffer storage devices into the recording or writing channels 41 to 46, which include the amplifiers 47, simultaneously upon occurrence of each clock pulse. The circuit of FIG. 24a provides clock pulses for reading the characters of the information to be recorded out of the data buffer storage device. A train of negative going 120 kc. write clock pulses which may be derived from the oscillator 48 (FIG. 4) are applied to the input of a NAND gate 108. The write enable level is applied to another input of this gate 108. When the write enable level is present, a relatively low voltage is applied to the write enable level lead of the gate 108. The gate 108 is enabled and the write clock pulses pass therethrough. The NAND gate 108 inverts the clock pulses applied to its input. Accordingly, an inverter circuit 109 is connected to the output of the NAND gate 108. This inverter circuit may be a transistor circuit of a known design. Design techniques for such circuits are described in an article by R. A. Henley et al., entitled, "The Application of Transistors to Computers," appearing in Proceedings of the IRE, vol. 46, No. 6, June 1958, particularly on pages 1242 through 1244, inclusive. An amplifier 110 follows the inverter 109. If desired, the amplifier 110 may be designed to invert the pulses applied to its input so that the inverter 109 may be omitted.

The recording channels 41, 42 and 43 each include a separate amplifier 111, 112 and 113, (FIG. 24). These amplifiers form the amplifier stages 47 shown in FIG. 1.

The reset pulse insertion circuit 58 for the recording channel 41 includes a triggerable flip-flop 114 and NAND gates 116 and 117. The flip-flop 114 is a bistable circuit of the type shown in FIG. 21a. The output of the amplifier 111 in the recording channel 41 is connected directly to the "1" input of the triggerable flip-flop 114. The output of the amplifier 111 is also inverted in an inverter 115 and applied to the "0" input of the flip-flop 114. Output bits are derived only from the "1" output. The write clock pulses are applied to the trigger input T. When a clock pulse occurs, the bits applied to the "1" input are transferred to the "1" output of the flip-flop, as explained in connection with FIG. 2a. Successive pairs of bits will, therefore, appear at the input and output of the flip-flop 114 simultaneously for a cycle of the clock pulses. The first of a successive pair of bits is stored for a clock pulse cycle at the "1" output of the flip-flop 114. The second bit of successive pair of bits appears at the "1" input of the flip-flop 114 during a clock pulse cycle.

A pair of NAND gates 116 and 117 are also included in the recording channel 41. An input of a first of these gates 116 is connected to the "1" output of the flip-flop 114. This gate 116 has another input which is connected through an inverter stage 118 to the line which supplies the 120 kc. write-clock pulses. Thus, the inverted clock pulses are compared with the preceding one of each successive pair of data bits transmitted by the channel 41. The other gate 117 has two inputs which are respectively connected to the line providing the clock pulses and to the output of the inverter 115 which inverts the data pulses transmitted by the channel 41.

The gates 116 and 117 are interconnected at their outputs. This interconnection is schematically shown in the drawing by a line drawn from the output of the gate 117 to the wedged portion of the block which represents the gate 116. This connection illustrates that the circuits 116 and 117 also perform the logical OR function. In practice the gates 116 and 117 may share a common output circuit; that is to say, there is a common output resistor connected from a source of operating voltage to the collector of the transistors in each of the gates. When the output of either of the gates 116 and 117 is a relatively high voltage (p), that output will appear on output line 119 associated with both of the gates 116 and 117.

The output of the gates 116 and 117 is a train of pulses including at least one pulse for each cycle of the clock pulse train. This output is applied to the input of a write amplifier 120. This write amplifier 120 is a pulse amplifier having another input to which the write enable level is applied. The output of the write amplifier is connected to the head 60 which records pulses passed by the recording channel 41 on one of the tracks of the multi-track record 40. The write amplifier 120 forms part of the write amplifier and gates 59 (FIG. 1).

The recording current from the write amplifier is used by the head 60 to magnetize the tape. The tape is magnetized by the recording current to opposite polarities of magnetic saturation in a manner such that the signals recorded on the tape directly represent the values of the bits of digital information which are transmitted by the recording channel.

FIGURE 24 also illustrates, in part, one of the recording channels 54 which records the first check bit $K_1$ on one of the tracks along the tape 40. The stage of the parity generator 53 which provides the check bit $K_1$ is shown in FIG. 24. The check bit $K_1$ is provided to check the parity of a unique combination of the data bits which are to be recorded. This bit combination includes the data bits $D_1$, $D_2$ and $D_3$. The check bit $K_1$ is provided so that the combination of the data bits $D_1$, $D_2$ and $D_3$ and the check bit $K_1$ will have even parity, whatever may be the parity of the data bits $D_1$, $D_2$ and $D_3$.

The stage of the parity generator 53 which provides the check bits $K_1$ includes four NAND gates 121, 122, 123 and 124. Each of these gates has three inputs. These inputs receive bits $D_1$, $D_2$ and $D_3$ derived from the recording channels 41, 42 and 43. Three inverter circuits 125, 126 and 127 are connected to the outputs of the amplifiers 111, 112 and 113 in the channels 41, 42 and 43, respectively. The gate circuits 121 to 124 have a common output which is connected to the recording channel 54 for the first check bit $K_1$. This recording channel 54 includes a reset pulse insertion circuit and a write amplifier stage which form part of the circuits 58 and 59, respectively, (see FIG. 1). The output of the write amplifier for the check bit recording channel 54 will drive the head 66 which records the check pulses $K_1$ on the first check bit track of the tape.

The operation of the parity generator 53 will follow from an examination of Table I which appears below. All of the possible combinations of data bits $D_1$, $D_2$ and $D_3$ are represented in this Table I. This table indicates what binary values must be provided for the check bit $K_1$ to preserve even parity for every combination.

TABLE I

| $D_1$ | $D_2$ | $D_3$ | $K_1$ |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

The conditions set forth in Table I may be expressed in accordance with the following Boolean equation.

$$K_1 = D_1\overline{D}_2\overline{D}_3 + \overline{D}_1D_2\overline{D}_3 + \overline{D}_1\overline{D}_2D_3 + D_1D_2D_3 \quad (1)$$

The circuit of NAND gates 121 to 124 mechanizes the Boolean expression of Equation 1. Accordingly, the output of the check bit $K_1$ will be either a binary "zero" or a binary "one" depending upon the values of the data bits $D_1$, $D_2$ and $D_3$ in the case of each of the characters. Four stages are also provided in the parity generator 53 similar to the stage illustrated in FIG. 24. One of these stages checks the parity of data bits $D_1$, $D_4$ and $D_5$ and provides check bit $K_2$. Another stage of the parity generator checks the parity of data bits $D_2$, $D_4$ and $D_6$ and provides check bit $K_3$. Still another stage of the parity generator checks the parity of data bits $D_3$, $D_5$ and $D_6$ and provides the fourth check bit $K_4$. Since the stages for checking the parity of the various combinations of three of the data bits are similar, their operation and construction should follow from the above discussion. All generate parity check bits for even parity in this instance.

Referring to FIG. 25 a timing chart is shown which represents waveforms of signals which appear during operation of the recording channel 41 shown in FIG. 24. These waveforms are idealized to simplify the illustration. Other waveforms which are illustrated throughout the drawings are idealized for similar reasons.

A series of data bits which may be read out of the buffer storage into the channel 41 is illustrated and designated "ones" or "zeros" as the case may be. It will be noted that when binary "one" bits or binary "zero" bits occur in succession the voltage levels representing these bits do not change. These bits are amplified and inverted by the inverter 115. The appearance of the data bits after inversion is illustrated below the illustration of data bits from the buffer. A train of clock pulses from the oscillator 48 (FIG. 1) is also illustrated. The first data bit gated out of the data storage buffer by the first clock pulse and is applied to the "1" input of the flip-flop 114. This data bit is also inverted and applied to the "0" input of the flip-flop 114. Upon occurrence of the second clock pulse, this data bit is advanced to the "1" output of the flip-flop 114 and the next data bit appears at the "1" input of the flip-flop 114. In other words, during each clock pulse interval, the first data bit of a successive pair of bits is at the "1" output of the flip-flop 114 and the second or succeeding bit of this pair of bits is at the "1" input of the flip-flop. This pair of data bits is indicated, respectively, as $D_{1a}$ and $D_{1b}$ in FIG. 24 adjacent the inputs and outputs of the flip-flop 114. The inverted clock pulses and the data bits $D_{1a}$ are applied to the upper NAND gate 116. When both inputs to the NAND gate 116 are at n voltage level, the NAND gate 116 produces a p voltage level at the output thereof. The duration of the p level provided by the NAND gate 116 is equal to the duration of one-half of a cycle of the clock pulses, since the clock pulse is of n level for only one-half of a clock pulse cycle. The lower NAND gate 117 compares the first of the pair of inverted data bits $\overline{D}_{1b}$ with the clock pulses. This NAND gate 117 provides p level of duration equal to one-half of a clock pulse cycle, when the inverted data bits $\overline{D}_{1b}$ and the clock pulse each are simultaneously of n level. Accordingly, the outputs from both gates 116 and 117 added together will provide a p level pulse equal in duration to a complete cycle of a clock pulse for every second bit $D_{1b}$ of a successive pair of bits which represent a "zero" when it is preceeded by a bit $D_{1a}$ which represents a "one." A pulse having a duration of an entire clock pulse cycle which is of n voltage level is provided at the output of the gates 116 and 117 for each second bit $D_{1b}$ representing a "one" which is preceded by a bit $D_{1a}$ representing a "zero." When two bits each representing "zeros" follow each other in succession, a pulse of n voltage level will be provided for half a clock pulse cycle. This pulse will be followed in the succeeding half of the same clock pulse cycle by a reset pulse (labeled $R_1$ in FIG. 25) which is of p voltage level. The converse is true for succeeding and preceding pulses representing "ones." In the later case a reset pulse (labeled $R_2$ in FIG. 25) will be provided. Thus, reset pulses are inserted during part of the duration of the later one of a successive pair of bits having the same value. The presence of these reset pulses insures that there will be change in magnitude at the end of each bit which is recorded on the tape which is of a sense corresponding directly to the value thereof. At least one change in magnitude occurs during each clock pulse cycle. Thus, bits recorded by each recording channel will be self-clocking.

The recording current provided by the write amplifier 120 corresponds to the voltage at the output of the NAND gates 117 and 116. The amplifier 120 operates so that a "one" is represented by a positive going pulse while a "zero" is represented by a negative going pulse. Positive and negative currents in response to each of these pulses flow through the head 60 connected to the write amplifier 120 output. These positive and negative currents cause saturation of the tape in incremental areas, called "bit cells," of the tape so that a bit cell is saturated either, in the P or positive direction or in the N or negative direction.

An analysis of the binary data to be recorded and the train of pulses which are provided by the reset pulse insertion circuit shows that the following rules describe the operation of the reset pulse insertion circuit.

(1) If the second bit $D_{1b}$ of a successive pair of bits is opposite in value from the first bit $D_{1a}$ of that pair, the polarity of the pulse to be recorded to represent the first bit is positive, if the first bit is a "zero" and is negative if the first bit is a "one."

(2) If the second bit $D_{1b}$ and the first bit $D_{1a}$ of the bit pair are both "ones" the polarity of the pulse which is recorded to represent the first bit is positive, which is the same as the polarity of the clock pulses during the first half of each clock pulse cycle thereof.

(3) If the second bit $D_{1b}$ and the first bit $D_{1a}$ are both "zero" the pulse to be recorded to represent the first bit is negative, which is opposite to the polarity of the clock pulses during the first half of each clock pulse cycle.

These rules can be expressed in accordance with the Boolean equation:

$$I_{D1} = (D_{1a}\overline{D}_{1b} + \overline{D}_{1a}D_{1b})D_{1a} + (D_{1a}D_{1b})K + (\overline{D}_{1a}\overline{D}_{1b})\overline{K} \quad (2)$$

Equation 2 can be simplified and expressed as follows:

$$I_{D1} = D_{1a}K + \overline{D}_{1b}\overline{K} \quad (3)$$

In the foregoing equations the pulses to be recorded are represented by the term, $I_{D1}$. The clock pulse is represented by the term, K, as heretofore.

RESET PULSE REJECTION CIRCUITS

Since reset pulses are recorded with some of the pulses representing data bits on each of the tracks of the tape record 40, it is necessary to reject these reset pulses. The primary problem in rejecting the reset pulses is to avoid mistaking a data pulse for a reset pulse and vice versa. Since the reset pulses represent bits having binary values opposite to the values of the bits with which they are provided a mistake respecting a reset pulse will produce an erroneous bit indication in the system.

Figure 4:
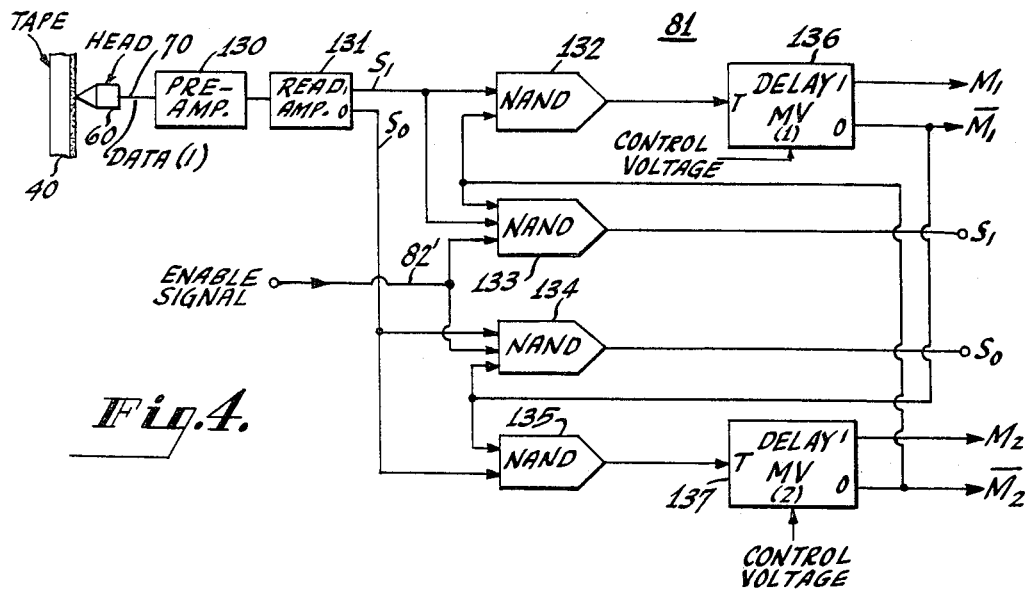
FIGURE 4 is a block diagram of a reset pulse rejection circuit which is incorporated in the system shown in FIG. 1.

FIGURE 4 shows the reset pulse rejection circuit and its associated amplifiers for one reading channel of the reproducing portion of the tape file system. The illustrated channel reads the data pulses reproduced from the first track which is identified in FIG. 2 as the D(1) track. The pulses recorded on the track are read by the head 60 and amplified in a pulse preamplifier 130. The pulses are applied to a pulse reading or read amplifier 131. This pulse reading amplifier 131 may be any circuit which produces a pulse representing a binary "one" at one terminal and a pulse representing a binary "zero" at another terminal. These terminals are labeled with the Arabic numerals "1" and "0" in the block representing the read amplifier 131 in FIG. 4 of the drawings. The pulses representing binary "ones" are identified as $S_1$ pulses and the pulses identifying binary "zeros" are identified as $S_0$ pulses. Since the pulses recorded on the track are self clocking, only one $S_0$ or $S_1$ pulse occurs during each clock pulse cycle. Before processing in the reset pulse rejection circuit of FIG. 4, the reset pulses provide $S_1$ and $S_0$ pulses which are not distinguished from data bit pulses.

As pointed out above, pulses representing binary "ones" are read in response to transitions from negative to positive saturation on the tape and pulses representing binary "zeros" are read in response to transitions from positive to negative saturation on the tape. The pulses read from the tape, thus, will be of different polarity, depending upon the value of the bits which they represent. Thus, differently biased sensing circuits may be used in the read amplifier 131 to segregate the $S_1$ pulses from the $S_0$ pulses.

When the tape is moved in the opposite direction during reading and writing, the values of the $S_1$ and $S_0$ pulses will be reversed. Accordingly, circuitry (not shown for the sake of simplicity) is provided to invert the signals at the output of the pre-amplifier 130 when reading and writing are in opposite directions of tape travel. This circuitry may be a pair of parallel NAND gates one of which has an inverter connected to one of its inputs. Control levels are applied to the inputs of the gates to inhibit the NAND gate which has the inverter connected to its input and enable the other NAND gate, when the tape will travel in opposite directions during reading and writing. When the directions of travel are the same during reading and writing, the gate having the inverter connected to its input is enabled, while the other gate is inhibited. It follows from the known inverting action of the NAND gates, that signals of polarity which properly represent the "zero" and "one" bits will always be applied to the read amplifier 131.

The reset pulse rejection circuits include four NAND gates 132, 133, 134 and 135. The gates 133 and 134 transmit the $S_1$ and the $S_0$ pulses, respectively, to the outputs of the circuit. The output of the gates 132 and 135 are connected to the trigger inputs of different delay multivibrators 136 and 137. These delay multivibrators are of the one-shot or mono-stable type. When triggered by a positive pulse, they produce a positive pulse at their "0" outputs for duration which is slightly longer than one-half a cycle of the clock pulses. The pulses produced at the outputs of the delay multivibrator 136 are identified as $M_1$ and $\overline{M}_1$ pulses, while the pulse produced at the outputs of the delay multivibrator 137 are identified as $M_2$ and $\overline{M}_2$. Other inputs to the NAND gates 132 and 133 are connected to the "0" output of the delay multivibrator 137. Other inputs of the NAND gates 134 and 135 are connected to the "0" output of the other delay multivibrator 136. Another input of the NAND gates 133 and 134 which transmit the $S_1$ and $S_0$ pulses to the outputs of the reset pulse rejection circuit is connected to the signal enable line 82'. This line 82' is the one of ten lines in the cable 82 shown in FIG. 2 which corresponds to the reading channel for the D(1) bits. The NAND gates 133 and 134 will be inhibited from providing a p voltage output unless an n voltage level is applied on the line 82' and also to the inputs of the NAND gates 133 and 134. Thus, when a p voltage level is applied to the signal enable lines 82', the NAND gates 133 and 134 are inhibited.

Figure 5:
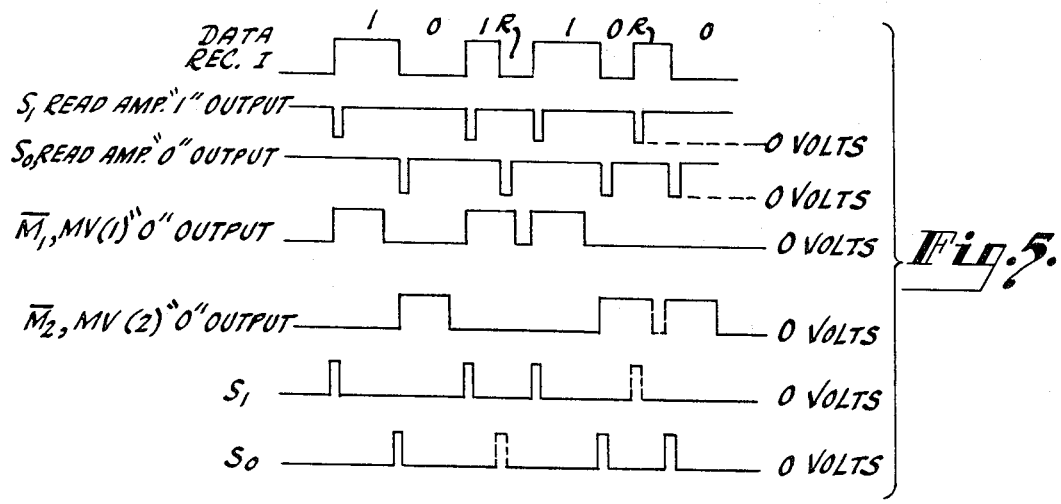
FIGURE 5 is a timing chart which illustrates the operation of the circuit shown in FIG. 4.

The operation of the reset pulse rejection circuit will be better understood by reference to FIG. 5. The data recording current which is passed through the head 60 is illustrated in the top waveform shown in FIG. 5. The binary bit values represented by the positive and negative going transitions of the waveform is designated. Reset pulses R have negative going transitions between pulses which represent "ones" and positive going transitions between pulses which represent "zeros." The duration of these reset pulses is approximately one-half the duration of a full length data pulse. The reading amplifier 131 provides an $S_1$ pulse for each positive going transition read from the tape and $S_0$ pulses for all negative going transitions. These $S_1$ and $S_0$ pulses are shorter in duration than one-half of a cycle of the clock pulses. Both the $S_1$ and $S_0$ pulses are derived from the record amplifier as negative going pulses.

The delay multivibrators 136 and 137 are one-shot devices of known type which are normally reset and provide an $n$ voltage level at their "0" outputs. The inputs of the NAND gates 132 and 135 connected to these "0" outputs are also maintained at $n$ voltage levels. Upon arrival of a negative going $S_1$ or $S_0$ pulse, the NAND gates 132 and 135 are enabled and transmit a positive going pulse. The delay multivibrators 136 and 137 are triggered by these positive going pulses from the gates 132 and 135. In cases where a $S_1$ pulse occurs first, the one-shot delay multivibrator 136 is triggered and provides a positive, $\overline{M}_1$, pulse at its "0" output which is applied to an input of the gate circuit 134. The transmission of any $S_0$ pulses to the $S_0$ circuit output is prevented for an interval equal to somewhat greater than one-half a clock pulse cycle due to the reset time of the one-shot delay multivibrator 136, i.e., the length to the $\overline{M}_1$ pulse. The gate 135 which controls the triggering of the delay multivibrator 137 is also inhibited from providing p pulses in response to $S_0$ pulses for the same period of time. Accordingly, $S_0$ pulses are prevented from triggering the delay multivibrator 137. Where pulses representing "one" bits occur in succession, a reset pulse R intervenes between them. This reset pulse is reproduced as though it were a $S_0$ pulse representing a "zero" bit. The transmission of this reset $S_0$ pulse is prevented, since the delay multivibrator 136 inhibits the gate 134 which passes $S_0$ pulses. The waveform which shows the $S_0$ output pulses indicates, by a dotted pulse, the position of the reset pulse which is rejected by the circuit.

In cases where a pulse representing a "zero" bit is read by the head 60, an $S_0$ pulse will be provided which is transmitted through the NAND gate 134. This $S_0$ pulse is also transmitted through the NAND gate 135 and triggers the multivibrator 137. The one-shot delay multivibrator 137 then provides an $\overline{M}_2$, positive pulse at the inputs of the gates 132 and 133 which transmit the $S_1$ pulses so as to inhibit these gates from providing a p pulse and prevent the transmission of an $S_1$ pulse for an interval somewhat greater than one-half a cycle of the clock pulses. In cases where two "zero" bits are recorded in succession, together with an intervening reset pulse which represents a "one" bit, that reset pulse will be rejected.

It is desirable to vary the duration of the pulses produced by the monostable delay multivibrators 136 and 137 with variations in the speed of the tape such that the relationship between the interval between successively reproduced information pulses and the duration of the pulses produced by the multivibrators 136 and 137 is preserved. It is known that the duration of a pulse produced by a monostable multivibrator can be varied by varying the bias on one side of the multivibrator. A control voltage which varies with variations in the tape speed is obtainable from the frequency controlled oscillator 84 (FIG. 6b). This control voltage can be applied to the delay multivibrators 136 and 137 to vary the duration of the pulses $\overline{M}_1$ and $\overline{M}_2$. This circuit will be described hereinafter.

Since the gates 133 and 134 invert the polarity of the $S_1$ and $S_0$ pulses, positive pulses are provided for each $S_1$ and $S_0$ pulses at the outputs of the gates 133 and 134. These positive pulses are applied to both the missing bit detection and renewed bit insertion circuits 86 and to the deskew buffers 90. The missing bit detection and insertion circuits also use signals derived from the clock track.

CLOCK TRACK READING CIRCUITS

Referring to FIG. 6, the clock track reading channel 80 which provides reference pulses for the missing bit detection and insertion circuits is illustrated. The clock track on the magnetic tape 40 is scanned by the magnetic head 52 which provides a series of clock pulses at the rate of 120 kc. This rate may vary with variations in speed of the tape 40. Also, dropouts may cause the loss of one or more successive clock pulses. The clock pulses which are derived from the tape 40 are amplified in a pre-amplifier 140 and applied to a reading amplifier 141. This reading amplifier 141 may be similar to the reading amplifiers 131 described in connection with FIG. 4. Only the "1" output of the reading amplifier is used. A clock pulse is derived from the positive going edge of the recorded clock pulses. The reproduced clock pulses are applied to a frequency controlled oscillator 84, and serve to synchronize this oscillator. FIG. 6b shows a suitable synchronized oscillator. The frequency controlled oscillator 84 may also be a free-running multivibrator circuit which generates a train of pulses at a frequency of 360 kc. This frequency is synchronized with the frequency of the clock pulses read from the tape 40. Any known multivibrator synchronizing technique may be used. If dropout occurs in the clock track, the oscillator 84 begins drifting back towards its nominal frequency of oscillation of 360 kc. at a very slow rate. Long time constant networks may be used in the feedback coupling circuits of the oscillator 84 to provide this slow drift. Thus the oscillator follows the frequency of the clock track even though dropouts occur.

A circuit which provides a train of pulses in synchronism with the clock pulses which are read from the clock track is illustrated in FIG. 6b. This circuit includes a variable frequency oscillation generator 550 and a control voltage generating circuit 552 which provides a control voltage that causes the oscillation generator 550 to be synchronized by the pulses from the clock track.

Negative going pulses from the clock track are inverted in an inverter 570 and applied to the reset terminal of a flip-flop 572. The output pulses from the oscillation generator 550 are applied to the set terminal of this flip-flop 572. The flip-flop 572 functions as a discriminator to provide a train of pulses, the direct current amplitude of which varies in accordance with the relation between the frequency of the pulses from the clock track and the frequency of the pulses provided by the oscillator generator 552. The waveform which appears next to the "1" output of the flip-flop shows that the interval between the set time and the reset time of the flip-flop increases when the frequency of the clock track pulses decreases with respect to the frequency of the pulses from the oscillation generator 550. It will be recalled that the "1" output of a flip-flop is at about zero volts (ground potential) when the flip-flop is set and is at a positive voltage when the flip-flop is reset. It follows that when the frequency of the pulses from the clock track exceeds the frequency of the pulses from the oscillation generator 550, the interval between the set and reset time of the flip-flop will decrease.

The train of pulses from the flip-flop is filtered in a filter circuit 574 which may be of the resistance-capacitance type. This filter circuit provides a varying D.C. voltage which is indicated by the waveform at the output thereof. The D.C. voltage is a certain level when the frequency of the clock track pulses is lower than the oscillation generator pulses and increases from this certain level when the frequency of the clock pulses is greater than the frequency of the pulses from the oscillation generator. Accordingly, when the tape speed goes below rated speed, the D.C. voltage will decrease. Conversely, when the tape speed increases above rated speed the D.C. voltage will increase. In the event of a drop-out, the flip-flop 572 remains in its set condition. Accordingly, the D.C. voltage will return to zero volts.

A transmission type gate circuit 576 is proved at the output of the filter circuit 574 for transmitting the direct current output voltage therefrom to a storage circuit 578. This storage circuit includes a capacitor and associated circuitry having a long time constant. The voltage at the output of the filter circuit 574 also appears across the capacitor of the storage circuit. It is desirable to disconnect the storage circuit from the filter circuit upon occurrence of a drop-out so that the storage circuit output voltage which corresponds to the relative frequencies of the clock pulses and oscillation generator pulses will be maintained for a relatively long period of time. This will permit the oscillation generator to provide output pulses at approximately the correct frequency with respect to the speed of the tape regardless of a drop-out even though the drop-out may be prolonged. The gate 576 is inhibited upon occurrence of a drop-out by a filter circuit 580. This filter circuit may include an amplifier. The filter circuit 580 derives a voltage in response to the clock pulse from the tape to enable the gate 576 so long as the clock pulses are produced. When the clock pulses disappear due to a drop-out, the enabling level at the input of the gate 576 is removed and the gate is inhibited. The filter circuit 574 is therefore effectively disconnected from the storage circuit 578 upon occurrence of a drop-out.

The storage circuit 578 output is connected to a direct current amplifier 582 for amplifying the direct current voltage which appears across the capacitance in the storage circuit. The operating power of the amplifier is such that the amplifier will produce zero output voltage level when the voltage from the storage circuit is that certain voltage which indicates that the frequency of the pulses from the oscillation generator 550 and the clock pulses are the same. When the frequency of the clock pulses increases, a control voltage of one polarity will be provided by the D.C. amplifier and when the frequency of the clock pulses decreases, a control voltage of opposite polarity will be provided by the D.C. amplifier.

The oscillation generator 550 includes a triggerable flip-flop 554 having its "1" and "0" outputs connected to monostable multivibrators 556 and 558, respectively. The outputs of the monostable multivibrators are connected to a NAND gate 560. The output of the NAND gate 560 is fed back to trigger the flip-flop 554 over a circuit including an inverter 565 and a NAND gate 566. A start switch 568 is connected to an input of the NAND gate 566 for providing a pulse to initiate operation of the oscillation generator 500.

The triggerable flip-flop 554 and the monostable multivibrators 556 and 558 may be incorporated into the same circuit wherein the normally off sides of the monostable multivibrators 556 and 558 are provided by different sides of the flip-flop 54. The duration of the pulse provided by the monostable multivibrators is controlled by the control voltage from the D.C. amplifier 582. This control voltage may be applied to the control electrode of the normally on (conductive) side of the monostable multivibrator. The monostable multivibrators may be of any known type wherein an output is derived from the normally on (conductive) sides. When these monostable multivibrators are triggered, their normally off (nonconductive) sides are on causing a coupling capacitor connected between the normally on and normally off sides of the multivibrators to charge or discharge to a cut-off voltage. When this cut-off voltage is reached, the normally on side cuts off. After a period of time determined by the time constant of the circuit associated with the coupling capacitor, the on side then returns to its normally conductive state. The control voltage magnitude may set the voltage to which the coupling capacitor charges or discharges and/or the bias on the control electrode of the normally on side of the multivibrator. The control voltage magnitude, therefore, determines the part of the charge or discharge cycle which must elapse before the on side of the multivibrator returns to its on state. The waveforms of the output pulses provided by the monostable multivibrators 566 and 558 are shown adjacent the output thereof. These output pulses are positive voltage pulses. The leading edge of these output pulses may move towards the left or towards the right as viewed in the drawing depending upon the amplitude and polarity of the control voltage. If the control voltage increases, the leading edge of the pulses occurs early in time, and, if the control voltage decreases the leading edge occurs later in time.

The NAND gate 560 performs the logical OR function. Thus, upon occurrence of a positive (p) pulse from either of the monostable multivibrators 556 and 558, an (n) pulse will be produced at output of the NAND gate 560. This n pulse is inverted by the inverter 565, such that the voltage at an input to the NAND gate 566 is an n voltage level, interrupted by positive voltage pulses when either of the monostable multivibrators 556 or 558 is triggered. The other input of the NAND gate 566 is normally connected to ground through the start switch 568. When a positive pulse is applied to an input of the NAND gate 556, whether in response to a pulse at the output of the gate 560 or movement of the start switch from ground to a terminal which is connected to a source of positive voltage indicated at +B, a negative going transition occurs in the voltage applied from the output of the NAND gate 566 to the trigger input of the flip-flop 554. This transition causes the state of the flip-flop 554 to reverse.

Each time the state of the flip-flop is reversed, an alternate one of the monostable multivibrators 556 or 558 is triggered to produce a pulse of duration control by the control voltage. Since the voltage transition which triggers the flip-flop 554 is timed with the leading edge of the output pulse from the NAND gate 560, the frequency of oscillation generator 550 is controlled by varying the position of the leading edge of the multivibrator output pulse. Since the control voltage varies the position of this leading edge, the control voltage controls the frequency of the output pulses from the oscillation generator 550. The control voltage varies when the frequency of the clock pulse varies. Accordingly, the output pulse from the oscillation generator will be synchronized by the clock pulses. The circuitry of the control voltage generator 556 assures that this synchronization will be maintained even on occurrence of a dropout.

The frequency control oscillator drives a phase splitting circuit 85. This circuit splits the signals from the oscillator 84 into three separate signals, 120° out of phase with each other. The circuit 85 is referred to as a three phase pulse generator (see FIG. 2).

THREE PHASE PULSE GENERATOR

Referring ot FIG. 6, again, the three phase pulse generator 85 includes two flip-flop circuits 142 and 143. Each of these circuits has a set input S, a trigger input T and a reset input R, and may be similar in design to a triggerable flip-flop circuit shown in FIG. 26 of the above referenced article in Proceedings of the IRE. The flip-flops 142 and 143 are connected in cascade. The "1" output of the first flip-flop 142 is connected to the trigger input T of the second flip-flop 143. The "1" output of the second flip-flop 143 is connected to an input of a NAND gate 144. The output of this NAND gate 144 is connected to the set input of the first flip-flop 142. Outputs are derived from the "1" output of the first flip-flop 142 and from the "1" and "0" outputs of the second flip-flop 143. The "1" output of the first flip-flop 142 and the "0" output of the second flip-flop 143 provide inputs to another NAND gate 145. The "0" output of the second flip-flop 143 is used to trigger a one-shot or delay multivibrator 146. The output of the NAND gate 145 triggers another, similar delay multivibrator 147. The "1" output of the second flip-flop 143 also triggers a similar delay multivibrator 148. These delay multivibrators 146 and 148 are monostable multivibrators which produce a negative pulse of short duration when triggered.

Figure 7A:
FIGURE 7 is a timing chart which illustrates the operation of the system shown in FIG. 6.

The operation of the three phase pulse generator 85 will be apparent from FIG. 7 of the drawings. The positive going leading edge of each of the pulses from the oscillator 84 triggers the first flip-flop 142. It will be assumed that the first flip-flop 142 is in the reset condition. The first positive going pulse from the oscillator 84 triggers the flip-flop 142 causing its "1" output to assume an n level of zero volts and its "0" output to assume a positive p level. On occurrence of the next pulse from the oscillator 84, the first flip-flop 142 is again triggered so that its "1" output becomes positive. When the "1" output of the first flip-flop 142 becomes positive, the second flip-flop 143 then provides an n voltage level. The NAND gate 144 is now enabled, since n volt levels are applied to both inputs thereof. The NAND gate 144 delivers a positive pulse to the set input of the first flip-flop 142 and sets this flip-flop 142 so that its "1" output returns to n level and its "0" output becomes positive. The next occurring pulse from the oscillator 84 initiates a sequence of operations which again causes a pulse to be delivered by the NAND gate 144 to the set input of the first flip-flop at the beginning of every third pulse generated by the oscillator 84.

The delay multivibrator 148 produces a pulse $P_1$ on occurrence of a positive-going edge of the pulses produced at the "1" output of the second flip-flop 143. The NAND gate 145 delivers a positive going pulse for triggering the delay multivibrator 147 when the "1" output of the first flip-flop 142 and the "0" output of the second flip-flop 143 both return to n voltage level. The later situation occurs one cycle of the pulses from the oscillator 184 after the $P_1$ pulse is generated or on the second of every three pulses. The delay multivibrator 147 provides a short pulse $P_2$. Thus, $P_2$ is generated after $P_1$. The delay multivibrator 146 is triggered and produces a third pulse $P_3$, when the second flip-flop 143 provides a positive-going pulse at its "0" output. This occurs one cycle of the pulses from the oscillator 84 after the pulse $P_2$ is generated. The pulses $P_1$, $P_2$ and $P_3$ are all short pulses. The "1" outputs of the delay multivibrators 146 to 148 are each normally positive except upon occurrence of the $P_1$, $P_2$ or $P_3$ pulses. The $P_1$, $P_2$ or $P_3$ pulses are a sequence of three phase pulses, each occurring in succession on successive cycles of the pulses from the oscillator 84.

These three pulses $P_1$, $P_2$ and $P_3$ are utilized as reference pulses in determining whether or not a data or check pulse has been reproduced from each track on the tape 40 by the check and data pulse reading channels 70 to 79 (FIG. 2).

TIMING COMPARISON CIRCUIT

Referring to FIG. 8, there is shown a circuit for comparing the timing of the reference pulses $P_1$, $P_2$ and $P_3$ obtained from the three-phase pulse generator 85 with the timing of the pulses $S_1$ and $S_0$ which are derived from the reset pulse rejection circuits 81 in response to signals read from the tape. The circuit of FIG. 8 provides a digital output containing three bits which constitute a number representing the timing of the reference pulses relative to the reproduced pulses $S_1$ and $S_0$. This circuit is of general application and may be used wherever the timing of two pulse trains is to be analyzed. This circuit features a direct digital output representing the timing of the signals and avoids the need for analog to digital conversion techniques.

The pulses $S_1$ and $S_0$ are combined into a single pulse train in a NAND gate 150. $S_1$ and $S_0$ appear as positive pulses. They are inverted in the NAND gate 150 and reinverted by an inverter 151 connected to the output of the NAND gate 150. Since at least one pulse is recorded during each clock pulse cycle, a $S_1$ pulse or a $S_0$ pulse should be reproduced during each clock pulse cycle, unless a drop-out occurs.

The reference pulses $P_1$, $P_2$ and $P_3$, respectively, are applied to inputs of three NAND gates 152, 153 and 154. The output of the inverter 151 is connected to other inputs of these gates 152, 153 and 154, and also to inputs of three other NAND gates 155, 156 and 157. The NAND gates 153 and 156 constitute a second stage 182. The NAND gates 154 and 157 constitute a third stage 183. Additional stages may be provided when the timing of the pulse trains applied to the system should be determined with greater accuracy. In the illustrated case, the timing is determined within an interval of 1/360 milliseconds. With additional stages the timing can be determined to within smaller time increments.

The stages 181 to 183, respectively, contain inverters 158, 159 and 160. The upper gates 155 to 157 of each of the stages provides a holding circuit. The output of the upper gates 155, 156 and 157 are connected to their inputs by feed back circuits including the inverters 158, 159 and 160, respectively. The stages 181 to 183 are connected to each other in a ring. The output A of the first stage 181 is connected to one input of the gate 154 in the third stage 183. The output B of the second stage 182 is connected to one input of the gate 152 in the first stage 181. The output C of the third stage 183 is connected to the on input of the gate 153 in the second stage 182.

The operation of the circuit illustrated in FIG. 8 will be better understood by reference to FIG. 9. This figure shows a train of positive pulses corresponding to the combined reproduced pulses $S_1$ and $S_0$. This train of pulses is obtained from the output of the inverter 151. The three-phase pulses $P_1$, $P_2$ and $P_3$ are negative going pulses. It will be assumed for purposes of illustration that a $P_2$ pulse is applied first after occurrence of an $S_1$ or $S_0$ pulse to an input of the NAND gate 153. At this time an n voltage level (zero volts) is applied to an input of each of gates 152 to 157 from the output of the inverter 151.

Inspection of the circuits will show other inputs to the NAND gate 153 will have n voltage levels applied thereto at the time of occurrence of $P_2$. An input to the NAND gate 153 is provided by the output C of the gates 154 and 157 in the third stage 183. The $P_3$ input of the NAND gate 154 carries a p (positive) voltage level at the time a $P_2$ pulse is applied to the $P_2$ input of the NAND gate 153. The output of the NAND gate 154 is at n voltage level (zero volts), since one of its inputs is a positive level. The NAND gate 157 and the NAND gate 154 have a common output. This level of zero volts is therefore applied to the inverter 160 which inverts the zero volts level to a positive voltage level which is fed back to an input of the NAND gate 157. The NAND gate 157 therefore maintains an n (zero) voltage level at its output.

Upon occurrence of the $P_2$ pulse all of the inputs of the NAND gate 153 have n voltage levels (zero volts) applied thereto. The output of the NAND gate 153 will then be a p (positive) level. This positive level is applied to the input of the inverter 159, inverted and fed back to the NAND gate 156. The NAND gate 156 will then have an n (zero) voltage level applied to both of its inputs. The output of the NAND gate 156 which is the output B of the stage 182 becomes positive. This positive level is applied to an input of the NAND gate 152 and inhibits this gate 152 from providing a positive output although a $P_1$ pulse might be applied thereto. At the termination of the $P_2$ pulse the direct output of the NAND gate 153 returns to zero volts. But the B output of the stage 182 remains positive due to the holding action of the NAND gate 156. This indicated in the timing chart which illustrates the output B of the NAND gate 156.

The pulse $P_3$ occurs after the pulse $P_2$. This pulse causes the NAND gate 154 to provide a positive voltage level at its output. This output is maintained because of the holding action of the NAND gate 157. The third stage 183 will therefore present a positive output C.

The $P_1$ pulse occurs after the $P_3$ pulse. At this time the input of the NAND gate 152, which is connected to the output B of the second stage 182 is positive. Accordingly, the output of the NAND gate 152 remains at n voltage level, as does the output of the NAND gate 155.

It was assumed in the foregoing description that no $S_1$ or $S_0$ pulses were produced during the interval of a sequence of a $P_2$, $P_3$ and $P_1$ pulse and that a $P_2$ pulse was the first in the sequence of three phase pulses applied to the circuit of FIG. 8. The output A of the first stage 181 was an n (zero) voltage level; the output B of the second stage was a positive level; and the output C of the third stage 183 was also a positive level. In accordance with the convention which has been adopted, the outputs A, B, and C represent binary bits "one," "zero," and "zero," respectively. This is a digital number subject to change with variations in the relative timing of the P and S pulses.

When an S pulse occurs, a positive level is applied to the inputs of each of the gates 152–157. This effectively resets the gates so that each of the A, B, C outputs become n voltage levels until occurrences of the next sequence of a $P_1$, $P_2$, and $P_3$ pulse. Should the next S pulse be missing, the outputs A, B and C continue to provide the same number on occurrence of the next sequence of $P_1$, $P_2$ and $P_3$ pulses.

If the next S pulse is delayed so that it occurs after the $P_2$ pulse but before the $P_3$ pulse, the output C of the third stage 183 will be inhibited from becoming positive. In general, the one of the outputs A, B, C which represent a binary "one" will change depending upon when an S pulse occurs between occurrence of successive pairs of the $P_1$, $P_2$ and $P_3$ pulses. The following table illustrates the numbers provided at the outputs A, B, C depending upon the relative times of occurrences of the reproduced signal pulses S and the reference pulses P. In the table $T_1$, $T_2$, $T_3$ and $T_4$ indicate the relative times of occurrences of the S pulses and the P pulses. It will be observed that when the S pulse appears between a different pair of P pulses the binary number provided at the A, B, C outputs changes. This binary number is therefore a direct indication of the relative timing of the S pulse train and the P pulse train.

| $T_1$ | $T_2$ | $T_3$ | $T_4$ | A | B | C |
|---|---|---|---|---|---|---|
| S | $P_2$ | $P_3$ | $P_1$ | 1 | 0 | 0 |
| S | $P_3$ | $P_1$ | $P_2$ | 0 | 1 | 0 |
| S | $P_1$ | $P_2$ | $P_3$ | 0 | 0 | 1 |

The circuit shown in FIG. 8 also provides for the detection of the absence of a reproduced pulse due to a drop-out or the like. The number provided by the system of FIG. 8 is a direct indication of the expected time of reproduction, after a preceding reproduced signal pulse of its succeeding signal pulse. The circuit of FIG. 8 is used to control the renewed bit insertion circuit 86 which will be described in detail hereinafter in connection with FIG. 11 of the drawings.

RENEWED PULSE INSERTION

Referring to FIG. 10, a phase diagram of the $P_1$, $P_2$, and $P_3$ pulses is shown. A first time interval, designated as I occurs between $P_2$ and $P_3$ pulses; a second time interval designated as II occurs between the $P_1$ and $P_3$ pulses; and a third time interval designated as III occurs between the $P_1$ and $P_2$ pulses. The first S pulse, identified as $S_a$, occurs during the time interval III. The succeeding $S_b$ pulse should occur when time interval III repeats. If the $S_b$ pulse does not occur upon repetition of the III time interval, it is presumed that a drop-out caused the $S_b$ pulse to be absent. The absence of the $S_b$ pulse is indicated by a dashed pulse in the uppermost waveform of FIG. 9. A renewed pulse is then required to replace the $S_b$ pulse. This renewed pulse is generated by the circuit shown in FIG. 11.

This circuit includes three stages 161, 162 and 163 which are connected together to provide a common renewed pulse in its output. Each stage includes a separate circuit 164, 165 and 166 for performing a logical AND function. Each of these circuits 164–166 has three inputs connected to the anodes of three diodes 170, 171 and 172. The cathodes of these diodes are connected to a common resistor 173. The resistors 173 are connected to a source of positive bias shown at $+E_b$. The AND circuits 164, 165 and 166 are each connected through coupling resistors 174 to the cathodes of other diodes 175. The anodes of these diodes 175 are connected to a common load resistor 176. The signal across the load resistor is applied to an inverter 177 and triggers a delay multivibrator 178. This delay multivibrator is a one-shot or monostable multivibrator of the type described heretofore. The "1" output of the multivibrator 178 is connected to an input of a NAND gate 179 which provides the renewed pulses at its output. Another input of the gate 179 is connected to a lead which supplies an enabling voltage level, which enables the renewed pulse insertion circuit to supply renewed pulses. The $P_1$ pulses are applied through a capacitor 180 to the diode 175 in the first stage 161 of the circuit. The $P_2$ pulses are applied through a capacitor 181 to the diode 175 in the second stage 162 of the circuit. The $P_3$ pulses are applied through a capacitor 182 to the diode 175 in the third stage 163 of the circuit.

The A, B, C outputs of the circuit shown in FIG. 8 are connected to the inputs of the gates 164–166. Some of these A, B, and C outputs are inverted before application to the gate inputs. Inverters (now shown) are used to provide the requisite inversion. A number corresponding to the binary expression $\bar{A}$, B, $\bar{C}$ is applied to the AND circuit 164 of the stage 161. In a similar manner, a number corresponding to an expression $\bar{A}$ $\bar{B}$ and C is applied to the AND circuit 165 of the second stage 162. A number equal to A $\bar{B}$ $\bar{C}$ is applied to the AND circuit 166 of the third stage 163.

Figure 11:
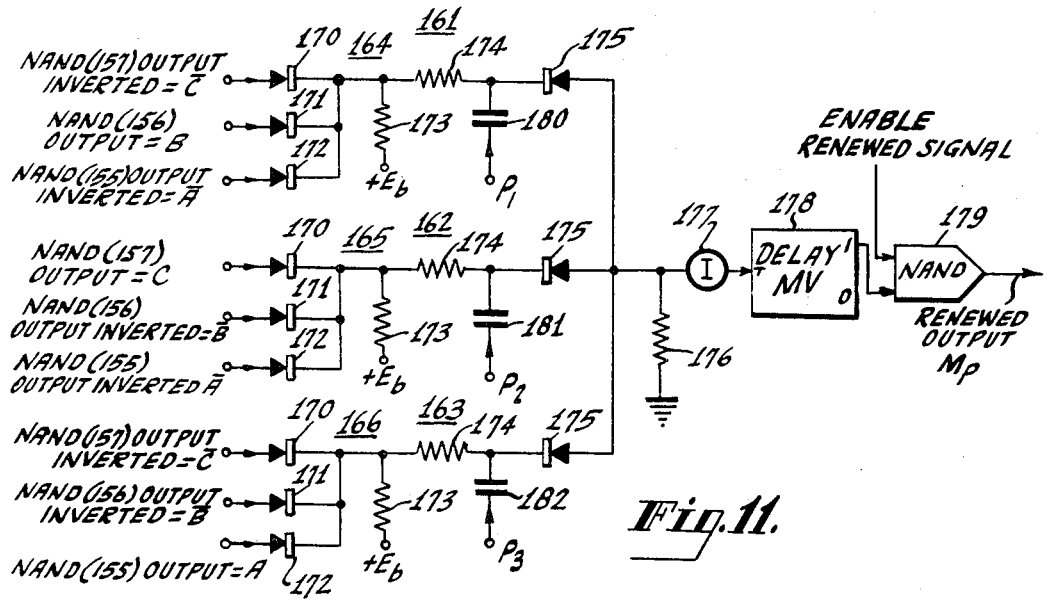
FIGURE 11 is a diagram, partially in schematic and partially in block form, of another portion of the missing bit detection and renewed bit insertion circuit which provides renewed bits in proper timing relationship with other bits reproduced from a track on the magnetic record.

The circuit of FIG. 11 supplies a renewed pulse upon occurrence of one of the reference pulses $P_1$, $P_2$ and $P_3$ in a sequence of these three pulses during occurrence of which a reproduced pulse ($S_b$ in the timing diagram of FIG. 9) is absent. When $S_b$ is absent, the stages 181–183 of the timing analysis circuit are not reset. Thus, the number presented by their outputs A, B and C does not change during the next sequence of $P_1$, $P_2$ and $P_3$ pulses among which $S_b$ should occur. This number determines when in this next sequence of $P_1$, $P_2$, and $P_3$ pulses, a renewed pulse should be generated.

In the exemplary case illustrated in FIG. 9 wherein the binary number A·B·C is "one" "zero" "zero," respectively, the AND circuit 166 will have all inputs at n (zero) voltage level when the $P_3$ pulse occurs in the sequence of $P_1$, $P_2$ an $P_3$ pulses among which the $S_b$ signal pulse occurs. The $P_3$ pulse is differentiated by the capacitor 182 and resistors 174, 173 and is presented at the cathodes of the diodes 170–172 and 175 as a negative pulse. Due to the positive voltage across the diodes 170, 171 and 172 in the AND circuit 166 from their anodes to their cathodes, none of these diodes can conduct the negative going $P_3$ pulse. The negative going $P_3$ pulse is transmitted through the capacitor 182 and the diode 175 in the stage 163. This negative voltage pulse appears across the load resistor 176 and is inverted by the inverter 177. The inverter 177 provides a positive pulse which triggers the delay multivibrator 178. The "1" output of the delay multivibrator 178 then provides a negative going pulse of n (zero) voltage level and of a duration approximately equal to the duration of a reproduced pulse (e.g., the pulse $S_b$). This negative going pulse is applied to the gate 179 and is inverted therein. Assuming that the gate 179 is enabled by an enabling missing bit signal of n (zero) voltage level, the output of the NAND gate 179 is a positive pulse which is applied to the input of one of the first stages (A) of the deskew buffers 90 (FIG. 2). The gate 179 output is the renewed pulse.

During the sequence of pulses wherein the pulse $P_3$ is used to provide the missing pulse output, the inputs to the diodes 170, 171 and 172 of the other AND circuits 164 and 165 will not all be at n (zero) voltage levels. For example, the input to the diodes 172 in the gates 164 and 165 are p voltage levels corresponding to the bit $\bar{A}$. Since A is a "one" bit, $\bar{A}$ corresponds to a p voltage level. The diodes 172 will therefore be conductive during the time $P_1$ and $P_2$ pulses occur. These pulses will be bypassed through the diodes 172 in each of the stages 161 and 162.

Referring again to FIG. 10, it will be noted that in the illustrated case the reference pulse $P_3$ is utilized to supply a renewed pulse in lieu of the absent reproduced pulse $S_b$. The reference pulse $P_3$ is the one of the three phase pulses furtherest from the phase location of the last reproduced pulse $S_a$, which arrived prior to the missing reproduced pulse $S_b$. While the $P_1$ or $P_2$ pulse is closer to the expected time of occurrence of $S_b$ than the $P_3$ pulse, the $P_3$ pulse is utilized since it is the furtherest in time of all the three phase pulses $P_1$, $P_2$ and $P_3$ which occur without the intervention of the $S_b$ pulse. While the $P_1$ or $P_2$ pulse can also be used to initiate the generation of the renewed pulse, it is more desirable to use $P_3$ for the following reason. If the tape should slow down somewhat, the $S_b$ pulse might possibly be delayed. A greater amount of time is therefore allowed by the use of the $P_3$ pulse for a delayed signal pulse to be read from the tape, than would be the case if the $P_1$ or the $P_2$ pulses were used to initiate the generation of the renewed pulse in the circuit of FIG. 11.

It will be appreciated that a timing analysis circuit as shown in FIG. 8 and a renewed pulse insertion circuit such as shown in FIG. 11 are provided for each reading channel. The renewed pulse outputs from each of the renewed pulse insertion circuits are connected by way of leads in the cable 88 (FIG. 2) to inputs of the first stages A of the deskew buffers.

ANOTHER MISSING PULSE DETECTION AND RENEWED PULSE INSERTION CIRCUIT

FIG. 6a shows a circuit which may be used alternatively to the missing pulse detection and insertion circuits of FIGS. 6, 8 and 11 to provide a missing pulse signal. A portion of a reading channel 190 for one of the tracks of a multi-track tape record 193 is illustrated. This includes a pre-amplifier 191 having its input connected to a magnetic head 192 for reading a track on the magnetic tape record 193. The output of the preamplifier 191 is connected to the input of a reading amplifier 194. This reading amplifier may be of the same type as the reading amplifier 131. The pulse $S_1$ which represents binary "one" bits and the pulse $S_0$ which represents binary "zero" bits are obtained from the "1" and the "0" outputs of the reading amplifier 194. These pulses are applied to a reset pulse rejection circuit (not shown) similar to the circuit shown in FIG. 4. The output of the reset pulse rejection circuit is connected to an adding circuit which may be a transmission gate performing a logical OR function.

Before application to the adding circuit 195, the reset pulses are removed in the reset pulse rejection circuit so that the output of the adding circuit 195 is a train of self-clocking pulses.

A frequency controlled oscillator 196 is provided which generates pulses at a nominal frequency of 120 kc. This oscillator is synchronized by the $S_1$ and $S_0$ signal pulses. The oscillator 196 may be similar to the oscillator 84 described in connection with FIG. 6 or FIG. 6b. The frequency of the oscillator 196 is, however, different from the frequency of the oscillator 84, (120 kc. instead of 360 kc.). The pulses provided by the oscillator 196 will follow the $S_1$ and $S_0$ pulses. If a drop-out occurs in the track from which the $S_1$ and $S_0$ pulses are produced, the oscillator 196 will continually provide pulses. The repetition rate of these pulses will slowly drift from the rate of the signal pulses toward the nominal frequency of the oscillator (120 kc.). The output of the oscillator 196 is applied to one input of a comparator circuit 197. The combined $S_1$ and $S_0$ pulses from the adding circuit 195 are applied to another input of the comparator. The comparator 197 may be an "exclusive-or" circuit which provides an output pulse when one and only one pulse is applied to its inputs.

The comparator may also include a pulse stretching circuit connected to the input thereof which receives the signal pulses from the adder. This pulse stretching circuit will provide a range of a portion of a cycle of the pulses from the oscillator over which a renewed pulse signal may be inhibited.

In operation, if a pulse is provided by the oscillator alone during any pulse repetition cycle, a renewed pulse signal will be generated. If a signal pulse occurs it will be stretched in the comparator. The comparator will be inhibited on occurrence of a signal pulse so that no renewed pulse signal is produced. Since a drop-out will cause the absence of an $S_1$ or $S_0$ signal pulse during a clock pulse interval, the absence of an $S_1$ or $S_0$ signal pulse will be detected and, instead, a renewed pulse signal will be provided. This renewed pulse signal is applied to the deskew buffer 90 (FIG. 2). An advantage of the circuit shown in FIG. 6a is its simplicity. The circuits shown in FIGS. 6, 8 and 11 to detect and insert missing pulses require only one common flywheel oscillator 84 for all channels. Further, they may be somewhat more reliable in operation since in cases of drop-outs the flywheel oscillator remains locked to the tape clock pulses which may be varying due to the varying speed of tape travel.

ASYNCHRONOUS SHIFT REGISTER

The deskew buffers (90, FIG. 2) include a matrix of asynchronous shift registers. One of these registers is provided for each data and check bit reproducing channel 70 to 79. The register for the first channel 70 is shown in FIG. 12.

The illustrated register includes three flip-flop stages 200, 201 and 202. Each of these stages 200, 201 and 202 has a pair of flip-flops 203–204, 205–206, and 207–208, respectively. These flip-flops are of the set and reset type and may be similar to the flip-flops shown in FIG. 21a, omitting the steering circuit. The flip-flops have set S and reset R input terminals and "1" and a "0" output terminals. When in the reset condition, the "0" output terminal presents a n (zero) voltage level and the "1" output terminal presents a (p) voltage level. The flip-flops are set or reset by positive pulses applied to their input terminals. In accordance with the convention adopted previously in this specification, a binary "one" is represented by the n level at the "1" output of a set flip-flop and a binary "zero" is represented by the p level at the "1" output of a reset flip-flop.

In accordance with the legend used in FIG. 2 to identify the stages of the deskew buffers 90, the stages A of the deskew buffers include the flip-flop stages 200 of the matrix of the asynchronous shift register. Similarly, the stages B and C, respectively, include the flip-flop stages 201 and 202.

The $S_1$ output (representing binary "one" bits) of the reset pulse rejection circuit (FIG. 4) is connected to the set input of the flip-flop 203 in the first stage 200. The $S_0$ output (representing binary "zero" bits) of the reset pulse rejection circuit (FIG. 4) is connected to the set input of the flip-flop 204 of the first stage 200. The renewed pulses $M_p$ from the renewed pulse insertion circuit shown in FIG. 11 (or from the output of the comparator in FIG. 6a) are applied to the set input of both flip-flops 203 and 204. Although the renewed pulses are applied to the set terminal as though they were the $S_1$ and $S_0$ pulses, it may be desirable to provide another set input terminal in each of the flip-flops 203 and 204 for the renewed pulses. This may be accomplished by means of additional coupling diodes connected in the set inputs to the flip-flops as shown in FIG. 21a.

The first and second stages 200 and 201 of the register are interconnected by means of a pair of NAND gates 210 and 211. The "1" output of the flip-flop 203 is connected to an input of the NAND gate 210 and the "1" output of the flip-flop 204 is connected to an input of the NAND gate 211. The output of the NAND gate 210 is connected through a delay or pulse stretching circuit 212 to the set input of the flip-flop 205. The output of the NAND gate 211 is connected through a delay or pulse stretching circuit 213 to the set input of the flip-flop 206. The delay circuits 212 and 213 may be R-C-L delay lines which extend the duration of the output pulse from the NAND gates 210 and 211. The output of the delay circuit 212 is also connected to the reset input of one of the first stage flip-flops 203. The output of delay circuit 213 is connected to the reset input of the other first stage flip-flop 204. The flip-flops and gates may have different speeds of operation. The delay circuits prolong the pulses which are applied to the set and reset inputs and allow sufficient time for the flip-flops to change state. Thus, the delays 212 and 213 permit some tolerance in the design of the components in the register.

The second stage flip-flops 205 and 206 are coupled to the third stage flip-flops 207 and 208, respectively by means of NAND gates 214 and 215 and delay circuits 216 and 217. The coupling circuits between the first and second and third stages are substantially identical.

The NAND gate 210 and the NAND gate 211 have two additional inputs. These inputs are connected to the "0" outputs of the second stage flip-flops 205 and 206. The third stage flip-flops 207 and 208 are similarly connected to inputs of the NAND gates 214 and 215 which couple the second and third stages 201 and 202.

The third stage 202 of the register is the last or final stage thereof. Although three stages are illustrated, more stages may be used in order to provide additional capacity for data storage in the register. Fewer stages may be used, if less capacity is required. Output circuits are connected to the final stage 202. These output circuits include a NAND gate 218 and another NAND gate 219. The NAND gate 218 has one of its inputs connected to the "0" output of the flip-flop 207 and the other of its inputs to the "0" output of the flip-flop 208. The "1" output of the flip-flop 207 provides voltage levels which represent bits which are designated "$R_1$." The "0" output of this flip-flop 207 provides bits $\overline{R}_1$ which are the complements of the bits $R_1$. The "1" output of the other last stage flip-flop 208 provides voltage levels which represent bits which are designated as "$R_0$." The "0" output of this flip-flop 208 provides bits $\overline{R}_0$ which are the complements of the bits $R_0$. The output of the NAND gate 218 provides one of ten inputs of the NAND gate 219, namely the channel 70 register input. The other nine inputs to this NAND gate 219 are provided by the outputs of gates similar to the gates 218 in the last stages of the registers for each of the other channels 71 to 79. The NAND gate 219 provides an output signal level which indicates whether or not bits are stored in the final stages of all of the registers constituting the deskew buffer. This signal is identified as the "All Buffers Full Signal."

Also for purposes of latter identification, the bits represented at the "1" and "0" outputs of the flip-flop 205 are designated "$Q_1$" and "$\overline{Q}_1$," respectively. The bits represented at the "1" and "0" outputs of the flip-flop 206 are designated "$Q_0$" and "$\overline{Q}_0$."

For purposes of resetting the last stage 202 of the register, a circuit 220 is provided. This circuit includes a gate 97 (see FIG. 2). The output of this gate drives an inverter 221. The character demand signal from the computer or other utilization apparatus is applied to one input of the gate 97. A reset pulse from the delayed pulse generator 96 is applied to the same input. A reset pulse from the start block character detector 104, identified as the "Sync Reset" pulse is applied to the other input of the NAND gate 97. When any of these input signals to the NAND gate are present as a positive pulse, the output of the NAND gate 97 becomes a pulse of n (zero) voltage level. This n voltage level pulse is inverted and appears as a positive pulse at the reset inputs of the flip-flop 207 and 208 and serves to reset the final stage 202 of the register.

Each stage 200, 201 and 202 of the register has four different stable states or conditions of operation. One of these states is relegated to represent the absence of stored data and the three remaining states provide storage for three different types of data bits. It is a feature of the invention to effectively utilize each of these four stable states for the storage of digital information. In the system provided by the invention, an $S_1$ pulse which represents a binary "one" bit is applied to the flip-flop 203 in the first stage 200 and stored therein as a set condition of this flip-flop. An $S_0$ pulse which represents a binary "zero" bit is applied to the other flip-flop 204 and is stored therein as a set condition of that flip-flop 204. Since only an $S_1$ or an $S_0$ pulse occurs at any one time, a set condition of either the flip-flop 203 or 204 will represent a data bit reproduced from the first reproducing channel 70. A renewed pulse $M_p$ causes both flip-flops 203 and 204 to be set simultaneously. Thus, the presence of a renewed bit in lieu of a reproduced data bit is indicated by set conditions of both flip-flops of the same stage of the register.

When a "one" bit is stored in the stage 200, one of the flip-flops 203 is set and the other of the flip-flops 204 is reset. Conversely, when a "zero" bit is stored in the stage 200 the other flip-flop 204 is set and the flip-flop 203 is reset. For every reproduced bit $S_1$ or $S_0$ the flip-flops 203 and 204 will store either the bit or its complement. The correct value of each reproduced bit is presented at the "1" output of the flip-flop 203 to which the reproduced pulses $S_1$ which represent binary "one" bits are applied because this flip-flop 203 is set when a "one" bit is stored in the stage 200 and reset when a "zero" bit is stored in the stage 200.

The foregoing relationships are common to each of the other stages 201 and 202. The value of the bit $R_1$ represents the correct value of the reproduced bits stored in the final stage of the register for the case where the register is not empty and not storing an $M_p$ pulse.

When either a "one," "zero" or a renewed bit pulse is applied to the first stage 200 of the register, that pulse will advance from the first stage 200 to the second stage 201 and from the second stage 201 to the last stage 202 so long as the later stages do not have bits already stored therein. Assuming for purposes of illustration that an $S_1$ pulse has occurred, this pulse sets the flip-flop 203 in the first stage. The flip-flops 205 and 206 in the second stage 201 are empty. Accordingly, n voltage levels are applied to the inputs of the NAND gates 210 and 211 connected to the "0" outputs of the second stage flip-flops 205 and 206. The input of the NAND gates 210, which is connected to the "1" output of the flip-flop 203 returns to an n voltage level when the flip-flop 203 is set. The NAND gate 210 then provides a p or positive level at its output which is transmitted through the delay circuit 212. This positive level sets the flip-flop 205 and simultaneously resets the flip-flop 203 in the first stage 200. The second stage 201 then stores a binary "one" bit. The binary "one" bit effectively advances to the flip-flop 207 of the last stage 202 of the register in the same manner as that bit advanced between the flip-flops 203 and 205. The flip-flop 205 becomes reset when the bit passes to the flip-flop 207.

Positive levels are applied to inputs of the gates 214 and 215 which couple the second stage 201 and last stage 202. This positive level inhibits these gates from passing subsequently occurring bits to the last stage 202. Accordingly, the second bit to occur effectively advances to the second stage 201 and remains stored therein. A third bit will be stored in the first stage 200. When the last stage 202 is reset, the bit stored in the second stage advances to the last stage and the bit stored in the first stage 200 advances to the second stage 201.

The register operates similarly with $S_0$ and $M_p$ bits. In the latter case, the set condition of both flip-flops in each stage is transferred successively from the first stage 200 to the second stage 201 and finally to the last stage 202.

The storage of a bit in the last stage 202 of the register is represented by the set condition of either of the flip-flops 207 or 208. When either of the flip-flops 207 or 208 is set the "0" output terminal of one of these flip-flops is at a positive voltage level. The NAND gate 218 has both of its inputs at n (zero) voltage levels, when the last stage 202 of the register is empty (both flip-flops 207 and 208 reset). At least one of the inputs of the gate 218 will be positive when a bit is stored in the last stage 202. Accordingly, the output of the NAND gate 218 will be a positive voltage level when the last stage 202 of the register is empty and a n voltage when the last stage of the NAND gate 202 has a bit stored therein. A n voltage level from the gates 218 in the last stages in each of the ten registers constituting the deskew buffer 90 is applied to the NAND gate 219, when the registers each have a bit stored therein. A positive All Buffers Full Signal is then provided by the NAND gate 219.

The criterion for the removal of inter-channel time displacement or deskew in the system provided by the present invention is the simultaneous storage of a bit in the last stages of each of the asynchronous shift registers in the matrix of asynchronous shift registers which constitute the deskew buffers 90. The All Buffers Full Signal provided by the NAND gate 219 is therefore an indication of the simultaneous presence of the bits belonging to the same character. These bits may then be read out of the buffer 90 into the error correction system provided by the invention. It will be apparent that it is an important feature of the invention to provide in the asynchronous shift register, facilities for storage of renewed bits as well as bits which are read from the tape. Since the renewed bits occur in the same time relationship as the absent reproduced bits which they represent, the renewed bits serve the purpose of the absent reproduced bits in the deskew buffers and allow the buffer to eliminate inter-channel time displacement in the presence of drop-outs.

The error correction system receives bits signals from the deskew buffers 90. This system is illustrated in its entirety in FIG. 13.

ERROR CORRECTION SYSTEMS

Before considering the error correction systems shown in the drawings in detail, the theoretical aspects of these error correction systems will be discussed.

The error correction systems serve the dual function of supplying the correct value for each renewed bit in a character and for correcting the values of any bits which are not missing but which may be incorrect due, for example, to improper operation of the station. The bits of each character are arranged or coded into a number of parity subgroups. These parity subgroups are unique combinations of data and check bits which have given parity. Desirably, the parity of each group is the same. A plurality of representations or expressions are obtained for each parity group. The expressions are in terms of other bits of the character in the group. The correct values for the renewed bits are derived from at least one of the groups of bits which represent a renewed bit and which itself does not contain any renewed bits.

Error correction may be obtained by any one of two different means provided by the invention. First, the correct value of any given bit can be obtained on the basis that the value provided by the majority of the groups which represent the given bit and which do not include renewed bits will provide the correct value for that given bit. Second, the correct value of the given bit can be obtained by checking the parity of the bits in different parity groups which include the given bit. If parity is correct the value of given bit is correct. If parity is incorrect the value of the given bit is inverted.

Two embodiments of the error correction system provided by the invention are illustrated in the drawings. FIGS. 13 to 17a illustrate one of these embodiments. FIGS. 29 to 33 illustrate another of these embodiments. The error correcting systems, although particularly useful in the recording and reproducing systems provided by the present invention for the reason that they have means for providing the correct value for renewed bits, will also be generally useful in digital information handling systems.

An understanding of the theoretical basis of the error correcting system provided by the invention will follow from Tables II and III which are reproduced below. These tables show the parity groups into which each character of information to be handled by the error correction system is coded or arranged. There are four parity groups identified hereinafter as $C_1$ to $C_4$. Each of these groups includes a different one of the check bits $K_1$, $K_2$, $K_3$ and $K_4$. Each of these parity groups includes a unique combination of four bits including a check bit. The same data bit is common to more than one, and particularly two, of these parity groups. Accordingly, two check bits check each data bit.

By allotting four check bits per character, additional bits may be included in the character and may still be checked by the check bits. Table III shows that five additional data bits may be included in the characters if desired. As illustrated in Table III, the first parity group $C_1$ may include bits in the first row of the table. The first parity group includes the bits $K_1$, $R_1$, $R_2$, $R_3$, $R_7$, $R_8$, $R_9$ and $R_{11}$. It is apparent from Table III that the first and second parity groups $C_1$ and $C_2$ both check the first data bit $R_1$. Further, it is apparent that at least two of the parity groups check each of the other data bits $R_2$ to $R_{11}$. This relationship is also illustrated in Table IV.

In the event that additional check bits were recorded on the tape, more than 11 data bits could be allocated to each character. In the error correcting systems provided by the invention six or seven data bits correspond to each character. The additional data bits are shown in the tables to make it clear that the invention is useful in correcting the bits of characters of any bit length.

The parity groups each are divisible into parity sub-groups. The parity sub-groups represent or express the values of bits in the parity groups from which they are derived. Each parity group shown in Table II is divided into three parity sub-groups. Each of these parity sub-groups includes the check bits of the parity group and two data bits. Thus, for example, the parity group tabulated in the first column of Table II may be divided into the following parity sub-groups. The bit $R_1$ is represented by the parity sub-group including bits $K_1$, $R_1$ and $R_3$. The bit $R_2$ is represented by the parity sub-group including the bits $K_1$, $R_1$ and $R_3$. The bit $R_3$ is represented by the parity sub-group including the bits $K_1$, $R_1$ and $R_2$. In the second column

TABLE II

| $C_1$ | $C_2$ | $C_3$ | $C_4$ |
|---|---|---|---|
| $K_1$ | $K_2$ | $K_3$ | $K_4$ |
| $R_1$ | $R_1$ | $R_4$ | $R_5$ |
| $R_2$ | $R_4$ | $R_2$ | $R_6$ |
| $R_3$ | $R_5$ | $R_6$ | $R_3$ |

TABLE IV

| Two parity groups | $C_1$ | $C_2$ | | | $R_1$ |
|---|---|---|---|---|---|
| | $C_1$ | $C_3$ | | | $R_2$ |
| | $C_1$ | $C_4$ | | | $R_3$ |
| | $C_2$ | $C_3$ | | | $R_4$ |
| | $C_2$ | $C_4$ | | | $R_5$ |
| | $C_3$ | $C_4$ | | | $R_6$ |
| Three parity groups | $C_1$ | $C_2$ | $C_3$ | | $R_7$ |
| | $C_1$ | $C_2$ | $C_4$ | | $R_8$ |
| | $C_1$ | $C_3$ | $C_4$ | | $R_9$ |
| | $C_2$ | $C_3$ | $C_4$ | | $R_{10}$ |
| Four parity groups | $C_1$ | $C_2$ | $C_3$ | $C_4$ | $R_{11}$ | of Table II another representation of the bit $R_1$ is found in the parity sub-group including the bits $K_2$, $R_4$ and $R_5$. Similarly, at least two parity sub-groups are provided which represent each of the data bits $R_1$ to $R_6$. In the event that additional bits $R_7$ to $R_{11}$ were provided, it will be observed that $R_7$ to $R_{10}$ would each be represented by three parity sub-groups. The bits $R_{11}$ would be represented by four parity sub-groups. Each of the parity groups illustrated in Table II has even parity; that is to say, the number of bits in each group which represents binary "one" is an even number. A given parity sub-group will have an even number of "one" bits, if the bit which it represents is a binary "zero" bit and an odd number of "one" bits, if the bit which it represents is a binary "one." The parity sub-group then represents the given bit in terms of its parity, since a parity check for odd parity of the parity sub-group will provide a binary "one," if the given bit is a binary "one" bit and a binary "zero," if the given bit is a binary "zero" bit. In other words, each of the parity sub-groups has parity opposite to the parity of the group from which it is derived. When the parity sub-group is checked for such opposite parity, the bit which it represents will have the value provided by the parity check.

In the case where any given bit is a renewed bit, the parity sub-group representing that renewed bit, which itself does not include any other renewed bits can be used to provide the correct value of that renewed bit. Where a character includes four check bits and six data bits as tabulated in Table II, the correct values for up to two renewed bits can be supplied. This is because each bit is represented by the bit itself and two parity sub-groups each including a different check bit. In the event that more then six data bits are included in the same character, up to two renewed bits can be corrected by first obtaining the correct value of any of the bits which are checked by more than two of the check bits and then using this correct value for determining the value of any renewed bits which are checked by only two check bits. In other words, the highest order bits which are checked by the highest number of check bits are corrected first. The corrected value for the highest order bit is fed back to the system and used to determine the corrected value for any erroneous or renewed bits which are checked by the next highest number of check bits. Finally, the corrected values of bits which are checked by the highest and by the next highest number of check bits are both fed back to the system and are used to provide the correct values of the bits checked by the lowest number of check bits. This last mentioned concept of feeding back incorrect bits checked by higher numbers of check bits will be illustrated in the embodiment of the invention shown in FIGS. 29 to 33 of the drawings.

Returning now to FIG. 13 of the drawings, the outputs of the last stages of the deskew buffers are connected to

TABLE III

| | Two checks | | | | | | Three checks | | | | Four checks |
|---|---|---|---|---|---|---|---|---|---|---|---|
| $K_1$ | $R_1$ | $R_2$ | $R_3$ | | | | $R_7$ | $R_8$ | $R_9$ | | $R_{11}$ |
| $K_2$ | $R_1$ | | | $R_4$ | $R_5$ | | $R_7$ | $R_8$ | | $R_{10}$ | $R_{11}$ |
| $K_3$ | | $R_2$ | | $R_4$ | | $R_6$ | $R_7$ | | $R_9$ | $R_{10}$ | $R_{11}$ |
| $K_4$ | | | $R_3$ | | $R_5$ | $R_6$ | | $R_8$ | $R_9$ | $R_{10}$ | $R_{11}$ | valid bit recognition circuits 230 which provide outputs indicative of whether the bits are reproduced data or check bits or renewed bits. The outputs of the valid bit recognition circuits are termed valid bit signals and are identified as $GR_1$ to $GR_6$ and $GK_1$ to $GK_4$. The outputs of each register of the deskew buffers 90 which provide the $R_1$ through $R_6$ and $K_1$ through $K_4$ bits are applied to parity sub-grouping circuits 231. The parity sub-grouping circuits arrange the bits into parity sub-groups which represent the data bits $R_1$ to $R_6$ and check the parity of each of these parity sub-groups. The results of these parity checks are transferred to a majority vote error correction circuit 232. The data bits themselves, $R_1$ to $R_6$, and the valid bit signals therefor, $GR_1$ to $GR_6$, are also transferred from the deskew buffer to the majority vote error correction circuit. The valid bit signals are arranged into groups corresponding to the parity sub-groups in parity grouping circuits 233 for the valid bit signals. These parity grouping circuits provide bits for each parity sub-group which bits have a value which is indicative of whether any of these parity sub-groups includes a renewed bit. These valid bit signals for the parity sub-groups are identified herein as $GY_1$ to $GY_6$ and $GZ_1$ to $GZ_6$.

The valid bits signals for the parity sub-groups, are also transferred to the majority vote error correction circuits. The majority vote error correction circuits operate to provide a value for each of the data bits $R_1$ to $R_6$ which corresponds to the values of the majority of each data bit itself and the parity sub-groups representing that data bit, except where the data bit or any of the parity sub-groups which represent the data bit include a renewed bit. These are the correct values for the data bits and are identified as $A_1$ to $A_6$. In other words, the correct values for any renewed bit is derived from the parity sub-group which represents the renewed bit, but only if this parity sub-group does not include another renewed bit. Error correction is accomplished on the basis that the majority of the representation of each bit will in all probability represent the correct value for that bit.

When the output of the parity grouping circuit for each bit of a character indicates that at least one parity sub-group representing that bit includes no renewed bits, the systems will provide the correct value for that missing bit in the majority vote error correction circuits 232. The valid bit signal for a renewed bit or the valid bit signals for the parity sub-groups which represent that renewed bit, if available, indicate that the correct value for that renewed bit can be supplied. A character available signal generator 234 is provided which is enabled to provide a character available signal if at least one of the representations for each bit in a character includes no renewed bits and if all of the last stages of the registers are full. An indication of the latter is provided by the all buffers full signal. The circuit for obtaining the all buffers full signal is shown in FIG. 12. The character available signal generator 234 provides a character available signal to the user apparatus which may be a computer, a program controller for the computer or any other input-output equipment such as an intermediate storage memory. When the character available signal is supplied, the data bits of the character will be read out of the majority vote error correction circuit into the user apparatus.

Figure 13:
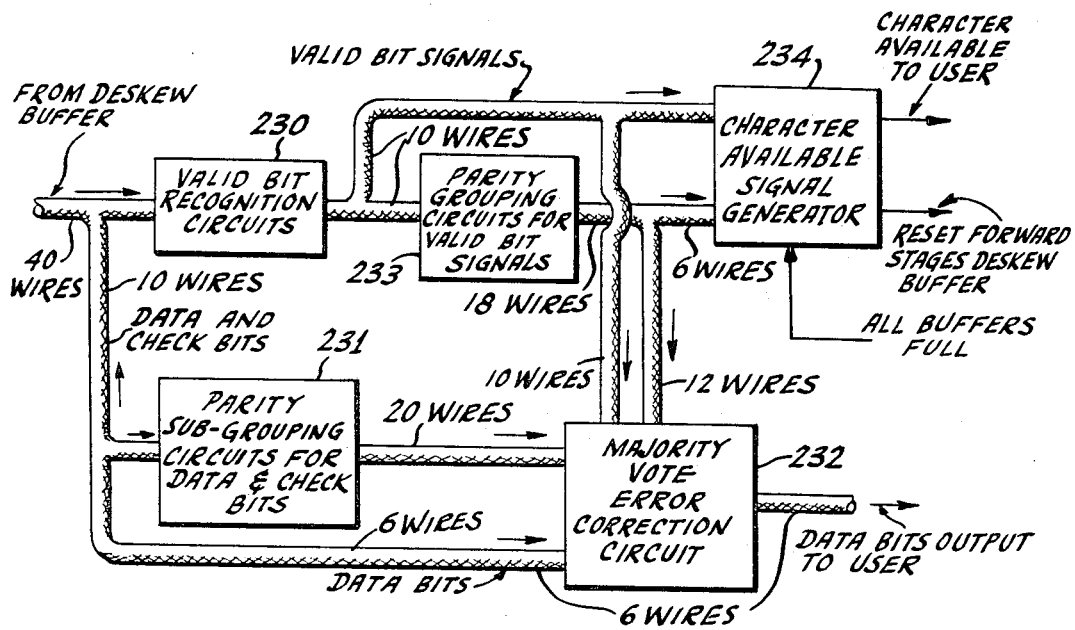
FIGURE 13 is an overall block diagram of an error correction system provided by the invention and its associated circuits.

The circuits of the various component parts of the error correction system shown in FIG. 13 which provide the correct value for the data bit $R_1$ are shown in FIGS. 14 through 17. Six other circuits (not shown) which are, substantially, duplicates of these illustrated circuits provide corrected values for the other data bits $R_2$ to $R_6$.

VALID BIT RECOGNITION CIRCUIT

Figure 14:
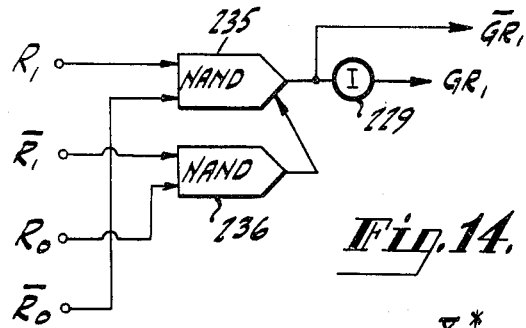
FIGURE 14 is a block diagram of a valid bit recognition circuit included in the error correction system shown in FIG. 13.

The valid bit recognition circuit for the $R_1$ bit is shown in FIG. 14. This circuit has four inputs; two from the "1" and "0" outputs of each flip-flop 207 and 208 of the last stage 202 in the register (FIG. 12) of the deskew buffer which stores the $R_1$ bits. The inputs have already been identified $R_1$, $\overline{R}_1$, $R_0$ and $\overline{R}_0$ in FIG. 12 of the drawings. As previously described, a renewed bit signal is represented by the storage of a binary "one" bit (a set condition) in each of the pair of flip-flops 207 and 208 in the last stage 202 of the register shown in FIG. 12. When the last stage of the register is empty, both flip-flops are in the reset condition. When one or the other, but not both, of the flip-flops is in the set condition, a reproduced $R_1$ data bit is stored therein. The circuit shown in FIG. 14 provides an output signal $GR_1$ which represents a binary "one" bit when the latter condition exists. Thus, when one flip-flop is set and the other reset, the $R_1$ input will represent a binary "one" and the $\overline{R}_0$ input will also represent a binary "one." These inputs are applied to a NAND gate 235 which provides a binary "zero" output when the $R_1$ and $\overline{R}_0$ both represent binary "one" bits. This binary "zero" output signal is inverted in an inverter 229 to provide the output bit $GR_1$ which represents a binary "one" to indicate that a valid bit is stored in the last stage of the register.

In the event that a binary "zero" is stored in the last stage 202 of the register, the inputs $\overline{R}_1$ and $R_0$ to the NAND gate 236 will both represent binary "one" bits. The NAND gate 236 has a common output with the NAND gate 235. As mentioned previously, this common output is equivalent to a gate which performs the logical OR function connected to the outputs of both gates 235 and 236. Accordingly, binary "zero" bit signals will appear at the input of the inverter 229 and be inverted to provide the $GR_1$ valid bit signal. When, either a renewed bit is stored in the last stage of the register, or the last stage 202 of the register is empty, the $GR_1$ bit will be a binary "zero." A $\overline{GR}_1$ output is obtained directly from the output of the NAND gates 235 and 236 for use in other circuits of the error correcting system.

VALID BIT GROUPING CIRCUIT

Figure 15:
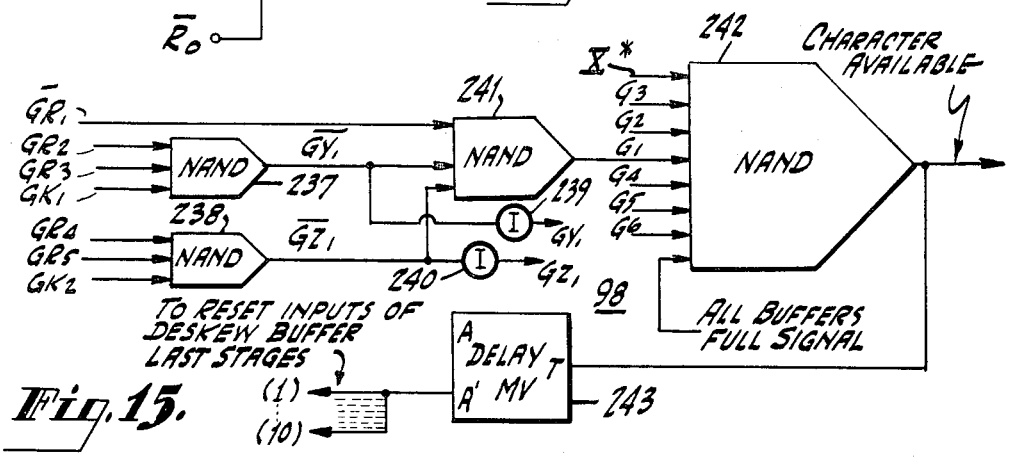
FIGURE 15 is a block diagram of a parity grouping circuit included in the error correction system of FIG. 13, for valid bit digits and of a cooperating circuit also included in the error correction system which provides a signal indicating when a character is available to be read out of the magnetic record reproducing system shown in FIG. 2.

FIG. 15 shows the circuit which groups the valid bit signals corresponding to the bits in the parity sub-groups which represent the $R_1$ bit. As pointed out previously, the bits in the parity sub-groups which represent the $R_1$ bits include (a) the bits $K_1$, $R_2$ and $R_3$ and (b) the bits $K_2$, $R_4$ and $R_5$. Valid bit recognition circuits for the $K_1$, $K_2$, $R_2$, $R_3$, $R_4$ and $R_5$ bits, respectively, provide the valid bit signals $GK_1$, $GK_2$, $GR_2$, $GR_3$, $GR_4$ and $GR_5$. The $GR_2$, $GR_3$, $GK_1$ valid bit signals for the first parity sub-group are applied to a NAND gate 237. This first representation for the $R_1$ bit is referred to herein as the $Y_1$ representation. The valid bit signals $GR_4$, $GR_5$ and $GK_2$ corresponding to the other representation of $R_1$ are applied to another NAND gate 238. This other representation is referred to herein as the $Z_1$ representation. The NAND gate 237 provides a binary "zero" bit signal when all of the $GR_2$, $GR_3$, $GK_1$ bits are binary "one" bits. In other words, a binary "zero" bit signal is provided when $K_1$, $R_1$ and $R_2$ bits are all valid. Similarly a binary "zero" bit is provided by the NAND gate 238 when the $K_2$, $R_4$, and $R_5$ bits are all valid. The outputs of these gates 237 and 238 are respectively inverted in inverters 239 and 240, to provide outputs $GY_1$ and $GZ_1$. Prior to inversion these bits are therefore logically $\overline{GY}_1$ and $\overline{GZ}_1$ bits.

The bits $\overline{GR}_1$ from the valid bit recognition circuit show in FIG. 14 and the outputs of the NAND gates 237 and 238 providing the bits $\overline{GY}_1$ and $\overline{GZ}_1$ are applied to a NAND gate 241. This NAND gate 241 provides an output which represents a binary "one," if any of the $\overline{GR}_1$, $\overline{GY}_1$ and $\overline{GZ}_1$ inputs thereto are binary "zero" bit signals. The latter will be the case if the $GR_1$, $GY_1$ or $GZ_1$ bits are binary "one" bits. The NAND gate 241 therefore performs the logical OR function on the bits GR₁, GY₁ and GZ₁. The output of the NAND gate 241 will be a binary "one" signal, if any of the representations $R_1$ $Y_1$ or $Z_1$ of the bit $R_1$ is valid and includes no renewed bits. The output of the NAND gate 241 is designated as $G_1$.

The $G_1$ signal is applied to a NAND gate 242 which performs the function of generating the character available signal. Other signals $G_2$, $G_3$, $G_4$, $G_5$ and $G_6$, which are derived by circuits which are similar to the circuit which derives the $G_1$ bit, are also applied to inputs of the NAND gate 242. All of the $G_1$ to $G_6$ bits will be binary "one" bits when at least one of the representations of all of the $R_1$ to $R_6$ bits is valid. The all buffers full signal is also applied to an input of the NAND gate 242. A signal X* which is derived from the output of the start block character detector (104, FIG. 2) is also applied to an input of the NAND gate 242. The circuit for generating this signal will be described presently in connection with FIG. 20 of the drawings. The X* signal is normally an $n$ (zero) voltage level which does not inhibit the NAND gate 242 from generating a positive output level. Upon occurrence of the all buffers full signal of zero voltage level and the presence of binary "one" bits at the $G_1$ to $G_6$ inputs of the gates 242, a positive level will be provided at the output of the NAND gate 242, as the character available signal. This positive level is transmitted to the user apparatus as pointed out in connection with FIG. 13.

The valid bit recognition circuit for the $R_1$ bit operates in accordance with the following Boolean equation:

$$\overline{GR}_1 = R_1\overline{R}_0 + R_0\overline{R}_1 \quad (4)$$

Thus, if a "one" bit is stored in one and only one of the flip-flops of the last stage of the register shown in FIG. 12, GR₁, the output of the valid bit recognition circuit will be a binary "one" bit. Otherwise GR₁ will be a binary "zero" bit.

The parity grouping circuits for the valid bits signals which repersent the bit $R_1$ operate in accordance with the following Boolean equations:

$$GY_1 = GK_1GR_2GR_3 \quad (5)$$
$$GZ_1 = GK_2GR_4GR_5 \quad (6)$$

The NAND gates 237 and 238 and their associated inverters 239 and 240 perform the logical AND function as pointed out above. Also as pointed out above, the NAND gate 241 essentially performs a logical OR function. Accordingly, the NAND gate 241 operates in accordance with the Boolean equation:

$$G_1 = GR_1 + GY_1 + GZ_1 \quad (7)$$

PARITY SUB-GROUPING CIRCUITS

Figure 16:
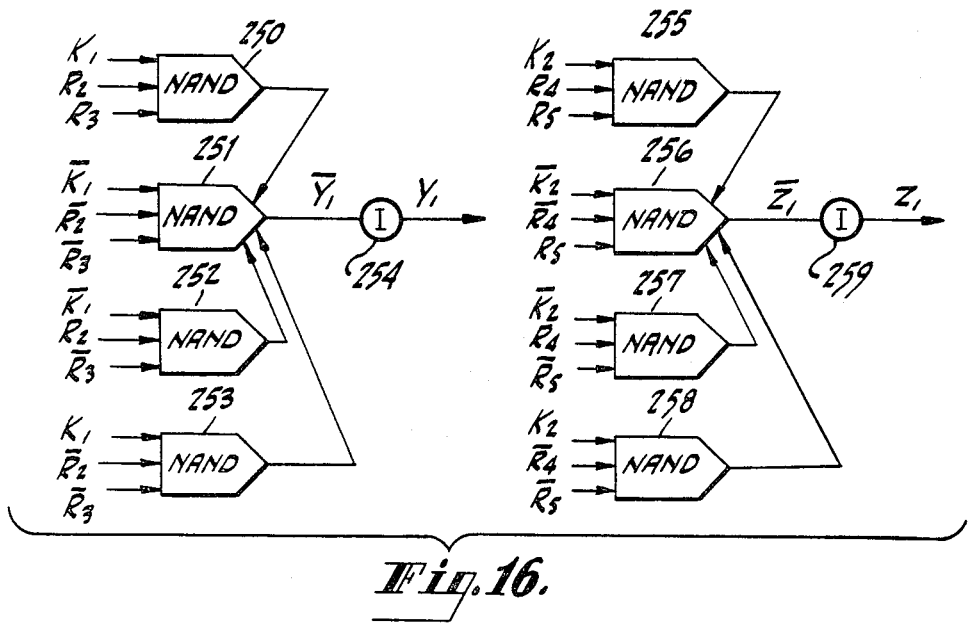
FIGURE 16 is a block diagram of parity grouping circuits included in the error correction circuits shown in FIG. 13.

The circuits which divide the parity groups tabulated in the first two columns of Table II into parity sub-groups which represent the data bit $R_1$ are shown in FIG. 16. These two parity sub-groups have been termed the $Y_1$ and $Z_1$ sub-groups. The circuits shown in FIG. 16 checks the parity of the $Y_1$ and $Z_1$ sub-groups and provide output bits $Y_1$ and $Z_1$ both of which represent the bit $R_1$. The $Y_1$ and the $Z_1$ bits are binary "one" bits, if the parity of their sub-groups is odd. The parity of the bits constituting the $Y_1$ sub-group can be odd only if the bits are related in four different ways as expressed in the following Boolean equation:

$$Y_1 = K_1R_2R_3 + \overline{K}_1\overline{R}_2R_3 + \overline{K}_1R_2\overline{R}_3 + K_1\overline{R}_2\overline{R}_3 \quad (8)$$

Similarly the parity of the bits constituted the $Z_1$ subgroup is odd, if the bits are related in four different ways as expressed in the following Boolean equation:

$$Z_1 = K_2R_4R_5 + \overline{K}_2\overline{R}_4R_5 + \overline{K}_2R_4\overline{R}_5 + K_2\overline{R}_4\overline{R}_5 \quad (9)$$

Equation 8 which provides the $Y_1$ bits is mechanized by the circuit shown to the left in FIG. 16. This circuit includes four NAND gates 250, 251, 252 and 253. When the K₁, R₂ and R₃ bits applied from the deskew buffer 90 (FIG. 2) to the NAND gate 250 are all "ones" (constituting odd parity) the output of the NAND gate 250 is a binary "zero" bit signal. This binary "zero" bit signal is inverted in an inverter 254 and a binary "one" bit signal is provided at the inverter 254 output. This binary "one" bit is the $Y_1$ bit referred to above. The bits $\overline{K}_1$, $\overline{R}_2$ and $\overline{R}_3$ are applied to the inputs of the NAND gate 251. Inverters (not shown) may be connected between the outputs of the registers which supply the various K₁, R₂ and R₃ bits signals in order to invert these bit signals to form the $\overline{K}_1$, $\overline{R}_2$ and $\overline{R}_3$ bit signals, as indicated, in FIG. 16. The NAND gate 251 provides the $Y_1$ bit signal which is a binary "one," when R₃ is the only binary "one" bit in the parity subgroup, such that the parity of the sub-group is still odd. $\overline{K}_1$, $R_2$ and $\overline{R}_3$ bit signals are applied to inputs of the NAND gate 252. In this case the $Y_1$ bit signal will represent a binary "one," if only the R₂ bit signal represents a binary "one" bit, such that the parity of the sub-group is still odd. K₁, $\overline{R}_2$ and $\overline{R}_3$ bit signals are applied to the inputs of the NAND gate 253. The NAND gate 253 and the inverter 254 provide a binary "one" $Y_1$ bit signal, when the K₁ bit signal alone in the parity sub-group represents a binary "one" bit, such that the parity of the sub-group is also odd. It follows from the foregoing that $Y_1$ will be a binary "zero" bit signal, if the parity of the sub-group is even. Thus, the value of the $Y_1$ bit is equal to the value of the $R_1$ bit which it represents.

The circuit which supplies the $Z_1$ bit includes four NAND gates 255, 256, 257 and 258 and an inverter 259. Signals representing the K₂, R₄ and R₅ bits and their complements are applied to the inputs of these gates 255 to 258 as indicated in FIG. 16 and provide a $Z_1$ bit signal which represents a binary "one" when the parity of the sub-group including the bits K₂, R₄ and R₅ is odd. The operation of the circuit which provides the $Z_1$ bit is similar to the operation of the circuit which supplies the $Y_1$ bit. The value of the $Z_1$ bit is also equal to the value of the $R_1$ bit which it represents.

ERROR CORRECTION CIRCUIT

Figures 17, 17A:
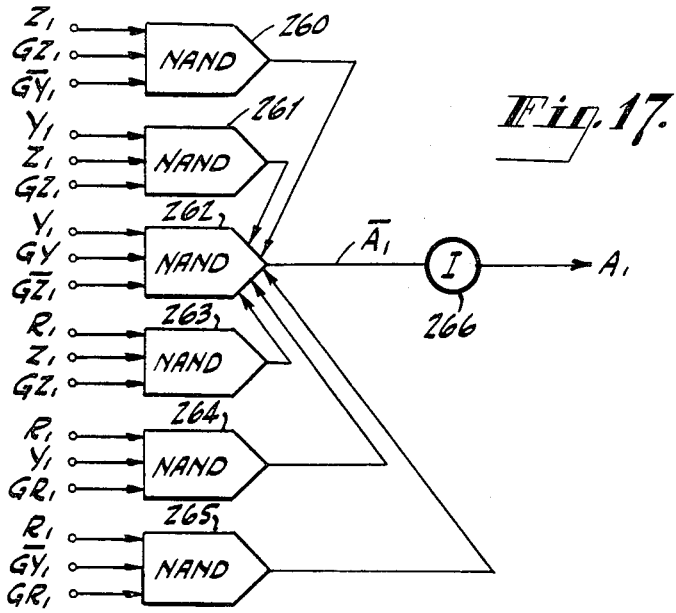
FIGURE 17 is a block diagram of a majority-vote error correction circuit included in the error correction system of FIG. 13 and from which a corrected bit of a multi-bit character can be obtained.
FIGURE 17a is a table illustrating the operation of the majority-vote error correction circuits illustrated in FIG. 17.

Referring now to FIG. 17 and to FIG. 17a, there is shown a circuit for providing the correct value for the $R_1$ bit and a chart which is explanatory of the operation of the circuit. The circuit includes six NAND gates 260, 261, 262, 263, 264 and 265. These gates share a common output as is the case with the gates shown in FIG. 16. By such sharing of a common output, the logical OR function is performed, as was explained above. The common output of the gates 260 to 265 is applied to an inverter 266. The output of the inverter is a bit signal, identified as the $A_1$. The $A_1$ bit signal represents the corrected value of the $R_1$ bit. The inputs to the gate 260 are signals representing the bits $Z_1$, $GZ_1$ and $\overline{GY}_1$. The inputs to the gate 261 are signals representing the bits $Y_1$, $Z_1$ and $\overline{GZ}_1$. The inputs to the gates 262 are signals representing the bits $Y_1$, $GY_1$ and $\overline{GZ}_1$. The inputs to the gates 263 are signals representing the bits $R_1$, $Z_1$ and $GZ_1$. The inputs to the gates 164 are signals representing the bits $R_1$, $Y_1$ and $GR_1$. The inputs to the gates 265 are signals representing the bits $R_1$, $GY_1$ and $GR_1$. It will be observed that each gate includes an input corresponding to at least one of the representations of the bit $R_1$ (i.e., $R_1$, $Z_1$ or $Y_1$) and an output indicating that the bits constituting that representation are all valid. For example, in the case of the NAND gate 260, the $Z_1$ bit signal is applied to one input and the $GZ_1$ bit signal is applied to another input. Accordingly, the NAND get 260 will provide a "zero" bit signal at its output which, after inversion in the inverter 266, will represent a "one" bit corresponding to the representation $Z_1$, if $GZ_1$ represents a "one" bit. When GZ₁ represents a "one" bit, the $Z_1$ representation correctly represents the value of the $R_1$ bit, since no renewed bits are included among the bits K$_2$, R$_4$ and R$_5$, which constitutes the parity sub-group of the bit Z$_1$.

The Table shown in FIG. 17a includes all possible combinations of values of the bits R$_1$, Y$_1$, Z$_1$, GR$_1$, GY$_1$ and GZ$_1$. The values of the bits A$_1$ at the output of the circuit shown in FIG. 17 are indicated in the columns under the heading R$_1$, Y$_1$ and Z$_1$. It will be noted that these A$_1$ bits have a value equal to the majority of the bits R$_1$, Y$_1$ and Z$_1$, taking only those bits R$_1$, Y$_1$ and Z$_1$ for which their associated valid bit signals GR$_1$, GY$_1$, GZ$_1$, are all binary "one" bits. When GR$_1$, GY$_1$, and GZ$_1$ are "one" bits, R$_1$, Y$_1$ and Z$_1$, respectively, include no renewed bits. When GR$_1$ is a "zero" bit, R$_1$ is a renewed bit. When GY$_1$ is a "zero" bit, the parity sub-group providing Y$_1$ includes at least one renewed bit. When GZ$_1$ is a "zero" bit, the parity sub-group providing Z$_1$ includes at least one renewed bit. Referring to the Table of FIG. 17a, several examples will be indicated for illustration. When GR$_1$, GY$_1$ and GZ$_1$ are all "one" bits and R$_1$, Y$_1$, Z$_1$ are all "one" bits, A$_1$ clearly should be a "one" bit as indicated on the table. This is because the majority of R$_1$, Y$_1$, Z$_1$ are "one" bits and GR$_1$, GY$_1$, GZ$_1$ are all "one" bits indicating that all of R$_1$, Y$_1$, Z$_1$, are valid.

In the case where GR$_1$, GY$_1$ and GZ$_1$ are again all "one" bits, R$_1$ is a "one" bit, Y$_1$ is a "zero" bit, Z$_1$ is a "one" bit, the output A$_1$ should be a "one" bit, since the majority of R$_1$, Y$_1$, Z$_1$ (two out of three) are "one" bits. In this case the possibility is that either K$_1$, R$_2$, or R$_3$ which constituted the sub-group Y$_1$ are renewed bits or are erroneous bits. The circuit of FIG. 17 will provide an A$_1$ output representing a binary "one" bit in this case.

In the case where GR$_1$, GY$_1$, and GZ$_1$ are "zero," "one" and "zero" bits, respectively, and R$_1$, Y$_1$ and Z$_1$ are "zero," "one" and "one" bits, respectively, the output A$_1$ is also a "one" bit. This is because only Y$_1$ and Z$_1$ are considered among the bits on which the majority vote is based.

Where GZ$_1$ is the only bit of GR$_1$, GY$_1$ and GZ$_1$ which is a "one" bit, and where R$_1$ is a "zero" bit, Y$_1$ is "one" bit and Z$_1$ is a "one" bit, the output A$_1$ is also "one" bit. This is because only bit Z$_1$ forms the basis of the majority vote.

There are some cases where the majority votes produce an ambiguous result. In these cases the number of missing bits and errors is beyond the capacity of the illustrated embodiment of the invention to correct, since only three representations are alloted for each data bit. These cases are indicated in the blocks of the table marked with an asterisk. The row of the table where GR$_1$, GY$_1$ and GZ$_1$ are all "zero" has been added merely for completeness, since in this case a character available signal will not be generated by the character available generating system shown in FIG. 15.

The operation of the circuit shown in FIG. 17 and the bit combinations tabulated in FIG. 17a can be expressed in terms of the Boolean equation:

$$A_1 = Z_1 GZ_1 \overline{GY}_1 + Y_1 Z_1 GZ_1 + Y_1 GY_1 \overline{GZ}_1 + R_1 Z_1 GZ_1 + R_1 Y_1 GR_1 + R_1 \overline{GY}_1 GR_1 \quad (10)$$

It will be observed that the circuit of FIG. 17 mechanizes this Boolean equation.

ANOTHER ERROR CORRECTION SYSTEM

Figure 29:
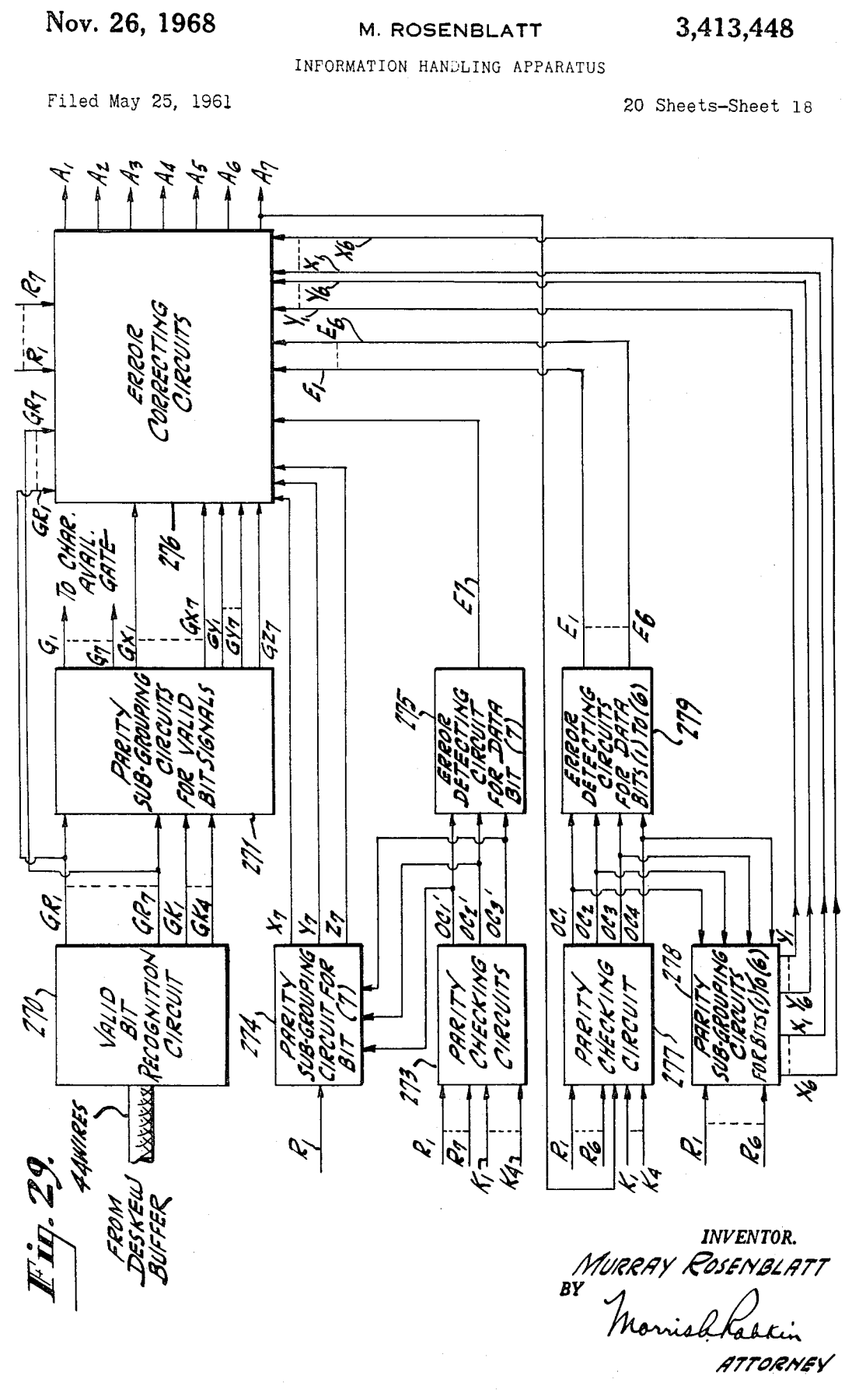

A system for correcting errors in a character including seven data bits R$_1$ to R$_7$ and four check bits K$_1$ to K$_4$ is shown in its entirely in FIG. 29 of the drawings. This system includes some circuits similar to the circuits included in the system described in connection with FIGS. 13 to 17 of the drawings. These circuits are the valid bit recognition circuits 270 and the parity grouping circuits for valid bit signals 271. The outputs from the deskew buffers 90 (FIG. 2) are applied to the valid bit recognition circuits. The valid bit recognition circuits produce valid bit signals GR$_1$ to GR$_7$ and GK$_1$ to GK$_4$, inclusive.

The parity sub-grouping circuits 271 for valid bit signals receives the valid bit signals GR$_1$ to GR$_7$ and GK$_1$ to GK$_7$ and provides bit signals GX$_1$ to GX$_7$, GY$_1$ to GY$_7$ and GZ$_7$ for the parity sub-groups. Some added circuits included in the parity sub-grouping circuits 271 provide the bit signals GX$_1$ to GX$_6$ and GY$_1$ to GY$_6$. These added circuits are used to accommodate the corrected renewed bit A$_7$ which is fed back and used in obtaining corrected values for the bits R$_1$ to R$_6$, as will be explained in detail hereinafter. The added circuits will also be discussed below.

Parity checking circuits 273 are provided for checking the parity of the parity groups C$_1$, C$_2$ and C$_3$ which include the seventh bit R$_7$. As shown in Table III there are three parity bits including the bit R$_7$ in parity groups C$_1$, C$_2$ and C$_3$. The parity group C$_1$ includes the bits K$_1$, R$_1$, R$_2$, R$_3$ and R$_7$. The group C$_2$ includes the bits K$_2$, R$_1$ R$_4$, R$_5$ and R$_7$. The group C$_3$ includes the bits K$_3$, R$_2$, R$_4$, R$_6$ and R$_7$. The parity of each of the parity groups C$_1$, C$_2$, C$_3$ and C$_4$ should be even. The parity checking circuits provide three output bit signals OC$_1'$, OC$_2'$, and OC$_3'$. These bit signals represent "one" bits, if the parity of the groups from which they are derived is incorrect (i.e., is odd).

A parity sub-grouping circuit 274 is provided for the R$_7$ bit. This parity sub-grouping circuit, in effect removes the R$_7$ bit from each of the parity groups from which it is included and provides the bits X$_7$, Y$_7$ and Z$_7$ from different ones of these groups. The bits X$_7$, Y$_7$ and Z$_7$ represent the bit R$_7$ in terms of bits other than the bits R$_7$ in their respective parity groups C$_1$, C$_2$, C$_3$.

As a further example, a parity checking circuit of the type described in connection with FIG. 16 may check the parity of sub-groups of bits in the parity groups C$_1$, C$_2$ and C$_3$ which represent R$_7$ for odd parity and derive X$_7$ Y$_7$ and Z$_7$ directly.

The results of the parity check, namely the OC$_1'$, OC$_2'$ and OC$_3'$ bits, are supplied to an error detecting circuit 275 for the R$_7$ data bit. This error detecting circuit provides an output bit E$_7$ which is a binary "one," if the R$_7$ bit is found to be in error on the basis of the parity checks. The E$_7$, X$_7$, Y$_7$, Z$_7$, GX$_7$, GY$_7$ and GZ$_7$ bits are all transferred to a circuit in the error correcting circuits 276. Also the R$_7$ and GR$_7$ bits are transferred to this circuit. If the GR$_7$, GX$_7$, GY$_7$ bits are all valid bits, a signal is applied to the error correcting circuit indicating that renewed bit correction is unnecessary. The circuit then operates to gate out the R$_7$ bit to the A$_7$ output of the error correcting circuits. The R$_7$ bit is gated by the E$_7$ bit. If the E$_7$ bit is "one" bit, indicating an error in the R$_7$ bit, the R$_7$ bit is inverted. If the E$_7$ bit is a "zero" bit, the R$_7$ bit is not inverted.

If R$_7$ is a renewed bit, the error correcting circuit uses one of the representations of R$_7$ (X$_7$, Y$_7$ or Z$_7$) which does not include any renewed bits to provide the correct value A$_7$ for the renewed R$_7$ bit.

The A$_7$ bit signal is fed back and used in place of the R$_7$ bit signal in initially checking the parity of the parity groups C$_1$, C$_2$, C$_3$ and C$_4$. Another parity checking circuit 277 is provided for the latter purpose. This parity checking circuit generates output bits OC$_1$, OC$_2$, OC$_3$, and OC$_4$ based upon the parity checks of the parity groups C$_1$, C$_2$, C$_3$ and C$_4$, respectively. These bits OC$_1$, OC$_2$, OC$_3$, and OC$_4$ are supplied to parity sub-grouping circuits 278 for the bits R$_1$ to R$_6$. These parity sub-grouping circuits are similar to the parity sub-grouping circuits 274.

The bit OC$_1$ is used to provide the bits X$_1$, X$_2$, and X$_3$ which constitute one representation of the bits R$_1$, R$_2$ and R$_3$ derived from the parity group C$_1$. The bit OC$_2$ is used to provide the bits X$_4$ and X$_5$ representing the bits R$_4$ and R$_5$, and the bit Y$_1$ which is another representation of the bit R$_1$. The bit OC$_3$ is used to provide the bits X$_6$ and Y$_2$ and Y$_4$. The bit OC$_4$ is used to provide the bits Y$_3$, Y$_5$ and Y$_6$.

It may be desirable to obtain the parity check output bits $OC_1$, $OC_2$, and $OC_3$ by utilizing the bits $X_7$, $Y_7$ and $Z_7$ which represent the bit $A_7$. For example $OC_1$ may be expressed in accordance with the following equation:

$$OC_1 = \overline{X_7} A_7 + X_7 \overline{A_7} \quad (10a)$$

A circuit mechanizing this equation may include two NAND gates having a common output and an inverter. $OC_2$ and $OC_3$ may be obtained similarly.

Error detecting circuits 279 operate upon the bits $OC_1$, $OC_2$, $OC_3$ and $OC_4$ and generate error bits $E_1$ to $E_6$. These are binary "one" bits, if an error is indicated and binary "zero" bits, if the data bits $R_1$ to $R_6$ are correct.

The bits $GX_1$ to $GX_6$ and $GY_1$ to $GY_6$, which are obtained from the parity grouping circuits 271, the bits $E_1$ to $E_6$, the bits $X_1$ to $X_6$ and the bits $Y_1$ to $Y_6$ are applied to the error correcting circuits 276 together with the valid bits signals $GR_1$ to $GR_6$. These error correcting circuits provide corrected values $A_1$ to $A_6$ for each of the bits $R_1$ to $R_6$. In the case of each of these bits $R_1$ to $R_6$ the circuit operates similar to the manner explained above for the bit $R_7$. In other words, if any of the bits $R_1$ to $R_6$ are renewed bits, their representations, $X_1$ to $X_6$ or $Y_1$ to $Y_6$ are used to provide the correct value for that renewed bit. If the bits $R_1$ to $R_6$ are not renewed bits, but are in error, the error bits, $E_1$ to $E_6$ are used to generate the correct bit values $A_1$ to $A_6$ for the bits $R_1$ to $R_6$.

The details of the circuits used in the error correction system used in FIG. 29 will be understood by reference to FIGS. 30 to 33 of the drawings.

PARITY CHECKING CIRCUIT

Figure 30:
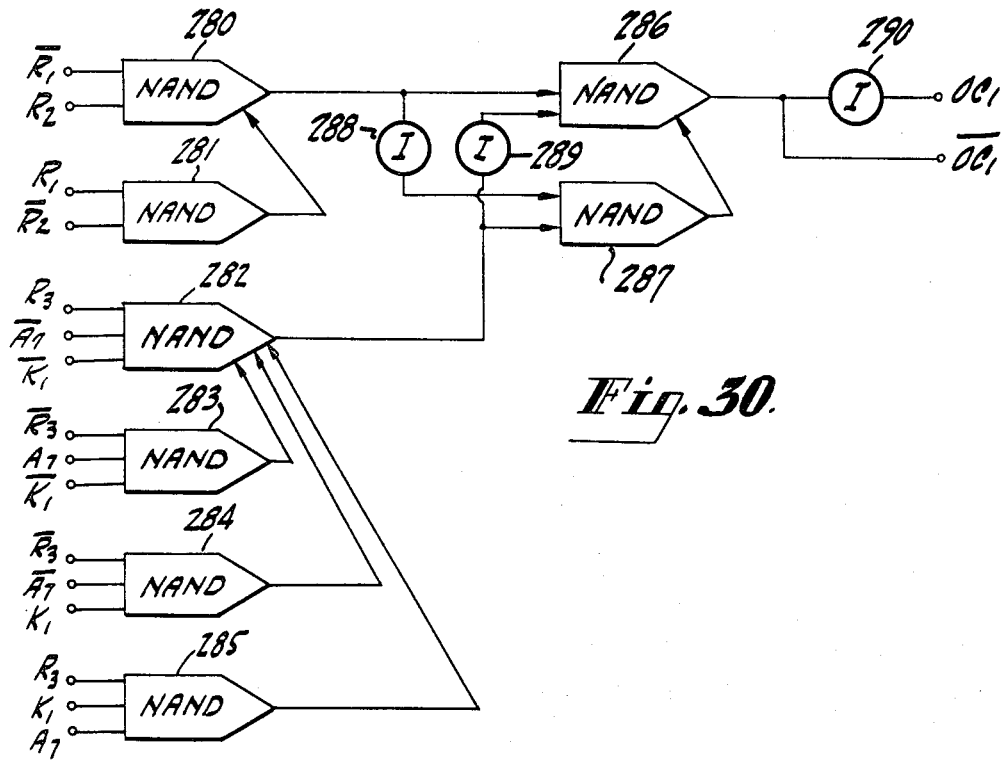
FIG. 30 is a block diagram of a parity checking circuit in the system illustrated in FIG. 29.

FIG. 30 shows the parity checking circuit for the parity group $C_1$. If the parity of the bits $R_1$, $R_2$, $R_3$, $A_7$ and $K_1$ is odd (i.e., incorrect) the output bit $OC_1$ a "one" bit. A $OC_1$ bit which is a binary "one" bit is provided when the parity of the bits $R_1$, $R_2$, $R_3$, $A_7$ and $K_1$ is odd. The $OC_1$ bit is a binary "one" bit when the bits of the last-mentioned bit combination are combined in accordance with the following Boolean expression:

$$OC_1 = \overline{(R_1\overline{R_2}+\overline{R_1}R_2)(R_3A_7K_1+R_3\overline{A_7}\overline{K_1}+\overline{R_3}A_7\overline{K_1}+\overline{R_3}\overline{A_7}K_1)} + (R_1\overline{R_2}+\overline{R_1}R_2)\overline{(R_3A_7K_1+R_3\overline{A_7}\overline{K_1}+\overline{R_3}A_7\overline{K_1}+\overline{R_3}\overline{A_7}K_1)} \quad (11)$$

This Boolean expression is mechanized by the NAND gates 280 to 287 shown in FIG. 30 which are interconnected with each other directly and by way of inverters 288 and 289. It will be noted that the bit $A_7$ is used in place of the bit $R_7$ in the input to some of the NAND gates in the circuit of FIG. 30. A similar arrangement of NAND gates is used in the parity checking circuit 273 to provide the bit $OC_1'$. However, the bit $R_7$ is used directly as it is derived from its register in the deskew buffer, rather than by feed back from the output of the error correcting circuits 276, as is the case for the bit $A_7$. The bit signals at inputs to the NAND gates 280 to 285 represent the bit $R_1$, $R_2$, $R_3$, $A_7$ and $K_1$ and their complements. The output of the gates 286 and 287 represents a binary "zero" bit for any combination of the bits $R_1$, $R_2$, $R_3$, $A_7$ and $K_1$ in which parity would be odd. Because of the inverting action of the NAND gates 280 to 287, an inverter 290 is provided which inverts the output of the gates 286 and 287 so that the level corresponding to bit $OC_1$ will represent a binary "one" bit when parity is odd.

The bits $OC_2$, $OC_3$ and $OC_4$ are derived by parity checking circuits similar to the parity checking circuits shown in FIG. 30. These parity checking circuits each mechanize the following Boolean expressions for the various combinations of the bits in the parity groups $C_2$, $C_3$ and $C_4$ for which parity will be odd.

$$OC_2 = \overline{(R_1\overline{R_4}+\overline{R_1}R_4)(R_5A_7K_2+R_5\overline{A_7}\overline{K_2}+\overline{R_5}A_7\overline{K_2}+\overline{R_5}\overline{A_7}K_2)} + (R_1\overline{R_4}+\overline{R_1}R_4)\overline{(R_5A_7K_2+R_5\overline{A_7}\overline{K_2}+\overline{R_5}A_7\overline{K_2}+\overline{R_5}\overline{A_7}K_2)} \quad (12)$$

$$OC_3 = \overline{(R_2\overline{R_4}+\overline{R_2}R_4)(R_6A_7K_3+R_6\overline{A_7}\overline{K_3}+\overline{R_6}A_7\overline{K_3}+\overline{R_6}\overline{A_7}K_3)} + (R_2\overline{R_4}+\overline{R_2}R_4)\overline{(R_6A_7K_3+R_6\overline{A_7}\overline{K_3}+\overline{R_6}A_7\overline{K_3}+\overline{R_6}\overline{A_7}K_3)} \quad (13)$$

$$OC_4 = \overline{(R_3\overline{R_5}+\overline{R_3}R_5)(R_6K_4+R_6\overline{K_4}+\overline{R_6}\overline{K_4}+\overline{R_6}K_4)} + (R_3\overline{R_5}+\overline{R_3}R_5)\overline{(R_6K_4+R_6\overline{K_4}+\overline{R_6}\overline{K_4}+\overline{R_6}K_4)} \quad (14)$$

PARITY SUB-GROUPING CIRCUITS

Figure 31:
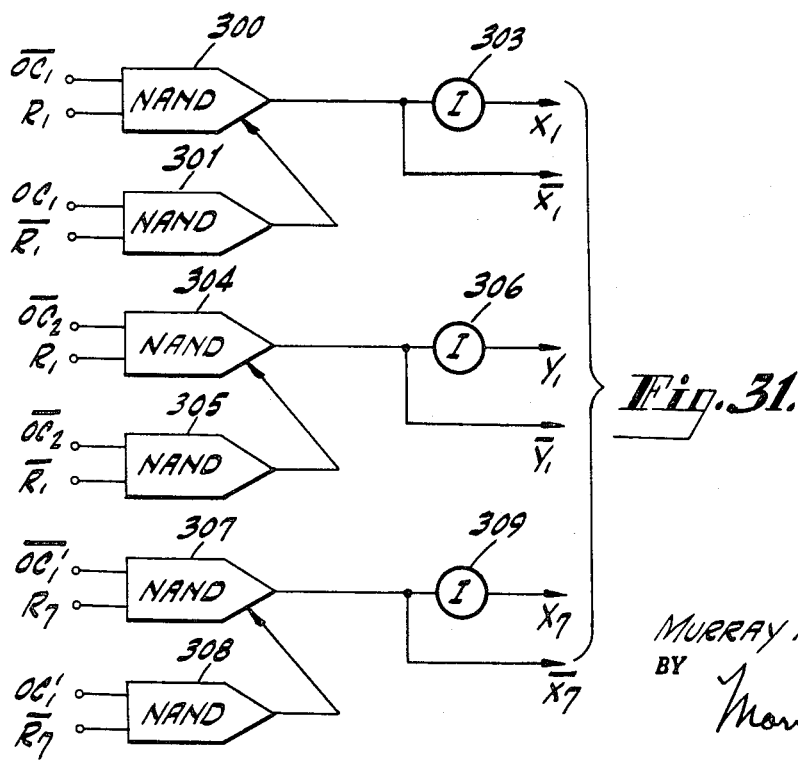
FIGURE 31 is a block diagram of some of the parity sub-grouping circuits included in the system illustrated in FIG. 29.

Referring to FIG. 31 some of the parity sub-grouping circuits 274 and 278 are illustrated. These parity sub-grouping circuits generate signals representing the bits $X_1$, $Y_1$ and $X_7$ which represent the bits $R_1$ and $R_7$.

The circuit which generates the $X_1$ bit signals includes a pair of NAND gates 300 and 301. The signals which represent the bits $R_1$ and $OC_1$ are applied to the inputs of these NAND gates. The outputs of the NAND gates 300 and 301 are connected in common to perform the logical OR function. The output is also inverted in an inverter 303. The NAND gate 300 generates a binary "zero" bit signal, if $R_1$ is a binary "one" bit and parity of the group of bits including $R_1$ is correct. Similarly, the NAND gate 301 will provide a binary "one" bit signal, if $R_1$ is a binary "zero" bit and parity is incorrect. The output of the gates 300 and 301 represents $\overline{X_1}$. The inverter 303 inverts this output to provide the $X_1$ bits. The operation of the above described circuit may be expressed in accordance with the following Boolean equation.

$$X_1 = OC_1 R_1 + \overline{OC_1}\overline{R_1} \quad (15)$$

The circuit which provides the bit $Y_1$ which forms the second representation of the bit $R_1$ also includes two NAND gates 304 and 305 and an inverter 306. The circuit is substantially identical as the circuit described above for providing the bit $X_1$ except that the bit $OC_2$ supplies the inputs for the NAND gates 304 and 305. The Boolean equation which expresses the operation of this circuit is identical in form to this equation which expresses the operation of the above described circuit. This Boolean equation is written below as follows:

$$Y_1 = OC_2 R_1 + \overline{OC_2}\overline{R_1} \quad (16)$$

The Boolean equations for the bits $X_2$ to $X_6$ and $Y_2$ to $Y_6$ are similar to the Boolean equation for $X_1$ and $Y_1$. However, different ones of the parity check bits $OC_1$ to $OC_4$ are used to provide the $X_1$ to $X_6$ and $Y_1$ to $Y_6$ bits.

The circuit for obtaining the $X_7$ bit which represents the $R_7$ data bit is also shown in FIG. 31. This circuit includes two NAND gates 307 and 308 and an inverter 309. These gates and inverter are connected to each other in the same way as the gates and inverters which provide the $X_1$ and $Y_1$ bits. The $X_7$ bit is obtained from the parity check bit $OC_1'$ which is provided by the parity checking circuits 273 (FIG. 29). This $X_7$ bit generating circuit operates in the same manner as the previous described circuits and in accordance with the following Boolean equation:

$$X_7 = OC_1' R_7 + \overline{OC_1'}\overline{R_7} \quad (17)$$

Similarly the Boolean expressions for the bits $Y_7$ and $Z_7$ are:

$$Y_7 = OC_2' R_7 + \overline{OC_2'}\overline{R_7} \quad (18)$$

$$Z_7 = OC_3' R_7 + \overline{OC_3'}\overline{R_7} \quad (19)$$

ERROR DETECTING CIRCUIT

Referring to FIG. 32 the error detecting circuit for detecting errors in the $R_1$ bit is shown. This error detection circuit constitutes a NAND gate 310 having four inputs. The output of this NAND gate 310 is connected to an inverter 311. Another gate 312 is connected through an inverter 313 to one of the inputs of the NAND gate 310. This gate 312 and inverter 313 may properly be included in the grouping circuits 271 (FIG. 29) for the valid bit signals. However, they are shown in FIG. 32 with the error detection circuit in order to simplify the discussion and the drawings. The NAND gate 312 has the valid bit signals $GR_1$, $GX_1$, and $GY_1$ applied to its inputs. When all of these valid bit signals represent binary "one" bits, i.e., valid representations of the bit $R_1$, the output of the NAND gate 312 represents a binary "zero" bit. This binary "0" bit is inverted and applied to the input of the NAND gate 310. The NAND gate 310 is inhibited from generating a binary "zero" bit signal, when a binary "zero" bit is applied to any of its inputs. A binary "zero" bit signal at the inverter 313 input indicates that all of the representations of the $R_1$ bit are valid. If any representation, $X_1$, $Y_1$ or $R_1$, of the R bit is not valid, it is an indication that a renewed bit rather than an error has caused the parity of one of the parity groups which include $R_1$ to be incorrect. Thus, the portion of the error correction circuits which supplies the values of renewed $R_1$ bits is used rather than the portion of the error correction circuits which corrects erroneous $R_1$ bits. Accordingly, the signal from the NAND gate 312 inhibits the NAND gate 310 from supplying an $E_1$ signal of value which indicates an error in the $R_1$ bit in the event that any of $GR_1$, $GX_1$ and $GY_1$ are binary "zero" bits indicating a renewed $R_1$ bit.

At this point the circuits in the parity sub-grouping circuits 271 for the valid bit signals for providing $GX_1$, $GY_1$ bits will be discussed.

The parity sub-grouping circuits 271 generate signals representing the bits $G_1$ to $G_7$ in addition to signals representing the bits $GX_1$ to $GX_7$, $GY_1$ to $GY_7$ and $GZ_7$. The bits $GX_7$, $GY_7$ and $GZ_7$ are obtained by circuits similar to those which obtain the bits $GY_1$ and $GZ_1$ and which are shown in FIG. 15 of the drawings. These circuits essentially perform the logical AND function. Thus, $GX_7$ is derived by a gate circuit which implements Boolean equation:

$$GX_7 = GK_1 GR_1 GR_2 GR_3 \quad (21)$$

The bits $GY_7$ and $GZ_7$ are derived by gate circuits which implement.

Boolean equations similar to Equation 21, which are as follows:

$$GY_7 = GK_2 GR_1 GR_4 GR_5 \quad (22)$$
$$GZ_7 = GK_3 GR_2 GR_4 GR_6 \quad (23)$$

The bit $G_7$ is obtained in a manner similar to the bit $G_1$ in FIG. 15 by circuitry like that shown in FIG. 15. Accordingly, the bit $G_7$ may be expressed in terms of the bits $GR_7$, $GX_7$, $GY_7$ and $GZ_7$ in accordance with the following Boolean equation:

$$G_7 = GR_7 + GX_7 + GY_7 + GZ_7 \quad (24)$$

Since the $A_7$ bit is fed back to provide the parity check bits $OC_1$ through $OC_4$ from which the bits $X_1$ to $X_6$, $Y_1$ to $Y_6$ which represent the data bits $R_1$ to $R_6$ are obtained, the bit $A_7$, as provided by the error correcting circuit 276, would be correct, if any valid representation, $R_7$, $X_7$, $Y_7$ or $Z_7$ of $R_7$ exists.

Accordingly, the bit $G_7$ is used, rather than the bit $GR_7$, to provide the valid bit signals for the $X_1$ to $X_6$ bits and $Y_1$ to $Y_6$ bits. Accordingly, the parity sub-grouping circuits 271 will include connections for feeding back of the $G_7$ bit signal to the gates which perform the logical NAND function and provide the $GX_1$ to $GX_6$ and $GY_1$ to $GY_6$ valid bit signals. The valid bit signals for the $X_1$ and $Y_1$ bits can be represented by the following Boolean equations:

$$GX_1 = GK_1 GR_2 GR_3 GR_7 \quad (25)$$
$$GY_1 = GK_2 GR_5 GR_6 G_7 \quad (26)$$

The other bits $GX_2$ to $GX_6$ and $GY_2$ to $GY_6$ are represented by analogous Boolean equations considering, of course, that the valid bit signals which constitute them are different from the valid bit signals which constitute $GX_1$ and $GY_1$. The logic circuits which provide these valid bits signals are each similar to the circuit shown in FIG. 15.

Returning to FIG. 32, it will be observed that the $E_1$ signal is obtained by a combination of the parity check bits $OC_1$, $OC_2$ and $\overline{OC_3}$. Thus, $E_1$ will be a binary "one" bit representing an error in the $R_1$ bit, if the parity of the first parity group $C_1$ is incorrect, the parity of the second group $C_2$ is incorrect but the parity of the third group $C_3$ is correct. This will be apparent from Table III. If the $R_1$ bit is wrong, the parity of the first parity group $C_1$ will be incorrect. When parity in any of the parity groups is incorrect, the results of parity check therefore will be a binary "one" bit. It will be remembered that each of the parity groups has even parity and parity is incorrect if an odd number of binary "one" bits exists in the group.

If the $R_1$ bit is incorrect, the second parity group $C_2$ will also have incorrect parity. However, the third parity group $C_3$ will have correct parity. The parity check bit $OC_1$ for the first parity will then be a binary "one"; and the parity check bit $OC_2$ for the second parity bit will then be a binary "one." The parity check bit $OC_3$ for the third group will be a binary "zero." Accordingly, an error $E_1$ in the first binary bit $R_1$ will be indicated when the following Boolean equation is satisfied.

$$E_1 = OC_1 OC_2 \overline{OC_3} \quad (27)$$

It will be noted that the NAND gate 310 in FIG. 32 has signals representing the bits $OC_1$, $OC_2$ and $\overline{OC_3}$ applied to three inputs thereof. After inversion in the inverter 311, an error bit signal $E_1$ is generated which represents a binary "one," if the valid bit signals which represent the $R_1$ bit indicate that the $R_1$ bit is not a renewed bit and when the parity checks $OC_1$, $OC_2$ and $OC_3$ indicate that an error exists in the $R_1$ bit.

Similar circuits are used in the error detecting circuits 275 and 279 for providing error signals $E_2$ to $E_7$ which are binary "ones," if these bits $R_2$ to $R_7$ are in error. Each of these NAND gates has an input to which the valid bit signals for the respective $R_2$ to $R_7$ data bits is applied. The parity check bits which identify the location of an error are also applied to the different NAND gates in the error detection circuits so that the following Boolean equations are solved by these circuits:

$$E_2 = OC_1 \overline{OC_2} OC_3 \quad (28)$$
$$E_3 = OC_1 OC_4 \quad (29)$$
$$E_4 = \overline{OC_1} OC_2 OC_3 \quad (30)$$
$$E_5 = OC_2 OC_4 \quad (31)$$
$$E_6 = OC_3 OC_4 \quad (32)$$
$$E_7 = OC_1 OC_2 OC_3 \quad (33)$$

Table III indicates that each of the foregoing equations properly identify an error in one of the data bits $R_1$ to $R_7$, respectively. For example, an error in the $R_2$ data bit is indicated where the parity of the first and third parity groups $C_1$ and $C_3$ is incorrect and the parity of the second parity group $C_2$, which does not contain the $R_2$ data bit, is correct. The correct parity group $C_2$ contains all of the bits contained in the incorrect parity group except $R_2$, $R_3$ and $R_6$. In other words, a single error in the $R_1$ data bit of the character is detected. It is recognized that a double error is not properly corrected with the instant system. This is in accordance with known theory which specifies that more than four check bits must be provided in order to obtain double error correction. In the case of the $R_3$ data bit an error will be indicated where the first and fourth parity groups $C_1$ and $C_4$, which contain the $R_3$ bit, are incorrect. The latter will be the case only when there is a single error in the $R_3$ bit.

ERROR CORRECTION CIRCUIT

All of the error indicating bits $E_1$ to $E_7$, the data bits and the valid bit signals are applied to the error correction circuits 276. The error correction circuit which corrects the first data bit $R_1$ is shown in FIG. 33. The circuit of FIG. 33 can be considered in two parts. The first part of this circuit includes two NAND gates 321 and 322. This circuit functions to supply the correct value for a renewed $R_1$ bit. The other part of the circuit includes two NAND gates 323 and 324 which provide a corrected value for the $R_1$ bit, if the $R_1$ bit is not a renewed bit and the value thereof is incorrect. An inverter 325 is connected to the common output of the gates 321 and 324, so that an $A_1$ bit signal representing a correct $R_1$ bit is provided which is of n (zero) voltage magnitude when the $A_1$ bit is a binary "one" bit, in accordance with the convention for identifying binary "one" and binary "zero" bits previously adopted. It will be noted that all of the gates 321 to 324 share a common output in the manner which was explained before.

A signal representing the bit $(GR_1 \cdot GX_1 \cdot GY_1)$, which is provided by the gate 312 shown in FIG. 32, is applied to inputs of each of the gates 321 and 322. This bit signal represents a binary "one" bit, if any of $GR_1$, $GX_1$ and $GY_1$ bits is a binary "zero" bit indicating an incorrect representation for the $R_1$ data bit.

Alternatively, the bit $GR_1$ alone may be supplied to the inputs of the respective NAND gates 321 to 322. When this bit $\overline{GR_1}$ is a binary "one" bit, a renewed $R_1$ bit is indicated. The other representations for the bit $R_1$, namely, $X_1$ and $Y_1$ and their respective valid bit signals $GX_1$ and $GY_1$ are applied to the inputs of the gates 321 and 322, respectively. The valid bit signals $GX_1$ will enable the NAND gate 321 to generate a "zero" bit signal, when the $X_1$ representation of the $R_1$ bit is valid. The valid bit signal $GY_1$ will enable the gate 322 to generate a "zero" bit signal, when the $Y_1$ representation is valid. The bit generated by the gates 321 and 322 will be inverted by the inverter 325 and appear at the $A_1$ output as a binary "one" bit signal representing the corrected $R_1$ bit. If, on the other hand, the representations for the $R_1$ bit are all binary "zero" bits, and these are the valid representations for the $R_1$ bit, the $A_1$ bit will appear as a p voltage level denoting a binary "zero".

The $GR_1$, $GX_1$, and $GY_1$ bit signal from the gate 312 and inverter 313 (FIG. 32) are shown as being applied to an input of the error correcting gates 323 and 324. This bit input is shown for the sake of completeness, since the $E_1$ signal reproducing gate 310 will not be enabled to generate a p voltage level unless all of the $GR_1$, $GX_1$ and $GY_1$ valid signals indicate that the $R_1$ bit is not renewed and that valid representations therefor exist. The inputs $GR_1$, $GX_1$ and $GY_1$ may be applied alternatively to the gates 323 and 324 and to the gate 310 in the error detection circuit, (FIG. 32).

The gate 323 together with the inverter 325 provides for the generation of a bit signal identical with the $R_1$ bit signal, when no error is indicated. In other words, when the $\overline{E_1}$ input represents a binary "one", this indicates that $E_1$ was a binary "zero" bit and that no error has occurred in the reading channel which transmits the $R_1$ data bit.

The gate 324 causes the value of the $R_1$ bit to be changed in the event that an error is indicated by the $E_1$ bit. Thus, the $E_1$ bit will enable the gate 324 to generate a p voltage level, when $E_1$ is a binary "one" indicating an error in the $R_1$ channel. The $\overline{R_1}$ bit signal which is supplied to an input of the gate 324 will effectively appear at the output of the inverter 325.

The generation of a corrected renewed bit has priority over error correction in the system illustrated in FIG. 33. The system illustrated in FIG. 33 does provide single error correction and single renewed bit correction but not both simultaneously.

In the error correcting and missing bit insertion circuits shown in FIGS. 13 to 17 and 29 to 33, parity groups were used in which a single check bit was associated with a unique combination of data bits. It may be desirable to use parity groups wherein groups of check bits are associated with each of the data bits. Thus, five check bits will be required to check six data bits as indicated in the following table.

TABLE V

| $R_1$ | $K_1$ |       | $K_3$ |       |       |
|-------|-------|-------|-------|-------|-------|
| $R_2$ | $K_1$ |       |       | $K_4$ |       |
| $R_3$ | $K_1$ |       |       |       | $K_5$ |
| $R_4$ |       | $K_2$ | $K_3$ |       |       |
| $R_5$ |       | $K_2$ |       | $K_4$ |       |
| $R_6$ |       | $K_2$ |       |       | $K_5$ |

It will be noted that there are now six parity sub-groups. These parity sub-groups may be used in combinations similar to the combinations shown in the case of four parity sub-groups for error correction and missing bit insertion.

RESET PULSE SYNCHRONIZING CIRCUITS

Figure 18:
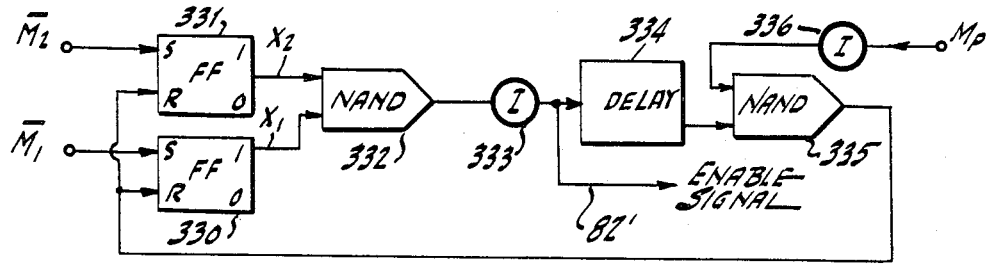
FIGURE 18 is a block diagram of a reset pulse synchronizing circuit which is illustrated in FIG. 2.
Figure 19:
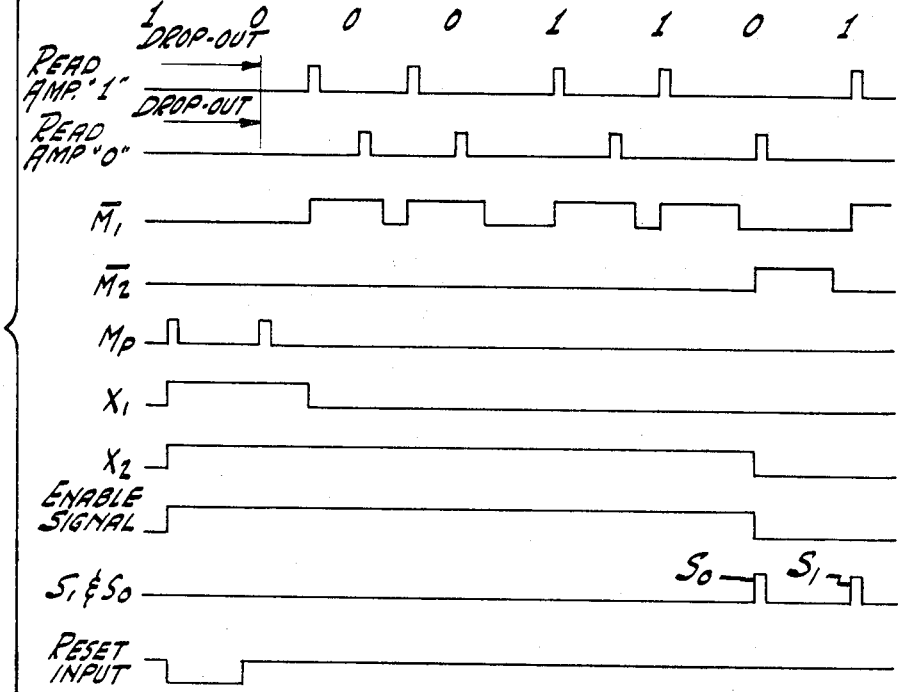
FIGURE 19 is a timing chart which illustrates the operation of the circuit shown in FIG. 18.

Referring now to FIGS. 18 and 19, a circuit for synchronizing the reset pulse rejection circuits 81 (FIG. 2) after a drop-out occurs, is shown. When the drop-out is terminated, the first reproduced pulse may be either a pulse representing a bit or a reset pulse. Since a reset pulse would be mistaken by the system as a bit of value opposite to the value of the bit which shares the same bit cell on the tape with the reset pulse, it is desirable to discriminate between the data pulses and reset pulses immediately after a drop-out. It has been found in accordance with the invention that the reset pulse rejection circuits operate properly in rejecting reset pulses after the first alternation in the value of bits reproduced from the tape. Thus, after pulses representing a sequence of bits "one," "zero," "one" or "zero," "one," "zero," are read, a reset pulse rejection circuit will be operating properly. The circuit of FIG. 18 provides a signal identified as an enable signal which enables the reset pulse rejection circuit for the first read channel 70 after the requisite alternation in values of reproduced bits transmitted by that reset pulse rejection circuit. A circuit of the type shown in FIG. 18 is provided for each of the reading channels 70 to 79.

This circuit includes a pair of flip-flops 330 and 331. The "1" output of these flip-flops provides inputs to a NAND gate 332. The output of the NAND gate 332 is inverted in an inverter 333 and provides the enable signal. This enable signal is applied to a cable 82' (see also FIG. 4) which is connected to gates 132 and 134 in the reset pulse rejection circuit (FIG. 4). When the enable signal is positive, the gates 133 and 134 are inhibited from transmitting the signal pulses $S_1$ and $S_0$. This blocks the reading channel 70. The circuit, however, operates to provide an enable signal which is ordinarily of zero volts potential and which does not inhibit the gates 133 and 134 in the reset pulse rejection circuit.

The enable signal is delayed in a delay circuit 334, which may be of any known type, to allow complete passage of the renewed pulse $M_p$ from the renewed pulse generating circuit (FIG. 11) through a NAND gate 335. After the delay, the enable signal is applied to an input of the NAND gate 335 and inhibits this gate from generating a positive signal. The renewed pulses $M_p$ are applied through an inverter 336 to another input of the NAND gate 335. The output of the NAND gate 335 is connected to the reset inputs of the flip-flops 330 and 331.

The operation of the circuit illustrated in FIG. 18 will be explained with reference to FIG. 19 which illustrates an exemplary sequence of binary bits. The values of these bits are shown at the top of the figure. It is assumed that the first bit a "one" and the second bit a "zero" are lost due to a drop-out. The drop-out terminates immediately after the second bit The third bit is also a "zero." Accordingly, the first pulse applied to the reset pulse rejection circuit after termination of the drop-out is the reset pulse which was recorded between the second and third "zero" bit pulses. For each pulse which was absent after reproduction due to the drop-out, a renewed pulse $M_p$ is generated. This renewed pulse $M_p$ is a positive pulse which is inverted and applied as a pulse of n (zero) voltage level to the NAND gate 335. The other input of this NAND gate is also normally a voltage of n (zero) voltage level. The NAND gate 335 provides a positive pulse when both of its inputs are at the n voltage level. Accordingly, when a renewed pulse occurs, the flip-flops 330 and 331 will have positive voltage pulses at their reset inputs and will be reset. When both flip-flops 330 and 331 are reset their "1" outputs, identified herein as $X_1$ and $X_2$, respectively, will be positive voltage levels. These positive voltage levels cause the NAND gate 332 to produce an output voltage of n (zero) voltage level. This n output voltage is inverted in the inverter 333 and appears on the lead 82' as an enable signal of positive voltage. This enable signal is effective to inhibit the transmission of $S_1$ and $S_0$ pulses through the reading channel 70 (see FIG. 4).

The delay multivibrators 136 and 137 in the reset pulse rejection circuits (FIG. 4) provide output pulses $\overline{M}_1$ and $\overline{M}_2$ at their "0" outputs. These pulses are shown in FIG. 19. It will be observed that a $\overline{M}_1$ pulse is provided upon occurrence of pulses from the "1" output ($S_1$) of the read amplifier 131 (FIG. 4). The $\overline{M}_2$ pulses are provided from the "0" output of the read amplifier 131 (labelled $S_0$ in FIG. 4). It will be recalled that an $S_0$ read amplifier pulse is not operative to provide an $\overline{M}_2$ pulse, if the $S_0$ pulse occurs during the duration of an $\overline{M}_1$ pulse. Accordingly, the first $\overline{M}_2$ pulse can occur only after an alternation in the value of the bits which are recorded, since the first $S_0$ pulse must occur a full clock pulse cycle after an $S_1$ pulse so as to be operative to trigger the delay multivibrator 137 which provides the $\overline{M}_2$ pulse.

The $\overline{M}_1$ pulse sets the flip-flop 330 and causes the $X_1$ level to return to n (zero) voltage level. The $X_2$ level remains positive until the occurrence of the $\overline{M}_2$ pulse. The $\overline{M}_2$ pulse also sets the multivibrator 331. When both multivibrators 330 and 331 are set, the NAND gate 332 is enabled to provide a positive output level. This positive output level is inverted in the inverter 333 and produces an enable signal of n (zero) voltage level which enables the transmission of $S_1$ and $S_0$ pulses through the reading channel 70. When the next renewed pulse $M_p$ occurs, the flip-flops 330 and 331 are again reset and the cycle of operation of the circuit is repeated.

It will be observed that the enable signal of n (zero) level is generated only after the reset pulse rejection circuit is properly operating to generate the $\overline{M}_1$ and $\overline{M}_2$ pulses on occurrence of pulses representing data bits. Thus, the transmission of incorrect bits such as would be represented by the reset pulses between the second and third and third and fourth "zero" bits is prevented.

START BLOCK CHARACTERS DETECTOR

The start block characters detector 104 (FIG. 2) is illustrated in detail in FIG. 20. FIG. 20 shows the circuits of the start block characters detector for detecting those bits of the start block characters which are reproduced by the first reading channel 70. The start block characters are illustrated in Table VI which is reproduced below. The start block characters include ten bits and appear in the first fourteen columns of the Table VI, reading from left to right. The first seven characters constitute a first start block message and the second seven characters constitute a second start block message. Two start block messages precede an information message. These start block messages each consist of a sequence of successive characters which are alternately all "zero" bits and all "one" bits and are referred to as alternating bit characters. The sequence of alternating bit characters is followed by two key bit characters. These characters are both constituted solely of binary "one" bits. The second start block message is similarly a sequence of alternating bit characters followed by two key bit characters. The information message follows the last sequence of key bits. This message includes a Start Message character (SM) which has a predetermined combination of bits recognizable by the computer, and an End Message character (EM) also constituted of another predetermined arrangement of bits which is recognizable by the computer. The bits of the message $M_1$ to $M_n$ are recorded between the start message and end message characters. An arrangement of key bit characters and alternating bit characters constituting two start block messages are recorded after the end message character, such that two start block messages will be recorded symmetrically on either side of the information message. The start block messages which are symmetrically recorded after the end message characters are not shown to simplify Table VI. Start messages are also recorded after other special symbols on the tape, such as a skip message symbol and a tape flaw symbol. These start block messages are used to synchronize the reproducing system in the event of any gaps in the reproduction of a message.

TABLE VI

|  | Sequence of alternating bits | Key bits | Sequence of alternating bits | Key bits | Message | | | |
|---|---|---|---|---|---|---|---|---|
|  |  |  |  |  | SM | $M_1$ | $M_n$ | EM |
| $D_1$ | 0 1 0 1 0 | 1 1 | 0 1 0 1 0 | 1 1 | – | – – | – – | – |
| $D_2$ | 0 1 0 1 0 | 1 1 | 0 1 0 1 0 | 1 1 | – | – – | – – | – |
| $D_3$ | 0 1 0 1 0 | 1 1 | 0 1 0 1 0 | 1 1 | – | – – | – – | – |
| $D_4$ | 0 1 0 1 0 | 1 1 | 0 1 0 1 0 | 1 1 | – | – – | – – | – |
| $D_5$ | 0 1 0 1 0 | 1 1 | 0 1 0 1 0 | 1 1 | – | – – | – – | – |
| $D_6$ | 0 1 0 1 0 | 1 1 | 0 1 0 1 0 | 1 1 | – | – – | – – | – |
| $K_1$ | 0 1 0 1 0 | 1 1 | 0 1 0 1 0 | 1 1 | – | – – | – – | – |
| $K_2$ | 0 1 0 1 0 | 1 1 | 0 1 0 1 0 | 1 1 | – | – – | – – | – |
| $K_3$ | 0 1 0 1 0 | 1 1 | 0 1 0 1 0 | 1 1 | – | – – | – – | – |
| $K_4$ | 0 1 0 1 0 | 1 1 | 0 1 0 1 0 | 1 1 | – | – – | – – | – |

The start block characters detector illustrated in FIG. 20 operates in conjunction with the first reading channel 70 registers of the deskew buffer which is illustrated in FIG. 12. The start block message detector includes a circuit for recognizing the presence of bits of opposite values stored in the last two stages 201 and 202 of the register. This circuit is labeled an alternating bit recognizer 340 in FIG. 20. This alternating bit register includes three NAND gates 341, 342 and 343. These NAND gates determine whether or not the last two stages 201 and 202 of the register are empty and whether or not these stages are storing the sequential bits "one"–"one". The signals representing the bits $R_1$ and $R_0$ which are stored in the flip-flops of the last stage 202 of the register and the bits $Q_1$ and $Q_0$ which are stored in the flip-flops of the next to last stage 201 of the register are applied to inputs of the NAND gates 341 to 343. These gates 341 to 343 share a common output circuit and provide a resultant bit signal $F_1$ which is a binary "one" bit when the following Boolean equation is satisfied.

$$F_1 = Q_1 R_0 + Q_0 R_1 + Q_0 R_0 \qquad (34)$$

When bits of the sequence of alternating bit characters are stored in the last two stages 201 and 202 of the register, an $F_1$ bit will be applied to a delay multivibrator 344. The output of this delay multivibrator 344 is applied to an input of a NAND gate 345. The output of this NAND gate 345 is a positive pulse equal in duration to the duration of the pulse generated by the delay multivibrator 344. The NAND gate 345 has another input which is of n (zero) volt level except when the key bits are stored in the last two stages 201 and 202 of the register. However, when alternating bits are stored in the last two stages, the positive pulses provided by the NAND gate 345 serve to reset the last stage 202 of the register and permit the next successive pair of bits of the start block message which are reproduced by the first reading channel to advance to the last two stages 201 and 202 of the register (FIG. 12).

A circuit is provided for detecting the bits of the key characters which are reproduced by the first reading channel. This circuit is identified as the key character detector 346. This circuit includes a NAND gate 347. The output of this gate $F_2$ is applied to the set terminal of a flip-flop 348. The NAND gate 347 determines when the last two stages of the register 201 and 202 (FIG. 12) are both storing binary "one" bits. The latter is the case when the flip-flops 205 and 207 are set and the flip-flops 206 and 208 are reset. Accordingly, when the Boolean equation, $$F_2 = Q_1 \overline{Q}_0 R_1 \overline{R}_0 \tag{35}$$

is satisfied, the last two stages of the register both store binary "one" bits. The output $F_2$ of the NAND gate 347 is a positive level when Equation 35 is satisfied. Thus, when Equation 35 is satisfied, the flip-flop 348 is set. The "0" output of the flip-flop 348 is connected to an input of the NAND gate 345 and inhibits this NAND gate from supplying the sync reset pulse to the last stage of the register (FIG. 12) once the bits of the key characters are stored in the last two stages of the register.

The key character detector 346 includes another NAND gate 349 to which the "1" output of the flip-flop 348 is connected. This "1" output is identified in the drawings as $X_{CH1}$. The key character detectors for the other reading channels include flip-flops similar to the flip-flop 348 which provide outputs identified in the drawings as $X_{CH2}$ to $X_{CH10}$. These outputs are applied separately to different inputs of the NAND gate 349. When the key characters are present in the last stages of the registers constituting the deskew buffer 90, each of these signals $X_{CH1}$ to $X_{CH10}$ represent binary "ones." The NAND gate 349 then generates a binary "zero" bit signal at its output. This binary "zero" bit signal is inverted in an inverter 350 and provides an output bit signal $X^*$. This output $X^*$ bit signal represents a binary "one" bit when the key characters are present in the last two stages of the deskew buffer. The $X^*$ bit signal is applied to the character available gate (FIG. 15). The user apparatus (a computer or computer program controller, for example) then generates a character demand pulse. Thus, the bits of the message can be read out from the reproducing system into the computer. In the event that the synchronization takes place after reproduction of the key characters of the first start block message, the bits of the second start block message will be read into the computer. The computer will not utilize the information of the second start block message. Rather, the computer waits until the Start Message character appears before using the character $M_1$ to $M_n$ of the message.

Start block messages are provided at both ends of a message so that the reading system may be synchronized whether the tape is being read in its forward direction of travel or in its reverse direction of travel. In the event that the tape is being read in its forward direction of travel, the bits of the start block message which appear after the end message character may be disregarded by the circuits of the computer. Conversely, the start block messages after the Start Message character will be disregarded when the tape is traveling in the reverse direction.

Circuits are included in the apparatus illustrated in FIG. 20 for permitting the reproducing system to synchronize, when drop outs occur in the key characters. This circuit includes a NAND gate 351. The NAND gate 351 has a plurality of inputs which are connected to the "0" outputs of the flip-flops, such as the flip-flop 348, in the key character detectors for each reading channel 70 to 79. The channel (1) CH1 input of the NAND gate 351 is connected to the "0" output of the flip-flop 348 in the key character detector 346 for the first reading channel 70. The CH2 to CH10 inputs are provided by flip-flops similar to flip-flop 348 in the key character detectors for the other reading channels 70 to 79. The flip-flop 348 and all of the similar flip-flops in the other key character detectors will normally be reset. Thus, the CH1 input to the NAND gate 351 will have a n (zero) volt level applied thereto. The channel (2) to channel (10) inputs to the NAND gate 351 will also have n (zero) volt levels applied thereto. The NAND gate 351 will then normally produce a positive voltage level at its output.

Because of interchannel time displacement (skew) in the system, the bits of the key characters will be stored in the final stage of one of the registers of the deskew buffer before bits of the key characters are stored in final stages in any of the other registers of the deskew buffer. Th flip-flop 348 of the key character detector 346 associated with the first reading channel 70 may first respond to a bit of the key character. The CH1 input to the NAND gate 351 will become a positive level, since the flip-flop 348 will be set. This will cause the output of the NAND gate 351 to become a n (zero) volt level. This level is applied to a delay circuit 353. A negative or n level output is derived from this delay circuit 353 a predetermined time after the positive level is applied to the input of the NAND gate 351. This predetermined time is greater than any expected interchannel time displacement. The negative or n level output from the delay 353 is applied to an input of a NAND gate 354. The output of the NAND gate 349 in the key character detector 346 is applied to another input of this NAND gate 354. The output of the NAND gate 354 is connected to the reset input of the flip-flop 348 and all similar flip-flops in the key character detectors associated with each of the reading channels 70 to 79. In FIG. 20 the output of the NAND gate 354 is shown as being connected to the reset input of the flip-flop 348. The output of the NAND gate 354 is also connected to an input of the NAND gates, such as the gate 347, which detects the presence of the bits of the key characters for the purpose of inhibiting these NAND gates as will be explained presently.

In the event that the bits of the key characters are not detected by the key character detectors in all of the channels before the time that the negative or n level is provided by the delay circuit 353, the NAND gate 354 will produce a positive pulse which resets the flip-flops, such as flip-flop 348, in all the key character detectors. The NAND gate 354 output also inhibits the gates, such as the gate 347, in each of the key character detectors from generating a binary "zero" $F_2$ bit signal. Since this "zero" $F_2$ bit signal will not be generated, the flip-flops in the key character detectors cannot be set. Accordingly, the NAND gate 354 and similar gates in each reading channel 71 to 79 will not be inhibited and reset pulses will be applied to reset the last stages of the registers, even though key bits are present therein. The bits of the second start block message can then advance through the register until the second key characters are reproduced. The system may then be synchronized by the key bits of the second start block message.

Should the key characters be detected before the output of the delay circuit 353 goes negative, the NAND gate 349 will provide a positive level which will inhibit the NAND gate 354 from producing a pulse which will reset the flip-flops, such as the flip-flop 348, in the key character detectors and inhibit the NAND gates, such as the gate 347. Before operation of the system is started a start level is applied to reset input of the flip-flops in the key character detector. This places the flip-flops, such as the flip-flop 348, in their normal reset condition.

TWO SEQUENTIAL ERRORS DETECTOR

The two sequential errors detector 106 (FIG. 2) includes six circuits for detecting continual mistakes in the reading channels 70 to 75 for the data bits and four circuits for detecting continual mistakes in the reading channels 76 to 79 for the check bits. The circuit for detecting continual mistakes in the first reading channel 70 is shown, by way of example, in FIG. 21. The circuit for detecting continual mistakes in the first check bit reading channel 76 is shown, by way of example, in FIG. 23.

Figure 21:
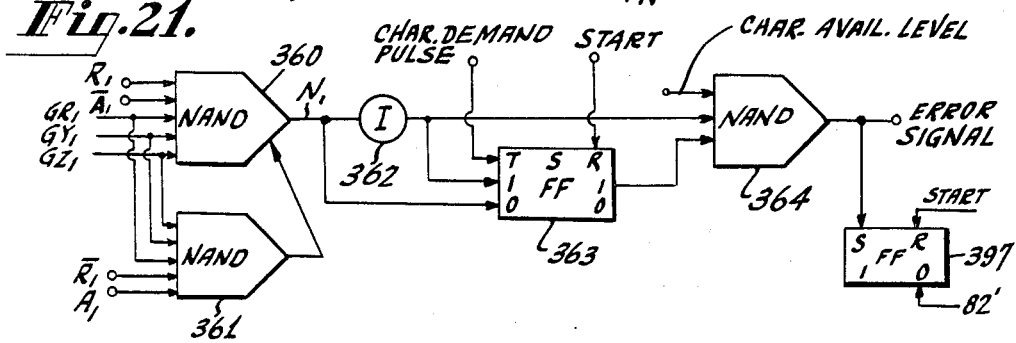
FIGURE 21 is a block diagram showing details of a circuit of the two sequential error detector which is illustrated in FIG. 2.

Referring first to FIG. 21, there is shown two NAND gates 360 and 361 which share a common output. Each of these NAND gates has five inputs. The data bit $R_1$ at the output of the deskew buffer 90 is compared with its corresponding corrected data bit $A_1$ from the output of the error correcting circuits 91 in the NAND gates 360 and 361. The valid bit signals $GR_1$ for the first data bit $R_1$ and the valid bit signals $GY_1$ and $GZ_1$ for the representations $Y_1$ and $Z_1$ of the first data bit $R_1$ are also applied to inputs of the NAND gates 360 and 361. These valid bit signals are used for the purpose of inhibiting these gates from generating a positive level in the event that a renewed bit is present in the groups of bits constituting any of the representations of the $R_1$ data bit or if the data bit $R_1$ was itself renewed.

If $R_1$ or the complement of $A_1$ are the same, or if $A_1$ and the complement of $R_1$ are the same, $R_1$ and $A_1$ are opposite in value, and an error is indicated. The NAND gates 360 and 361 then provide a bit signal, $N_1$, which is a binary "zero." Since the gates 360 and 361 are normally inhibited from generating a binary "zero" $N_1$ bit signal, the presence of a binary "zero" $N_1$ bit indicates that a malfunction in the first channel 70 (FIG. 2), rather than a missing bit, is the cause of disagreement between $R_1$ and its corrected value $A_1$.

Since two parity checks are provided for each character up to two missing bits per character can be corrected. Moreover, a sequence of missing bits is possible when a long drop-out occurs. The illustrated error correcting systems have a capability of correcting only one erroneous bit per character. It is desirable to detect and disable a reading channel which continually provides incorrect data bits due to malfunctions.

Returning to FIG. 21, the $N_1$ bit is inverted in an inverter 362. The inverted $N_1$ bit is applied to the "1" input of a triggerable flip-flop 363. The $N_1$ bit is applied directly to the "0" input of the flip-flop 363. Character demand pulses are applied to the trigger input T of the flip-flop 363.

System operation is initiated by applying a positive start pulse to the reset input of the flip-flop 363. This start pulse may be provided by a switch which controls the application of a positive voltage to the reset input. This switch may be part of the start switch on the control panel of the tape station.

The triggerable flip-flop 363 is described above, in detail, in connection with FIG. 21a of the drawing. Briefly, it operates by transferring the bits applied to the "1" and "0" inputs thereof to the "1" and "0" outputs thereof upon occurrence of a character demand pulse at its trigger input. When the $R_1$ and $A_1$ bits disagree, a binary "zero" bit signal is applied to the "0" input of the flip-flop 363 and a binary "one" bit signal is applied to the flip-flop "1" input. When a character demand pulse (positive voltage) occurs, these binary "one" and binary "zero" bit signals will be transferred, respectively, to the "1" and "0" outputs of the flip-flop 363. The "1" output of the flip-flop 363 is connected to an input of a NAND gate 364 together with the inverted $N_1$ bit. The NAND gate 364 compares successive pairs of $N_1$ bit signals. The character available level after inversion by an invertor circuit (not shown) is applied to another input of the NAND gate 364. This character available level is inverted, since it is normally positive to indicate the availability of a character. It is desirable to inhibit the NAND gate 364 except when a n character available level is applied to the gate 364 input since the $R_1$ and $A_1$ bits may differ until the occurrence of the appropriate character available level.

Figure 22:
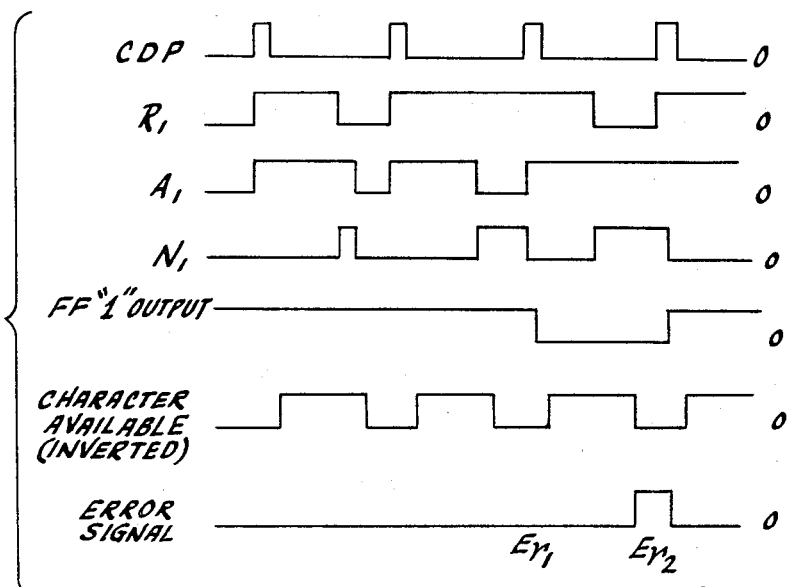
FIGURE 22 is a timing chart illustrating the operation of the circuit shown in FIG. 21.

The operation of the system illustrated in FIG. 21 will be apparent from FIG. 22. A binary "zero" $N_1$ bit (a positive level) may occur where there is a slightly longer $A_1$ pulse than its counterpart $R_1$ pulse. This may be due to the inherent delay in the circuits rather than to an error. This short $N_1$ bit signal will not alter the condition of the flip-flop 363 since it disappears before the next character demand pulse. When an error indicated at $Er_1$ occurs, a binary "zero" $N_1$ bit signal is generated. This $N_1$ bit causes the flip-flop 363 to be set when triggered by a character demand pulse. In the illustrated case two successive $A_1$ bits disagree with their counterpart $R_1$ bits. Accordingly, two $N_1$ "zero" (positive) bits are produced upon occurrence of two successive character demand pulses. The second $N_1$ "zero" (positive) bit is inverted and compared with the "1" output of the flip-flop in the NAND gate 364. Since both the inverted $N_1$ bit signal and the "1" output of the flip-flop are binary "one" bits during occurrence of a character available pulse, an error signal is produced by the NAND gate 364. This is indicated as a positive pulse at $Er_2$ in FIG. 22. Thus, two successive errors are detected. The error signal $Er_2$ after storage in a flip-flop 397 may be applied to the enable signal lead 82' (FIG. 4) for the purpose of disabling the first recording channel 70. The start pulse is applied to the reset input of the flip-flop 397 before a message is read. An indicator such as a bell or a buzzer may be energized with the error signal and indicate to the operator of the tape station that the first reading channel requires servicing. Alternatively, the error signal may be applied to the tape file control circuits in the computer which then command the tap file to re-read the message in which the error occurred.

Referring to FIG. 23, the two sequential error detector for erroneous check bits in the first check bit channel 76 (FIG. 2) has several components similar to the components used in the two sequential error detector for the first data bit channel 70. These components are a NAND gate 365, a triggerable flip-flop 366 and an invertor 367 which are connected in a manner similar to the invertor 362, flip-flop 363 and NAND gate 364 shown in FIG. 21. When two binary "zero" (positive) bits identified as $N_{c1}$ bits occur in succession a malfunction in the first check bit reading channel 76 is indicated.

Somewhat different circuitry than was shown in FIG. 21 is used to derive the $N_{c1}$ bit, since a corrected check bit is not available at the output of the error correcting circuits. An error in a check bit will be indicated, however, when the data bits and the representations of those data bits which are derived from parity sub-groups including the check bit in question, do not agree with each other. For example, the first check bit $K_1$ forms part of the $Y_1$ representation of the $R_1$ data bit; the $Y_2$ representation of the $R_2$ data bit; and the $Y_3$ representation of the third data bit $R_3$. If $R_1$ and $Y_1$ differ, $R_2$ and $Y_2$ differ, and $R_3$ and $Y_3$ differ, an error in the first check bit is indicated. The comparison of $R_3$ and $Y_3$ is not necessary since the $Y_1$ and $Y_2$ representations will include all of the bits in the first parity group. It is shown, however, for the sake of completeness, since any two of the $Y_1$, $Y_2$ or $Y_3$ parity groups may be used.

Referring again to FIG. 23, three NAND gate stages 368, 369 and 370 are provided for determining whether

53

$R_1$, $R_2$ and $R_3$ agree with their respective representations $Y_1$, $Y_2$ and $Y_3$. The stage 368 includes a pair of NAND gates 371 and 372 which have their outputs connected in common so as to perform the logical OR function. Gate 371 compares $R_1$ with the complement of $Y_1$ and the gate 372 compares $Y_1$ with the complement of $R_1$. Accordingly, if $R_1$ and $Y_1$ disagree, the NAND gate stage 368 supplies a positive level which is inverted in an inverter 373 and is applied to an input of another NAND gate 374. The NAND gate stages 369 and 370 include pairs of NAND gates 376, 377 and 378, 379. The outputs of these stages 369 and 370 are inverted in inverters 380 and 381 and applied to separate inputs of the NAND gate 374.

Voltage levels of $n$ (zero) volts will be applied to the NAND gate 374, if the first check bit is in error. Valid bit signals $GR_1$, $GR_2$, $GR_3$ and $GK_1$ are also applied to separate inputs of the NAND gate 374. These valid bit signals serve to inhibit the NAND gate 374 from generating a positive voltage of any one of them indicates that $K_1$ may be a renewed bit. The illustrated sequential error detector determines a malfunction in the reading channel 76 for the first check bit, rather than the occurrence of successive renewed bits in this channel. The NAND gate 374 generates an $N_{c1}$ "zero" bit, when $R_1$, $R_2$, $R_3$ and $K_1$ are not renewed bits and when the first check bit $K_1$ is in error. The inverter 367, flip-flop 366 and NAND gate 365 derives an error signal, if a successive pair of $N_{c1}$ "zero" bits occur with a successive pair of character demand pulses. This error signal may be used to operate an indicator. It may also be applied to cable 82 (FIG. 2) as an enable signal which inhibits the reading channel 76 for the first check bit.

ANOTHER READING SYSTEM

Referring to FIG. 26 of the drawings, a system for reading multibit characters of digital information from a magnetic tape record 400 is illustrated. The characters which are recorded on the tape include six data bits and one check bit. Reading channels are provided for each of the data bits. Another reading channel is provided for the check bit. The latter reading channel is designated in FIG. 26 as a parity channel.

Two tracks are provided per channel for each bit of the characters. These are identified as the $a$ track and the $b$ track. When a bit is a binary "one," a pulse representing that bit is recorded on the $a$ track. When the bit is a binary "zero," a pulse representing a binary "zero" is recorded on the $b$ track. Thus, one or the other of the tracks $a$ and $b$ of each channel will have a pulse recorded thereon. Since a pulse is recorded for each bit, the recording is self-clocking within each channel. The check bit which is recorded in the parity channel checks the parity of the data bits on the $a$ track and on the $b$ track independently. For example, the character may have even parity. Thus, if there are an odd number of "one" bits in a character, a pulse representing a binary "one" is recorded on the $a$ track of the parity channel. If the character has an odd number of "zero" bits, a pulse is recorded on the $b$ track of the parity channel. The logic circuits for generating the parity bits for recording may be similar in design to those shown in FIG. 24. Appropriate inverters are used to accommodate even or odd numbers of bits per character.

A clock track is also recorded for timing purposes. The apparatus for reading the clock track is the same as the apparatus for reading of clock track which is shown in FIG. 2. The components shown in FIG. 26 which are similar to the components illustrated in FIG. 2 are identified by like reference numerals with primes appended thereto.

The clock pulse reading channel includes a reading head 401, an amplifier 83', an oscillator 84' which is synchronized by the reproduced clock pulses, and a three-phase pulse generator 85'. The timing of the pulses from the three-phase pulse generator and the pulses read in each reading channel is compared in the missing bit detection and insertion circuit 86'. This circuit applies renewed pulses corresponding to missing bits to the shift registers constituting the deskew buffer 90'. The operation of the clock track reading channel and the missing bit detection and insertion circuit 86' is similar to the operation of the circuits described in connection with FIG. 2, and more specifically in connection with FIGS. 6 to 11.

Reading heads 402 and 402' are provided for reading the $a$ and $b$ tracks, respectively, on which the first bits of the characters are recorded. Reading heads 403 and 403' serve a similar purpose in the second channel. Reading heads 404 and 404' are provided in the third channel. Reading heads 405 and 405' are provided in the fourth channel. Reading heads 406 and 406' are provided in the fifth channel. Reading heads 407 and 407' are provided in the sixth channel. Reading heads 408 and 408' are provided in the parity channel. The pulses reproduced by these heads are amplified by reading amplifiers 409.

It will be observed that the circuitry for generating and rejecting reset pulses is dispensed with in this embodiment in this invention. This is because the bits are recorded alternatively in one or two tracks. A recorded pulse always represented a bit. Nevertheless, the recording is self-clocking in each channel since a pulse is provided for each bit, although these pulses may be in different tracks.

Interchannel time displacement or skew is eliminated by means of a deskew buffer 90'. This deskew buffer is a matrix of shift registers 410 to 416. These shift registers will be described in detail hereinafter in connection with FIG. 27 of the drawings. Alternatively, they may be similar to the shift register shown in FIG. 12. The shift register 410 is associated with the first reading channel. The pulses reproduced from the $a$ track of the first channel are applied to the $a$ inputs of the shift register 410 and the pulses reproduced from the $b$ track of the first channel are applied to the $b$ inputs of the shift register 410. The $a$ and $b$ inputs are associated with separate ones of the flip-flops of the first stage of the register 410. The shift register 410 also has $a$ and $b$ outputs. These outputs are associated with separate ones of the flip-flops of the last stage of the shift register 410. The renewed pulses are applied simultaneously to the $a$ and $b$ inputs of the shift registers. Thus, a "one" bit will be stored as a set condition of a first flip-flop and a reset condition of a second flip-flop in a stage of the register which stores a "one" bit. A "zero" bit will be stored as a reset condition and a set condition of the first and second flip-flop of the register stage. A renewed bit is stored as a set condition of both stages. This is the same as was the case in the deskew buffers 90 (FIG. 2).

The $a$ and $b$ outputs of the shift register 410 to 416 provide inputs for OR gates 417 to 423, respectively. These are transmission gates of known type. The gates shown in FIGS. 26 and 27 are all transmission type gates. The outputs of these OR gates 417 to 423 are connected as separate inputs to an AND gate 424 in a character available and error detector circuit 425. The OR gates 417 to 423 provide separate outputs, when a bit is stored in the last stage of their associated registers. The AND gate 424 will provide an output when a bit is stored in the last stages of each of the registers 410 to 416.

A parity checker 426 checks the parity of the bits appearing at the $a$ outputs of each of the shift registers and provides an output $P_1$, when the parity of the bits at all of the $a$ outputs is even. Another parity checker 427 checks the parity of the bits appearing at the $b$ outputs of the last stage of the shift register 410 to 416 and provides an output $P_0$ when the parity of these bits is even. These parity checkers 426 and 427 may be of conventional design. They may be designed in a manner similar to parity checkers discussed in connection with FIG. 16 of the drawing. The outputs of these parity checkers $P_1$ and $P_0$ are applied to an OR gate 428 in the character available and error detector circuit 425. The OR gate 428 provides an output when either the parity of the bits reproduced from the $a$ tracks of all the channels is correct or when the parity of all the bits recorded on the $b$ tracks of all of the channels is correct. As will be explained presently, the correct values for the bits belonging to the same character can be provided with the illustrated system when either the parity of the bits recorded on the $a$ track or the parity of the bits recorded on the $b$ track is correct. An AND gate 429 provides an output indicating that a character is available, when the deskew buffer 90′ stores all of the bits belonging to the same character in the last stage of each of its registers, and when the parity of the bits read at either all of the $a$ or all of the $b$ outputs of the registers is correct. A character will thus be available when correct output bits can be provided corresponding to the data bits of the character. These output data bits are identified as $D_1$ to $D_6$. The character available signal is supplied to the computer or other apparatus which utilizes the information reproduced from the tape.

The computer generates a send character signal which is applied to the last stages of the shift register 410 to 416 and resets these last stages so that the bits of a succeeding character may advance to the last stages of the shift registers.

Circuits 430 to 435 are provided for reading out correct bits belonging to the same character which are stored in the last stages of the shift registers 410 to 416, respectively. These circuits each include a pair of AND gates 436 and 437. The $P_1$ output of the parity checker 426 is applied to an input of all of the AND gates 436. The $a$ outputs of the shift registers are also applied individually to these AND gates 436. The $P_0$ output of the parity checker 427 is applied to all of the AND gates 437. The $b$ outputs of the shift registers 410 to 416 are also applied after inversion in inverter 439 individually to these AND gates 437. The circuits 430 to 435 also include OR gates 440. The outputs of the AND gates 436 and 437 provide inputs to these OR gates 440.

Figure 28:
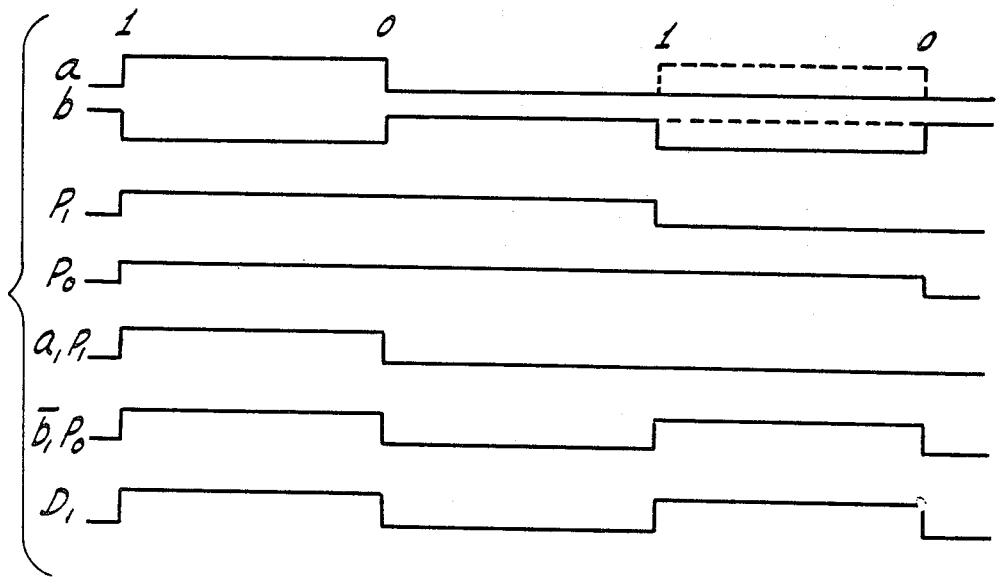
FIGURE 28 is a timing chart which illustrates the operation of the system shown in FIG. 26.

The operation of the circuits 430 to 435 will be apparent from FIG. 28 of the drawings. When a "one" bit is stored in the last stage of one of the shift registers (the register 410 by way of example), an output level will appear only at the $a$ output. Assuming that there are no drop-outs in the tape and no errors due to malfunction in the system, the parity checkers 426 and 427 will provide $P_1$ and $P_0$ outputs. The AND gate 436 therefore provides an output. The AND gate 437 also provides an output, since the $b$ output of the shift register 410 is inverted. The OR gate 440 will provide an output when either of the gates 436 or 437 provides an output. This output of this gate 440 will represent a binary "one" bit. It will be observed that the circuit 430 operates in accordance with the following Boolean expression:

$$D_1 = aP_1 + \bar{b}P_0 \qquad (36)$$

In the event that a "zero" bit is stored in the last stage of the shift register, an output level will appear at the $b$ output. Assuming again that parity is correct for bits recorded on all of the $a$ and all of the $b$ tracks. The parity checkers will both provide $P_1$ and $P_0$ outputs. The gate 437 will be inhibited since the $b$ output of the shift register 410 will be inverted in the inverter 439 before application to the AND gate 437. Since the $a$ output of the shift register 410 is absent, the gate 436 will be inhibited. The OR gate 440 therefore does not provide an output. The absence of an output represents a binary "zero" bit as indicated in FIG. 28.

In the event that a "one" bit was recorded on the tape but is missing due to a drop out, a renewed bit will be applied in its place to the $a$ and $b$ inputs of the register 410. These renewed bits are represented in FIG. 28 by the dashed lines. Because a bit is missing an additional $b$ output is provided by the register 410, the parity of the bits recorded in the $b$ tracks will be incorrect. The $P_0$ output of the parity checker 427 will be absent indicating incorrect parity. However, since the renewed bit replaces the absent bit in the $a$ track of the first channel, the $P_1$ output will be present indicating correct parity of the bits reproduced from the $a$ tracks. The AND gate 437 will be inhibited since the $P_0$ output is absent. The $a$ output of the register 410 will, however, provide the correct value for the renewed bit. The AND gate 436 will provide an output which is transmitted through the OR gate 440. This output of the OR gate 440 is a binary "one" $D_1$ bit.

An inverter 441 and an AND gate 442 provide an error signal in cases where the system is not capable of providing a corrected character. When an error the parity checks $P_1$ and $P_0$ both to indicate incorrect parity, an output is obtained from the inverter 441. An output is also obtained from the AND gate 442, when bits are stored in the last stage of the buffer 90′ although parity is incorrect in all of the $a$ tracks and in all the $b$ tracks. The output of the AND gate 442 therefore represents a condition where incorrect and/or renewed bits are present in a reproduced character and where these erroneous or renewed bits are scattered among the $a$ and $b$ tracks. This error signal may be used to operate indicators which will warn the operator of a malfunction in the system.

ANOTHER ASYNCHRONOUS SHIFT REGISTER

One of the asynchronized shift registers 410 to 416 (FIG. 26) is illustrated by way of example in FIG. 27. This shift register includes three stages 450, 451 and 452 and is capable of storing three successive bits. Each stage includes a pair of flip-flops 453 and 454 of conventional design. These flip-flops are designed by known techniques and provide an output level at their "1" output terminal when set and at their "0" output terminal when reset. Normally, the flip-flops are reset. When the first stage 450 is empty, outputs will be applied to an AND gate 455. This AND gate provides an output which enables AND gates 456 and 457. Accordingly, the AND gate 456 transmits the reproduced pulse representing a "one" bit which is applied to the $a$ input and causes the flip-flop 453 to be set. If a reproduced pulse representing a "zero" bit is applied to a $b$ input the other flip-flop 454 will be set. Renewed pulses applied to the $a$ and $b$ inputs also cause both of the flips 453 and 454 to be set. When the flip-flops are set, the inputs to the AND gate 455 are removed. The AND gate 455 therefore inhibits the gates 456 and 457 from transmitting successive pulses until the flip-flops 453 and 454 are both reset. These flip-flops are reset when the bits stored in either 453 or 454 advance to the flip-flops of the second stage 451 of the register.

If the second stage 451 is empty, the output at the "1" output terminal of the flip-flops 453 or 454 will be applied through AND gates 458 or 459 to the set inputs of the flip-flop 453 or 454 of the second stage 451. The "one" outputs of the flip-flops 453 and 454 are connected to an OR gate 460. When either of the flip-flops 453 or 454 is set, the OR gate 460 provides an output which is transmitted to the reset inputs of the flip-flops of the first stage 450 through a delay circuit 461. This delay circuit 461 is included to permit sufficient time for both flip-flops 453 and 454 to operate. When the flip-flops in the first stage 450 are reset, the next successive bit may be applied from the input terminals $a$ and $b$ to the first stage 450. This successive bit will not be able to advance to the second stage 451, since the AND gate 462 in the second stage 451 inhibits the AND gates 458 and 459, except when the flip-flops of the second stage are both reset.

In a similar manner the bits in the second stage 451 are passed through AND gates 463 and 464 to the last stage 452. The last stage 452 is reset by the send character signal. When the last stage 452 is reset, the bits stored in the preceding stages 450 and 451 may circulate to the last stage. Other signals may be provided for resetting the last stage of the register. For example, the last stage of the register may be reset at a predetermined time after a character available signal is generated. Such circuits are described in connection with FIG. 2 of the drawings.

From the foregoing description, it will be apparent that there has been provided an improved recording and reproducing system for digital information which is suitable for use in a magnetic tape station in an electronic digital computer. Several new and useful systems and circuits have been described as being incorporated in the described recording and reproducing system. Although two embodiments of the recording and reproduction systems have been described with one or more embodiments of various ones of the component circuits and systems which are incorporated therein, modifications and variations of the component circuits and systems and of the recording and reproducing system themselves will be apparent to one skilled in the art. Accordingly, the foregoing is to be taken as being illustrative and not in any limiting sense.

What is claimed is:

1. Apparatus for reproducing digital information signals recorded on a multi-track record which comprises means for successively reproducing said signals, means responsive to said reproduced signals for generating a renewed signal corresponding to a reproduced signal which does not follow its preceding reproduced signal from the same one of said tracks within a given time period, means for storing signals reproduced from each of said tracks and said renewed signals, means responsive to the simultaneous storage of signals in said storing means for reading out said signals.

2. In a system for reproducing information signals recorded successively on an information storage medium, the combination comprising means for providing separate output signals each in response to reproduction of a different one of two oppositely valued information signals, means responsive to the reproduction of a pair of said oppositely valued information signals within a given period of time for preventing the production of an output signal in response to the later one of said information signals.

3. In a system for reproducing binary bits recorded successively on a magnetic tape, the combination comprising a first transmission channel for binary "one" bits, a second transmission channel for binary "zero" bits, means responsive to the reproduction of binary "zero" bits for preventing the transmission of binary "one" bits through said first channel for a given period of time after reproduction of a binary "zero" bit, means responsive to the reproduction of binary "one" bits for preventing transmission of binary "zero" bits through said second channel for said given period of time after the reproduction of a binary "one" bit, means responsive to the reproduction of a binary "one" bit for preventing operation of said first named means for said given period of time, and means responsive to the reproduction of a binary "zero" bit for preventing the operation of said second named means for said given period of time.

4. In a system for reproducing binary bits recorded successively on a record track of a magnetic record medium, means for scanning said medium for producing a first output pulse when a reproduced bit represents a "zero" and a second output pulse when a reproduced bit represents a "one", a first gate for transmitting said first pulse, a second gate for transmitting said second pulse, a first pulse generator for generating a pulse of given duration when triggered, a third gate also for transmitting said first pulse and for triggering said first pulse generator and having its output connected thereto, a second pulse generator for generating another pulse of said given duration when triggered, a fourth gate also for transmitting said second pulse and for triggering said second pulse generator and having its output connected thereto, means coupling said first pulse generator to said second gate for applying a pulse to disable said second gate, means coupling said second pulse generator to said first gate for applying a pulse to disable said first gate, means for applying the pulse generated by said second generator to an input of said third gate so as to disable said third gate when a pulse from said second generator occurs, and means for applying the pulse generated by said first pulse generator to an input of said fourth gate so as to disable said fourth gate when a pulse from said first pulse generator occurs.

5. In a system for reproducing information signals which are stored successively on an information storage medium, apparatus responsive to the loss of any of said signals during reproduction which comprises means for determining the time relation between successive pairs of said information signals, and means for providing a renewed signal corresponding to a lost information signal when greater than a given period elapses between information signals in said successive pairs.

6. In a system for reproducing information signals from an information storage medium, apparatus responsive to the loss of any of said information signals which comprises means for providing repetitive sequences of regularly repetitive reference signals for each information signal, and means for detecting the loss of an information signal in response to variations in the time relationship among successive ones of said information signals and said reference signals in said sequences.

7. In a system for reproducing signals recorded successively along a record medium, apparatus responsive to the absence of any of said signals upon reproduction which comprises a source of timing signals which are repetitive at greater rate than said reproduced signals so that at least a certain number of timing signals occur between successive pairs of said reproduced signals which are present, and means for determining when greater than a first group including said certain number of said timing signals occurs after a reproduced signal operative for providing at the output thereof one of said timing signals of a next succeeding group including said certain number of timing signals, said provided one timing signal being indicative of the absence of a reproduced signal.

8. In a system for reproducing signal pulses recorded successively along a record medium, apparatus responsive to the absence of any of said signal pulses upon reproduction which comprises a source of timing pulses of a frequency which is multiple of the rate of reproduction of said signal pulses, means provided for dividing each of said timing pulses into a plurality of polyphase pulses having equal phase displacements with respect to each other, and means responsive to the absence of successive ones of said reproduced signal pulses between certain of said polyphase pulses in each of said pluralities of polyphase pulses operative to transmit one of said polyphase pulses of each said pluralities of polyphase pulses in which one of said reproduced signal pulses is absent for providing a replacement for said absent signal pulse.

9. A system for determining the relative time of occurrence of pulses in a first train of pulses with respect to pulses in a second train of pulses which comprises means responsive to the pulses in said first train for providing a plurality of digits of given value, each representing a different one of a plurality of sequential pulses in said first train, and means for changing the value of one of said digits depending upon the time of occurrence of a pulse in said second train with respect to the pulses in said plurality of sequential pulses in said first train.

10. A system for determining the relative times of occurrence of pulses in a first train of pulses with respect to pulses in a reference train of pulses which comprises means for encoding each pulse in a pulse sequence including a plurality of pulses of said reference train into separate binary digits, said encoding means including a plurality of gate circuit stages each having means for storing a digit of certain value when enabled and each connected to another of said stages for inhibiting said other stage from storing a digit of said certain value when storing said digit, and means for applying pulses from said first train simultaneously to all of said stages for simultaneously resetting said storing means.

11. A system for comparing the relative times of occurrence of two pulse signals each constituted of successive pulses which comprises a plurality of means for registering a digit when a pulse is applied thereto, means connecting said registering means in cascade for inhibiting one of said registering means from registering a digit when a digit is registered in its preceding registering means, means for resetting all of said registering means simultaneously when a pulse is applied thereto, means for applying pulses of one of said pulse signals to said resetting means, and means for applying pulses from the other of said pulse signals separately in repetitive sequences to said registering means.

12. A system for deriving digital information which varies in accordance with variations in the nominal repetition rate of input signals which system comprises a source of timing signals having a repetition rate which is an integral multiple of the nominal repetition rate of said input signals, a plurality of means each for registering a certain binary bit when actuated by a timing signal from said source, the number of said registering means being equal to said integral multiple, means for connecting said registering means in a ring so that when one of said bits is registered in one of said registering means its succeeding one of said registering means is inhibited from registering another of said bits, means for applying said timing signals separately in sequence to different ones of said registering means, and means for applying said input signals to said registering means for resetting all of said registering means simultaneously.

13. Apparatus for deriving digital information respecting the repetition rate of a train of pulse signals which comprises a source of separate timing pulses occurring in repetitive sequences, a plurality of gating circuit stages, each having an input and an output and including a first gate having an input for receiving a different one of said timing pulses in each sequence of said timing pulses for enabling said first gtae, a second gate having a common output with said first gate, and means for connecting the output and the input of said second gate so that said second gate maintains the signal level at said common output, said first gate input and said common output constituting said stage input and output, respectively, means for connecting the output and the inputs of successive ones of said stages and the output of the last of said stages with the input of the first of said stages such that the first gates in the succeeding ones of said stages are inhibited when their preceding stages are enabled, means for deriving relatively high and relatively low signal levels respectively from the outputs of each of said stages, each representing a different binary digit, and means for applying said pulse signals to an input of the gates of all of said stages simultaneously for temporarily inhibiting all of said gates, whereby the number represented by all of said binary digits represents the repetition rate of said pulse signals.

14. In a system for reading digital information from a magnetic record having a plurality of tracks and constituting characters of digital information recorded separately on different ones of said tracks, certain of said characters being key characters recorded in succession on said record, which system includes a register having a plurality of stages for storing characters of said information read successively from said record, and means for synchronizing reading operation of said system for recognizing the storage of said first key character in one stage of said register and said second key character in a preceding stage of said register.

15. In a system for reading a magnetic record having a plurality of tracks and bits constituting characters of digital information recorded separately on different ones of said tracks, certain of said characters being key characters, said system including a register having a plurality of successive stages for successively storing bits read from each of said tracks, the improvement comprising means for reading the bits of successive ones of said characters into said register, means for recognizing the absence and presence of each bit constituting a key character of said information in the final stage of said register and for storing signals in response thereto, means responsive to the presence of the first of said bits constituting said key character to provide a signal for resetting all said storing means after a given period of time, whereby to permit recognition of subsequently recorded ones of said key characters, and means responsive to the storage of all of the bits constituting said key character in said storing means for inhibiting the operation of said resetting means.

16. Apparatus for synchronizing a system for reading characters of digital information, each constituted of bits recorded separately on different tracks of a magnetic record, a successive pair of said characters each having the same combination of bits and constituting key characters, said system including a register having successive stages each having storage for the bits of successive ones of said characters; said apparatus comprising means for recognizing when the last pair of stages of said register have bits stored therein except for the bits of said key characters and for clearing the last stage after a given period of time, a plurality of flip-flops, means for setting said flip-flops separately in response to the presence of different pairs of bits of said key characters, means for resetting all of said flip-flops a given period of time after the first one thereof is set except when all of said flip-flops are set during said given period, and means for providing an output signal indicative of synchronization of said system when all of said flip-flops are set.

17. In a system for correcting the values of the bits of a multi-bit character of digital information, which character includes a plurality of data bits and a plurality of check bits, said check bits and said data bits being included in a plurality of unique bit combinations each having like parity, at least one of said data bits being included in a larger number of said combinations than the other of said data bits, the improvement which comprises means for checking the parity of those of said combinations including said one data bit for deriving outputs depending upon whether parity is correct or incorrect, means responsive to said outputs for deriving a corrected data bit for said one data bit, means for again checking the parity of said those combinations which include said one data bit for deriving other outputs depending upon whether parity is correct or incorrect, means for substituting said corrected data bit for said one data bit in said those combinations checked in said last named parity checking means, and means responsive to said other outputs for deriving other corrected data bits for other data bits in said those combinations.

18. In a system for reading characters of digital information recorded on a magnetic record and wherein any of said bits can be missing due to drop-outs, said characters including a group of bits which have a certain parity relationship, the improvement which comprises error correcting means for checking the parity of said group of bits and for providing a correct value of a given one of said bits based upon said parity check except when said given bit is missing, and missing bit value obtaining means including means for checking the parity of other bits in said group except for said missing bit for obtaining a representation of said missing bit in terms of said other bits in said group, and means for obtaining the value of said given bit when it is missing from said representation.

19. In a system for processing characters of digital information having a plurality of data bits and at least one check bit which checks the parity of a group of said data bits and wherein a bit can be missing, a system for correcting the value of a given bit in said group which comprises error correcting means for providing the value of said given bit except when said given bit is missing, said error correcting means including means for checking the parity of said group, means for inverting the value of said given bit when said parity is incorrect, and means for providing a value for said given bit in terms of the values of other bits in said group when said given bit is missing including means for checking the parity of the other of said bits in said group except for said given bit, and means for obtaining the value of said given bit based upon said last named parity check except when any of said other bits is missing.

20. In a system for processing digital information in the form of characters having a plurality of data bits, error correcting apparatus comprising means for providing a plurality of check bits for each of said characters of said digital information, means for grouping different ones of said check bits and different combinations of data bits included in said each character into separate groups having like parity, means for deriving from each of said groups a plurality of output bits having values determined by the values of different combinations of bits in said groups wherein each of said combination excludes a different one of said data bits, and means responsive to said output bits for providing corrected bits each corresponding to a different data bit of said each character.

21. A system for correcting errors in bits constituting characters of digital information comprising means for arranging said bits into groups having the same parity and deriving a plurality of bits from each of said groups representing the parity of different subcombinations of bits in each of said groups wherein different bits are excluded in each of said subcombinations, and means for comparing the bits representing different ones of bit subcombinations in which the same bits are excluded for providing corrected values for said excluded bits.

22. An error correcting system for characters including a plurality of data bits, means for providing a plurality of check bits for each of said characters, means for subdividing the check bits and the data bits of each character into a plurality of groups each with a different combination of data bits and each bit in a character being included in more than one group, each of said groups having the same parity, and means for deriving a corrected value of a given one of said bits comprising means for checking the parity of bits except for said given bit in all of said groups including said given bit and obtaining a plurality of output bits for said given bit, and means for comparing said output bits and said given bit for providing a corrected bit having a value corresponding to the majority of the values of said given bit and said output bits.

23. A system for correcting errors in the bits of a character of digital information which comprises means for encoding said bits into groups each with a unique combination of said bits having like parity and each bit being common to more than one group, means for correcting the value of given one of said bits comprising at least one pair of parity checking circuits, each for checking the parity of all of the bits except for said given bit in different ones of said groups which include said given bit whereby to provide a pair of output bits each representing said given bit, and means for comparing said output bits and said given bit for providing a corrected bit having a value equal to the values of the majority of said given bit and said output bits.

24. A system for correcting the values of the bits of a character of digital information in which some of said bits can be incorrect and some of said bits can be missing which system comprises means for encoding said character into a plurality of bit groups having unique combinations of said bits and with each bit common to more than one group, means for deriving output bits from each of said groups representing different subcombinations of bits in said groups each subcombination excluding a different bit, means responsive to the absence and presence of missing bits in said groups for determining whether each of said output bits contains no missing bits and is valid, and means responsive to said last named means for comparing a given one of said bits and the output bits derived from those of said subcombinations from which said given bit is excluded for deriving a corrected bit having a value equal to the values of the majority of said given bit and the valid ones of said last-named output bits.

25. In a system for reading the bits of a character of digital information recorded on a record medium, said character including a plurality of data bits and check bits which check the parity of different combinations of said data bits, the combination comprising a plurality of channels each for a different one of said check bits and said data bits, means coupled to each of said channels for replacing any absent data and check bits in said channels with a renewed bit, means for providing a signal from each channel representing the presence or absence of a renewed bit and indicating whether the bit carried by each said channel is valid if not a renewed bit or invalid if a renewed bit, means connected to the outputs of each said channels for correcting the value of any given data bit which comprises means for checking the parity of a first group of bits contained in a first combination of bits which includes said given bit and the check bit which checks the parity of said first combination of bits but excludes said given bit whereby the provide a first bit representative of said given bit, means for checking the parity of a second group of bits contained in a second combination of bits which includes said given bit and the check bit which checks the parity of said second combination but excludes said given bit whereby to provide a second bit representative of said given bit, means responsive to each said renewed bit absence or presence representing signal from each of said channels for the bits contained in said first group for providing a first output signal indicating whether or not any bit in said first group is one of said renewed bits and that said first representative bit is valid or invalid, means responsive to each said renewed bit absence or presence representing signal from each of said channels for said bits contained in said second group for providing a second output signal indicating whether or not any bit in said second group is one of said renewed bits and that said second representative bit is valid or invalid, and means controlled by said renewed bit absence or presence representing signal from the channel for said given bit and said first and second output signals for providing a corrected value for said given bit equal to the majority of the values of the valid ones of said first representative bit, said second representative bit and said given bit.

26. In a system for reading a magnetic record having bits recorded thereon as paired pulses to represent different sequences of bits, the combination of a reading channel for said pulses, means in said channel responsive to said pulses for detecting dropouts in said record, and means operated by said dropout detecting means for blocking said channel until a predetermined sequence of single pulses is reproduced after a dropout.

27. The invention as set forth in claim 26 when said last named means includes means for providing a first signal and a second signal in response, respectively, to those of said pulses representing "one" bits and to those of said pulses representing "zero" bits, means for providing storage for said signals, and means for providing another signal to block said channel unless said first and said second signals are stored simultaneously in said storage means.

28. A system for reading a magnetic record having the bits constituting a character of digital information recorded on different pairs of a multiplicity of record tracks on said record which comprises means for reading bits recorded on each of said tracks, means for separately recognizing errors in the bits read from a first of each of said pairs of tracks and in the bits read from a second of each of said pairs of tracks, and means operated by said recognizing means for selecting bits read from the ones of said first and said second of each of said pairs of tracks in which errors are absent for providing the bits of said character.

29. A system for reading a magnetic record having bits constituting a character of digital information recorded thereon, said bits being recorded in different pairs of tracks on said record, a first check bit recorded on another track of said record for checking the parity of the bits recorded in a first of each of said pairs of tracks, a second check bit recorded on another of said tracks for checking the parity of the bits recorded on a second of each of said pairs of tracks, said system comprising a reading channel for each of said tracks, means for checking the parity of the bits provided by said reading channels from the first of each of said pairs of tracks, and from the track providing said first check bit, means for checking the parity of the bits provided by the reading channels for the second of each of said pairs of tracks and from the track providing said second check bit, and means for selectively transmitting the outputs of the reading channels for said first of each of said pairs of tracks and for the second of each of said pairs of tracks on the basis of said parity checks.

30. A system for reading a magnetic record having bits constituting a character of digital information recorded thereon, said magnetic record having a multiplicity of record tracks, said bits each being recorded in a first of a different pair of said tracks when representing a binary "one" value and in a second of said different pair of tracks when representing a binary "zero" value, a pair of check bits recorded separately in a first and a second of another pair of said tracks, one of said check bits checking the parity of those of said bits recorded in said first tracks, the other of said check bits checking the parity of those of said bits recorded in said second tracks, said system comprising a reading channel for each of said tracks, a plurality of shift registers each in a different one of said channels, said registers being coupled separately to different pairs of said reading channels which read the same bit of said character and said check bits, means responsive to the absence of bits in any of said reading channels for inserting a bit in said registers in place of any absent bits, means for indicating when all of said registers have bits stored therein, first parity checking means for checking the parity of the bits read from said first tracks and stored in each of said shift registers, second parity checking means for checking the parity of the bits read from said second tracks and stored in each of said shift registers, and means operated by said parity checking means for selecting from said registers those of said bits which represents the digits for which parity is correct for providing all the bits of said character.

31. A system for reading characters of digital information recorded on a multi-track magnetic record, each digit being represented by bits recorded on a different pair of said tracks, each character including a pair of check bits recorded on separate tracks, one of said check bits checking the parity of the bits recorded on a first of each of said pairs of tracks, the other of said check bits checking the parity of the bits recorded on the second of said pairs of tracks, which system comprises a different reading channel for each said different pair of said tracks, means responsive to the outputs of said reading channels for checking the parity of said one check bit and the bits recorded on said first of each of said pairs of tracks to provide a first signal when parity is correct and for separately checking the parity of said other check bit and the bits recorded on the second of each of said pairs of tracks for providing a second signal when parity is correct, gate means at the outputs of the channels for each of said pairs of tracks, and means for applying said first and second signals to said gate means for selectively opening said gate means to pass the bits recorded in said first and in said second of said pairs of tracks.

32. A system for reading characters of digital information from a multi-track magnetic record, each digit of each character being written on a different pair of said tracks, said digits being written on a first of said pair of tracks when representing a "zero" and on the second of said pair of tracks when representing a "one," means for independently checking the parity of each digit representing a "zero" and each digit representing a "one" and writing different check bits on separate ones of said tracks which make the parity of the group of digits representing "zeros" and the group of digits representing "ones" the same, first and second reading circuits for each of said first and second tracks, respectively, means at the outputs of said channels for aligning the bits representing the digits of the same character and the check bits therefor, means for independently checking the parity of the group of said aligned digits representing "zeros" and the group of said aligned digits representing "ones," gate circuits for each reading channel connected to pass when opened digits aligned by said aligning means, and means operated by said parity checking means for independently opening those of said gate circuits for said first channels and those of said gate circuits for said second channels when the parity of said group representing "ones" and the parity of said group representing "zeros", respectively, is correct.

References Cited

UNITED STATES PATENTS

| | | | |
|---|---|---|---|
| 3,129,409 | 4/1964 | Perley | 340—172.5 |
| 3,136,979 | 6/1964 | Perotto | 340—172.5 |
| 3,075,175 | 1/1963 | Lourie | 340—146.1 |
| 3,163,848 | 12/1964 | Abramson | 340—146.1 |
| 2,638,933 | 5/1953 | Fleming | 328—37 |
| 2,782,305 | 2/1957 | Havens et al. | 328—37 |
| 2,254,933 | 9/1941 | Bryce | 235—61.7 |
| 2,931,689 | 4/1960 | Dupy | 346—74 |
| 3,078,448 | 2/1963 | O'Brien | 340—146.1 X |
| 3,024,994 | 3/1962 | Reynolds | 235—174 |
| 3,017,091 | 2/1962 | Ulrich | 235—153 |
| 2,977,047 | 3/1961 | Bloch | 235—153 |
| 2,966,305 | 12/1960 | Rosenberger | 235—175 |
| 2,850,234 | 9/1958 | Bartelt et al. | 235—153 |

DARYL W. COOK, *Primary Examiner.*